United States Patent
Sekiya et al.

(10) Patent No.: US 12,282,148 B2
(45) Date of Patent: Apr. 22, 2025

(54) MAGNIFIED OBSERVATION APPARATUS, MAGNIFIED OBSERVATION METHOD, AND NON-TRANSITORY COMPUTER-READABLE STORAGE MEDIUM OR STORAGE DEVICE

(71) Applicant: Keyence Corporation, Osaka (JP)

(72) Inventors: Suguru Sekiya, Osaka (JP); Shingo Matsumura, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 703 days.

(21) Appl. No.: 17/574,589

(22) Filed: Jan. 13, 2022

(65) Prior Publication Data

US 2022/0269061 A1 Aug. 25, 2022

(30) Foreign Application Priority Data

Feb. 19, 2021 (JP) ................. 2021-025732

(51) Int. Cl.
*G02B 21/36* (2006.01)
*G02B 7/09* (2021.01)
(Continued)

(52) U.S. Cl.
CPC ............. *G02B 21/367* (2013.01); *G02B 7/09* (2013.01); *G02B 21/025* (2013.01); *G02B 21/06* (2013.01);
(Continued)

(58) Field of Classification Search
CPC .... G02B 21/025; G02B 21/06; G02B 21/241; G02B 21/367; G02B 7/09; G06V 10/141;
(Continued)

(56) References Cited

U.S. PATENT DOCUMENTS

| | | | |
|---|---|---|---|
| 7,283,299 B2 | 10/2007 | Inomata | |
| 9,007,452 B2 | 4/2015 | Kang | |

(Continued)

FOREIGN PATENT DOCUMENTS

| | | |
|---|---|---|
| CN | 108445615 A | 8/2018 |
| JP | 8-68942 A | 3/1996 |

(Continued)

OTHER PUBLICATIONS

U.S. Appl. No. 17/574,590, filed Jan. 13, 2022 (100 pages).
Office Action issued in corresponding Japanese Patent Application No. 2021-025732 issued Jan. 7, 2025 (7 pages).

*Primary Examiner* — Kathleen M Walsh
(74) *Attorney, Agent, or Firm* — Kilyk & Bowersox, P.L.L.C.

(57) ABSTRACT

A magnified observation apparatus includes an illuminator, a feature quantity calculator, and an illumination controller. The illumination controller selectively performs first and second sequences. In the first sequence, the illuminator is operated in the first lighting pattern, and a display is operated to display a live image of the observation object that is irradiated with the first lighting pattern by a display controller. In the second sequence, the illuminator is operated in the second lighting pattern as at least one of the different illumination directions that is selected based on the feature quantities of the image data, which are calculated correspondingly to the different illumination directions by the feature quantity calculator, and the display is operated to display by the display controller an image of the observation object that is captured when the observation object is irradiated with the second lighting pattern.

18 Claims, 33 Drawing Sheets

(51) Int. Cl.
  *G02B 21/02* (2006.01)
  *G02B 21/06* (2006.01)
  *G02B 21/24* (2006.01)
  *G06V 10/141* (2022.01)
  *G06V 10/22* (2022.01)
  *G06V 10/60* (2022.01)
  *H05B 47/155* (2020.01)
  *H05B 47/16* (2020.01)

(52) U.S. Cl.
  CPC .......... *G02B 21/241* (2013.01); *G06V 10/141* (2022.01); *G06V 10/235* (2022.01); *G06V 10/60* (2022.01); *H05B 47/155* (2020.01); *H05B 47/16* (2020.01)

(58) Field of Classification Search
  CPC ...... G06V 10/235; G06V 10/60; G06V 20/69; G06V 2201/06; H05B 47/155; H05B 47/16
  USPC .......................................................... 348/79
  See application file for complete search history.

(56) References Cited

U.S. PATENT DOCUMENTS

| | | |
|---|---|---|
| 9,383,569 B2 | 7/2016 | Kang |
| 9,690,088 B2 | 6/2017 | Karube et al. |
| 9,690,089 B2 | 6/2017 | Karube |
| 10,302,931 B2 | 5/2019 | Inomata et al. |
| 10,379,331 B2 | 8/2019 | Inomata et al. |
| 10,422,986 B2 | 9/2019 | Inomata et al. |
| 10,859,806 B2 | 12/2020 | Sekiya et al. |
| 10,890,747 B2 | 1/2021 | Kang et al. |
| 10,890,749 B2 | 1/2021 | Futami et al. |
| 2008/0317329 A1 | 12/2008 | Shibuya et al. |
| 2009/0212242 A1 | 8/2009 | Yamada |
| 2016/0327778 A1 | 11/2016 | Tamura |
| 2017/0270662 A1* | 9/2017 | Kato ...................... H04N 23/56 |
| 2019/0137743 A1 | 5/2019 | Schumann |
| 2019/0323832 A1 | 10/2019 | Natori |
| 2022/0130072 A1* | 4/2022 | Kudo ...................... G01B 11/306 |
| 2023/0152563 A1* | 5/2023 | Ueda ...................... G03B 15/05 |
| | | 359/391 |

FOREIGN PATENT DOCUMENTS

| | | |
|---|---|---|
| JP | 2000283930 A | 10/2000 |
| JP | 2009002743 A | 1/2009 |
| JP | 2009008793 A | 1/2009 |
| JP | 2009014939 A | 1/2009 |
| JP | 2016126053 A | 7/2016 |
| JP | 201813732 A | 1/2018 |
| JP | 2019527375 A | 9/2019 |
| JP | 2019191306 A | 10/2019 |
| JP | 2020086295 A | 6/2020 |

* cited by examiner

MAGNIFIED OBSERVATION APPARATUS, MAGNIFIED OBSERVATION METHOD, AND NON-TRANSITORY COMPUTER-READABLE STORAGE MEDIUM OR STORAGE DEVICE

CROSS-REFERENCE TO RELATED APPLICATIONS

The present application claims foreign priority based on Japanese Patent Application No. 2021-025732, filed Feb. 19, 2021, the contents of which are incorporated herein by reference.

1. TECHNICAL FIELD

The present disclosure relates to a magnified observation apparatus, a magnified observation method, and a non-transitory computer-readable storage medium or storage device storing a magnified observation program.

2. DESCRIPTION OF RELATED ART

Optical microscopes, digital microscopes, and the like, which include optical lens, are used as a magnified observation apparatus to view samples such as very small substances or objects such as work pieces by enlarging them. A digital microscope includes an XY stage, an optical part having an objective lens and the like, an imaging device such as a CCD or CMOS having two-dimensionally arranged pixels, and a display. An object to be observed can be held on the XY stage. The imaging device can receive light reflected by or passing through the object and electrically measure the light at each pixel. An image can be obtained from the electrically measured light in an observation FOV of a target position on the XY stage, be displayed on the display.

A magnified observation apparatus that additionally includes an illuminator for illuminating an object on its stage is known (e.g., Japanese Patent Laid-Open Publication No. JP 2018-13,732 A). The illuminator includes a ring-shaped lamp that has blocks, and can selectively activate/deactivate the blocks to select one of directions of light incident on the object, in other words, can change its illumination direction. As a result, still images illuminated in different illumination directions can be obtained. Users can see and compare the still images illuminated in different illumination directions on the display to choose between the illumination directions. Consequently, easy illumination direction setting can be provided.

Users sometimes use such a magnified observation apparatus for the purpose of focusing attention on a very small flaw or defect on a surface of an object. An appearance of such a flaw or defect will be changed depending not only on illumination directions but also on positions of the flaw or defect in an observation FOV. It will be difficult for users to find such a flaw or defect in a still image in some positions of the flaw or defect in an observation FOV. The magnified observation apparatus disclosed in JP 2018-13,732 A allows even an inexperienced user who is unfamiliar with illumination settings (e.g., illumination direction setting) to obtain still image data of an object as observation images without conscious of illumination settings including illumination direction setting. After obtained the observation images, the user can easily see observation images, which are captured in different illumination directions, in a user interface on the display.

For example, such a flaw or defect is often clearly seen only in a particular illumination direction. Because the magnified observation apparatus allows users to choose between the illumination directions after capturing the observation images, even such an inexperienced user can see one of the observation images that is captured in the suitable illumination direction and can easily recognize the flaw or defect.

However, in the case in which a flaw or defect of an object is not located in a proper position in an observation field of view, a user has to repeatedly move the object to different positions, and then has to obtain data of still images in different illumination directions and switch between the illumination directions in the user interface on the display of the magnified observation apparatus. For this reason, such repeatedly moving and switching operations will be a burden if a flaw or defect is clearly seen only in a particular illumination direction and in a particular position.

It is an object of the present disclosure to provide a magnified observation apparatus, a magnified observation method that allow users to observe an object to be observed in real time while changing an illumination direction incident on the object whereby providing easy recognition of irregularities, a flaw, a dent or the like, and to provide a non-transitory computer-readable storage medium or storage device storing a magnified observation program.

SUMMARY

A magnified observation apparatus according a first aspect of the present disclosure includes a stage, an objective lens, a camera, a display controller, and a feature quantity calculator. The stage holds an observation object on the stage. The objective lens is arranged to face the observation object, which is held on the stage. The illuminator is configured to change between different illumination directions of light incident on the observation object, and to irradiate the observation object with one of first and second lighting patterns. In the first lighting pattern, the observation object is irradiated with the different illumination directions of light one after another. In the second lighting pattern, the observation object is irradiated with at least one of the different illumination directions, which are included in the first lighting pattern. The camera is configured to capture an image of the observation object through the objective lens and to generate image data representing the image. The display controller controls a display that displays the image of the observation object based on the image data, which is generated by the camera. The feature quantity calculator is configured to calculate feature quantities of the image data of the observation object. The feature quantities correspond to the different illumination directions in the first lighting pattern. The illumination controller is configured to control the illuminator and to selectively perform first and second sequences. In the first sequence, the illuminator is operated in the first lighting pattern, and the display is operated to display a live image of the observation object that is irradiated with the first lighting pattern by the display controller. In the second sequence, the illuminator is operated in the second lighting pattern as at least one of the different illumination directions that is selected based on the feature quantities of the image data, which are calculated correspondingly to the different illumination directions by the feature quantity calculator, and the display is operated to display by the display controller an image of the observation object that is captured when the observation object is irradiated with the second lighting pattern as the at least one of the different illumination directions. This magnified observation apparatus can automatically select an illumination direction that allows users to easily recognize surface conditions of an observation object and display an image that is captured when the observation object is irradiated with light in the illumination direction selected. Therefore, users can avoid overlooking a flaw, irregularities, or the like when observing the observation object.

A magnified observation method according a second aspect of the present disclosure is provided to observe an observation object that is placed on a stage and illuminated by an illuminator capable of changing between different illumination directions by capturing an image of the observation object by using a camera through an objective lens and by displaying the image on a display. The method includes performing a first sequence and performing a second sequence. In the first sequence, the illuminator is operated in a first lighting pattern the observation object is irradiated with the different illumination directions of light one after another, and a live image of the observation object that is irradiated with the first lighting pattern is displayed on the display. In the second sequence, feature quantities of the image data of the observation object are calculated, the illuminator is operated in a second lighting pattern, and an image of the observation object that is irradiated with the second lighting pattern is displayed on the display. The feature quantities of the image data correspond to the different illumination directions in the first lighting pattern. In the second lighting pattern, at least one illumination direction is selected from the different illumination directions based on the feature quantities of the image data. This magnified observation method allows users to observe an observation object in real time while changing an illumination direction incident on the object whereby providing easy recognition of irregularities, a flaw, a dent or the like on a surface of the object.

A non-transitory computer-readable medium or storage device according a third aspect of the present disclosure is provided to include a magnified observation program which causes a computer to perform magnified observation in a magnified observation apparatus. The magnified observation apparatus includes a stage, an objective lens, an illuminator, a camera, and a display. The stage holds an observation object on the stage. The objective lens is arranged to face the observation object, which is held on the stage. The illuminator can irradiate the observation object with illumination light. The camera can capture an image of the observation object through the objective lens and generate image data representing the image. The display can display the image of the observation object based on the image data, which is generated by the camera. The magnified observation includes performing a first sequence and performing a second sequence. In the first sequence, the illuminator is operated in a first lighting pattern the observation object is irradiated with the different illumination directions of light one after another, and a live image of the observation object that is irradiated with the first lighting pattern is displayed on the display. In the second sequence, feature quantities of the image data of the observation object are calculated, the illuminator is operated in a second lighting pattern, and an image of the observation object that is irradiated with the second lighting pattern is displayed on the display. The feature quantities of the image data correspond to the different illumination directions in the first lighting pattern. In the second lighting pattern, at least one illumination direction is selected from the different illumination directions based on the feature quantities of the image data. This magnified observation program allows users to observe an observation object in real time while changing an illumination direction incident on the object whereby providing easy recognition of irregularities, a flaw, a dent or the like on a surface of the object.

The non-transitory computer-readable storage medium can be a magnetic disk, optical disc, magneto-optical disk or semiconductor memory such as CD-ROM, CD-R, CD-RW, flexible disk, magnetic tape, MO, DVD-ROM, DVD-RAM, DVD-R, DVD+R, DVD-RW, DVD+RW, HD DVD (AOD), Blu-ray (trade name), UHD BD (trade name), USB memory or SSD memory, or another medium that can store the program. The program can be distributed in a form stored in the storage medium, and be also distributed through network such as the Internet (downloaded). The storage medium can include a device that can store the program, for example, a general-purpose device or special-purpose device on which the aforementioned program is installed in a form of executable software, firmware or the like. Processes or functions included in the program can be executed by the program software that can be executed by a computer. The processes of parts can be realized by hardware such as certain gate array (FPGA, ASIC), or a form of combination of program software and partial hardware module that realizes parts of elements of hardware. In this specification, a computer-readable storage medium includes a non-transitory material medium and transitory propagating signals.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION

Figure 1:
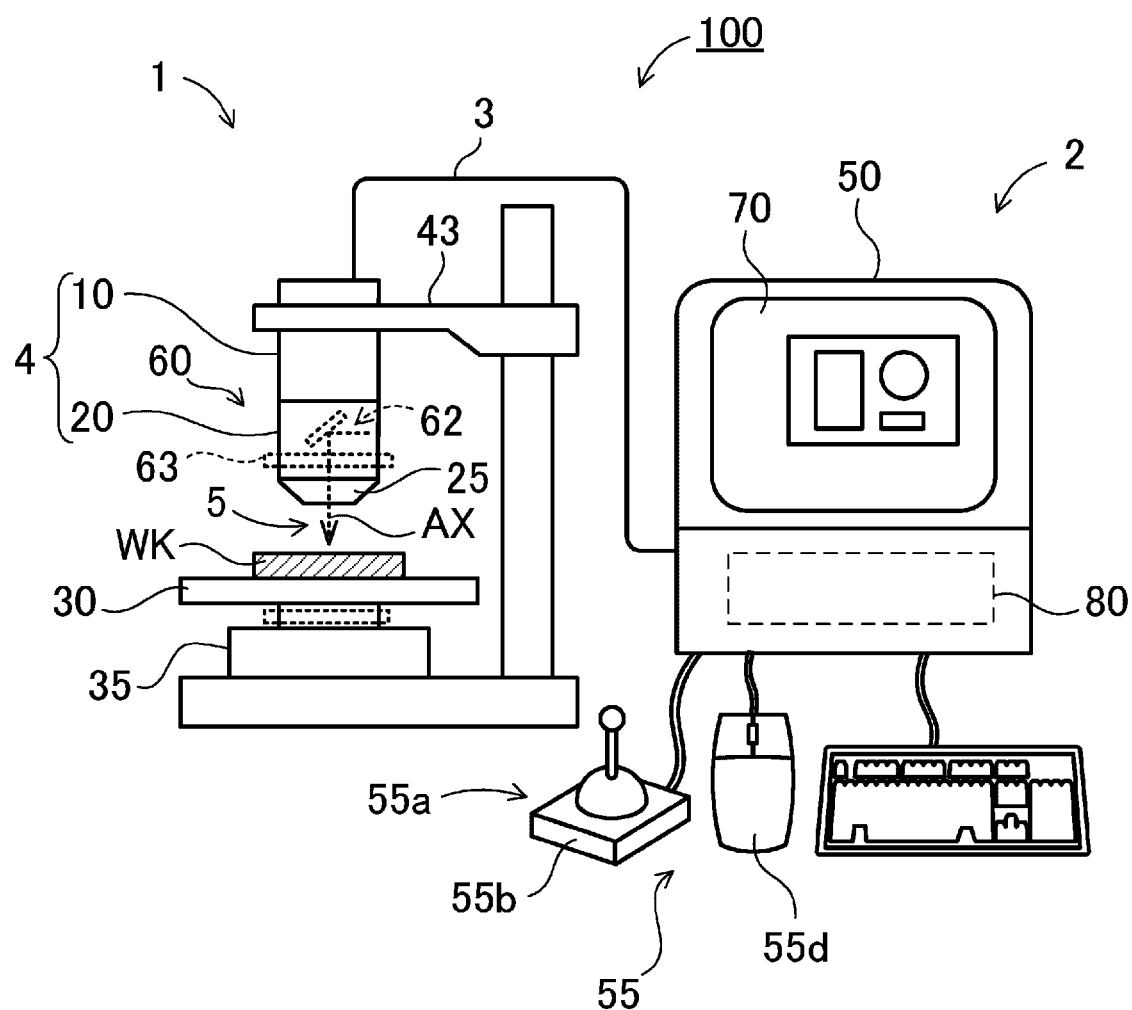
FIG. 1 is an external perspective view showing a magnified observation apparatus according to a first embodiment of the present disclosure.

The following description will describe embodiments according to the present disclosure with reference to the drawings. It should be appreciated, however, that the embodiments described below are illustrations of a magnified observation apparatus, a magnified observation method, a magnified observation program, and a non-transitory computer-readable storage medium or storage device storing the magnified observation program to give a magnified observation apparatus, a magnified observation method, a magnified observation program, and a non-transitory computer-readable storage medium or storage device storing the magnified observation program of the present disclosure are not specifically limited to description below. Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown exaggeratingly for ease of explanation. Members same as or similar to those of this present disclosure are attached with the same designation and the same reference signs, and their description is omitted. In addition, a plurality of structural elements of the present disclosure can be configured as a single part that serves the purpose of a plurality of elements, on the other hand, a single structural element can be configured as a plurality of parts that serve the purpose of a single element.

A magnified observation apparatus that is used in embodiments of the present disclosure can be electrically, magnetically or optically connected to and communicate with a computer for operation, control, display and other processes, a printer, an external storage or other peripheral device through serial connection such as IEEE1394, RS-232x, RS-422, and USB, parallel connection, or a network such as 10BASE-T, 100BASE-TX and 1000BASE-T. The connection is not limited to the physical connection using cables. The connection can be wireless connection using electric waves, infrared rays, optical communications including wireless LAN (e.g., IEEE802.1x), and Bluetooth (registered trademark), or the like. A memory card, a magnetic disk, an optical disk, a magneto-optical disk, a semiconductor memory, or the like can be used as a storage medium for data exchange, setting retention, and the like. In this specification, a magnified observation apparatus or a magnified observation method according to the present disclosure refers not only to an observing main device or a magnified observation method to perform magnified observation in such to an observing main device but also to a magnified observation system that includes a computer and peripheral devices such as external storage in addition to its device or a magnified observation method to perform magnified observation in such a magnified observation system.

In the specification, a magnified observation apparatus according to the present disclosure is neither limited to a system that performs magnified observation nor an apparatus that performs input/output, display, calculation, communication, and the other processes relating image capture by using hardware. Also, a magnified observation method according to the present disclosure is neither limited to a method to perform magnified observation in a system that performs magnified observation nor in an apparatus that performs input/output, display, calculation, communication, and the other processes relating image capture by using hardware. An apparatus and a method that realize the processes by using software are also included within the scope of the present disclosure. For example, a magnified observation apparatus according to the present disclosure can include a device or system having a general-purpose circuit or computer that is incorporated with software, program, plug-in, object, library, applet, compiler, module, macro that can be executed in a particular program so as to perform image capture or processing relating to image capture. In this specification, a computer includes a workstation, a terminal, and other electron devices as well as general-purpose device and special-purpose electronic computers. In this specification, the program is not limited to a program that can be used itself alone, but can be a form that functions as a part of a particular computer program, software, service or the like, a form that functions after downloaded when necessary, a form that is provided as service in environment of OS or the like, a form that stays resident in environment, or a form that is executed in the background, or other support program.

First Embodiment

Figure 2:
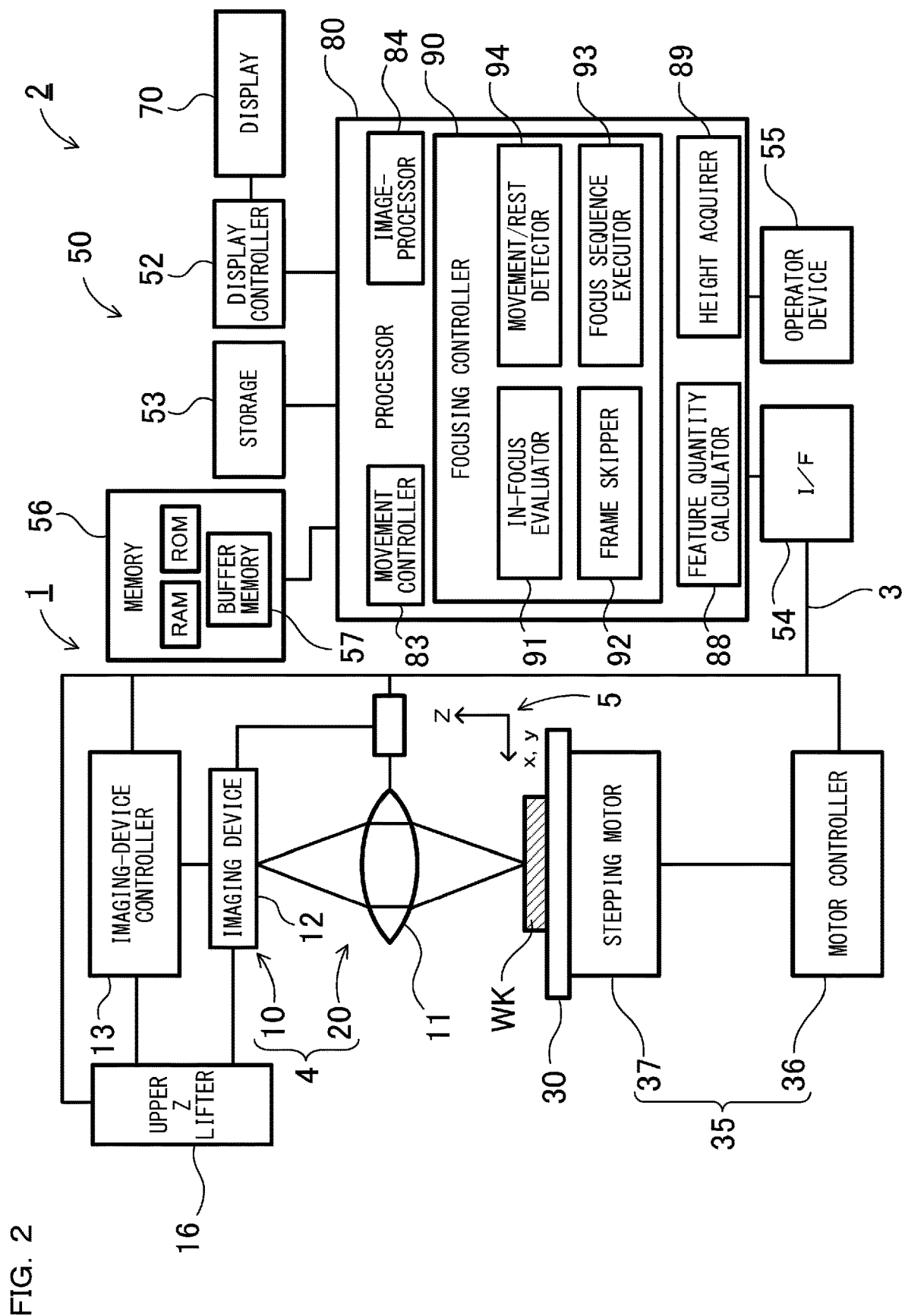
FIG. 2 is a block circuit diagram showing the magnified observation apparatus shown in FIG. 1.
Figure 3:
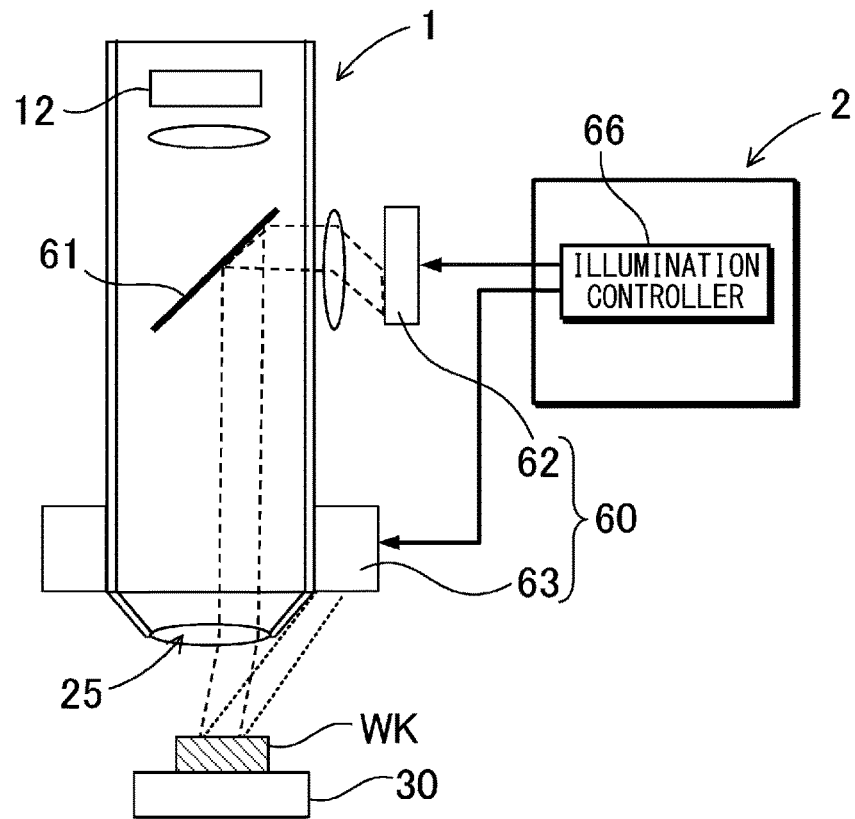
FIG. 3 is a schematic view showing an arrangement of an illuminator of the magnified observation apparatus.

A magnified observation apparatus 100 according to a first embodiment of the present disclosure is now described with reference to FIGS. 1 and 2. The magnified observation apparatus 100 mainly includes an imaging group part 1 and a control group part 2 as shown in FIG. 1. The imaging group part 1 includes an illuminator 60 that can illuminate an object to be observed (observation object) WK as a test piece or sample, a workpiece or any object, and a head 4 which that can capture an image of the observation object WK, which will be illuminated by the illuminator 60. The head 4 includes a camera 10 that includes an imaging device 12 and a microscope lens 20 that is detachably attached to an end of the camera 10 as shown in FIG. 2. The microscope lens 20 forms an imaging optical unit (lens optical unit) 11 that includes a plurality of optical lens elements. In this embodiment, the microscope lens 20 includes an objective lens 25 as shown in FIG. 3. The head 4 serves as an imaging part that receives illumination light reflected by or passing through the object.

The magnified observation apparatus further includes a focusing device. The focusing device can adjust image focus by changing a relative distance between a focus position of the optical imaging group part such as the objective lens 25 and the observation object by moving at least one of the objective lens and the observation object toward or away from each other in an optical axis of the optical imaging group part to focus an image of the observation object. The focusing device includes an upper Z lifter 16 (e.g., upper Z stage) and lower Z lifter 35 (e.g., lower Z stage), for example. The focusing device can be a device that can move the head 4 along the optical axis of the optical imaging group part or a device that can move the objective lens 25 with respect to the head 4 along the optical axis of the optical imaging group part. Alternatively, a lens in the objective lens 25 can be moved along the optical axis of the optical imaging group part. Also, in the case in which the objective lens 25 includes a variable focus liquid lens such as a liquid lens, the liquid lens can be deformed by a control circuit to change a relative distance between a focus position of the optical imaging group part (e.g., the objective lens 25) and the observation object, in other words, to move the focus position of the optical imaging group part along the optical axis of the optical imaging group part so as to increase/decrease the relative distance. The focusing device can include such a focusing device or a liquid lens that focuses under control of a control circuit.

(Camera 10)

The camera 10 includes the imaging device 12, which can receive light reflected by the observation object WK illuminated by the illuminator 60 through the imaging optical unit 11 and electrically measure the light, as shown in FIG. 3. CMOS is used for the imaging device 12 in this embodiment. It is noted that other photoreceptor devices such as CCD can be used for the imaging device 12. The objective lens 25 is arranged to face the observation object on the stage 30. The camera 10 can capture an image of the observation object through the objective lens 25 and generate image data representing the image.

The imaging group part includes the stage 30, which holds the observation object WK, and the upper Z lifter 16, which includes a Z upper stage and serves as a first focus adjuster that can change a relative distance between the stage 30 and the head 4 in a direction of an optical axis of the head 4 to adjust the focus of the objective lens. The upper Z lifter 16 can move the Z upper stage upward and downward. The imaging device 12 of the camera 10 can electrically measure light that passes through the imaging optical unit 11, and is incident on the observation object WK held on the stage 30 and reflected by the observation object WK, or passes through the observation object WK from a bottom surface side of the observation object WK.

The control group part 2 includes a control main unit 50, which includes a display 70. The display 70 can display a magnified image that is captured by the camera 10. The camera 10 is connected to the control main unit 50 through a cable 3. The display 70 can display an image of an observation field of view (observation FOV), which will include the observation object, based on image data that is generated by the camera 10. In this embodiment shown in FIG. 1, the display 70 is integrally formed in the control main unit 50. It is noted that the display can be separately formed from the control main unit. For example, the control main unit 50 can include a display connection interface that can connect the display 70 to the control main unit 50 in addition to a display controller 52, which can generate display information to be displayed on the display 70.

The control main unit 50 further includes a processor 80. The processor 80 can realize a plurality of functions (discussed later) shown in a block diagram of FIG. 2. A general-purpose computer installed with a dedicated program, or a dedicated device can be used as the control main unit 50. In this embodiment, the control main unit is formed of a general-purpose computer in which a magnified observation program that performs magnified observation in the magnified observation apparatus. The control main unit 50 includes the processor 80, the display controller 52, a storage device 53, an interface 54, an operator device 55, and a memory 56.

The cable 3 can be an electric cable that can transmit image information that is acquired by the imaging device 12 of the camera 10 to the control main unit 50. In addition to the electric cable, an optical cable that carries illumination light to the head 4 from the control main unit 50 can be included. In this case, the cable 3 can be integrated electric and optical cable. Alternatively, the electric and optical cables can be separately provided.

(Display 70)

A liquid crystal display, organic electroluminescence display, a CRT monitor, or the like can be used for the display 70. The operator device 55 is connected to the control main unit 50. Users can perform various manipulations by using the operator device 55. The operator device 55 includes an input device such as a console and a mouse. In this embodiment, the display 70 and the operator device 55 can be provided as external equipment. Alternatively, the display or the operator device can be integrally formed in the control main unit. The display 70 can be constructed of a touch panel. In this case, the display 70 and the operator device 55 can be integrally formed with each other.

The operator device 55 is connected through the cable or wirelessly to the control main unit 50 or the computer. Alternatively, the operator device can be directly attached to the computer. Typical examples of pointing devices used for the operator device 55 can be provided by a mouse, keyboard, slide pad, trackpoint, tablet, joy stick, console, jog dial, digitizer, light pen, numeric keypad (ten key), touchpad, and accupoint. The operator device 55 can be used to perform operations of a magnified observation operating program as well as the magnified observation apparatus itself and its peripheral devices. Also, a touch screen or touch panel can be used for the display, which displays interface screens, to allow users to execute input or perform manipulations by directly touching the screen with their fingers. Alternatively, a voice input device or existing input device can be used. In addition, these input devices and such a touch screen can be used together. In the embodiment shown in FIG. 1, the operator device 55 includes a mouse, a keyboard, and a joy stick 55b.

(Illuminator 60)

The illuminator 60 can emit illumination light to illuminate the observation object WK so that an image of the observation object WK is captured by the imaging device 12. FIG. 3 is a schematic view showing an arrangement of the illuminator 60. The illuminator 60 includes an illumination controller 66. The illumination controller 66 controls illumination light based on illumination conditions specified. Brightness of illumination light that is emitted by the illuminator 60 can be adjusted in accordance with the illumination conditions. For example, brightness of illumination light can be adjusted by adjusting a light emission duty cycle or intensity of the illuminator 60. The illuminator 60 can include LEDs as light sources. The illumination controller 66 can control brightness of illumination light by adjusting light emission of the light sources or light transmission amount of a light-shielding device such as a shutter.

A ring-shaped light (dark field illumination), a coaxial light (bright field illumination), which are epi-illumination lights, or the like can be used for the illumination. A suitable transmitted light illuminator, a suitable differentiation interference contrast illuminator, or the like can be suitably used as the illuminator 60. Epi-illumination refers to an illumination technique in which illumination light travels toward an observation object in a downward direction from the top side. A ring-shaped light, a coaxial light and the like can be used in epi-illumination. Angles of light incident on an observation object in coaxial and ring-shaped lights are different from each other so that their degrees of contrast are different from each other. Such coaxial and ring-shaped lights can be selectively used depending on observing objects. A microscope lens and an objective lens that correspond to both coaxial and ring-shaped lights, only to a coaxial light, or only to a ring-shaped light can be as the microscope lens 20, which is detachably attached to an end of the camera 10, and the objective lens 25, which is detachably attached to the microscope lens 20. Transmitted illumination is an illumination technique in which illumination light travels toward an observation object in a upward direction from the bottom side. In the embodiment shown in FIG. 3, the illuminator 60 includes a coaxial epi-illuminator 62 and a ring-shaped illuminator 63. Light from the coaxial epi-illuminator 62 is reflected by a beam splitter 61 to travel parallel to an optical axis AX of the objective lens 25. The illuminator 60 can be incorporated in the head 4 or be separately provided to be detachably attached to the head 4. The illuminator 60 can include LEDs, LDs or the like as light sources that are arranged in the coaxial epi-illuminator 62 and the ring-shaped illuminator 63, or a common illumination light source that is arranged in the control main unit 50. Light from such a common illumination light source can be carried by an optical cable to the illuminators of the head.

Figure 4:
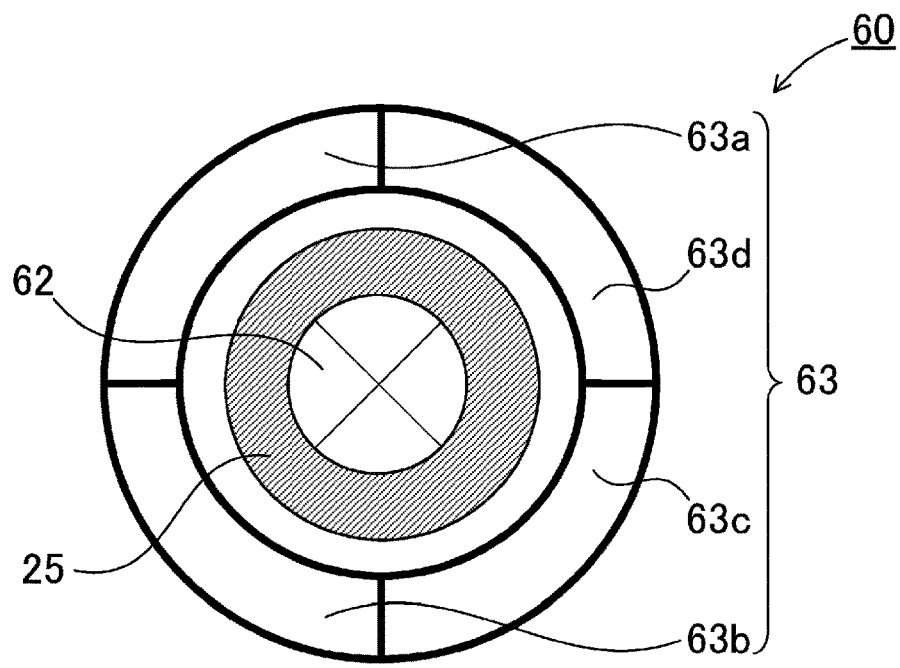
FIG. 4 is a schematic view showing coaxial and ring-shaped lights of the illuminator.

The coaxial light and the ring-shaped light can have an oblique illuminating function. FIG. 4 is a schematic view illustratively showing the coaxial and ring-shaped lights, which have such an oblique illuminating function. This illustrated illuminator 60 includes the coaxial epi-illuminator 62, which has a circular shape and is arranged on the inner side, and the ring-shaped illuminator 63, which similarly has a circular shape and is arranged on the outer side. The coaxial epi-illuminator 62 and the ring-shaped illuminator 63 have arc-shaped illumination blocks, which form their corresponding circles. The coaxial epi-illuminator 62 and the ring-shaped illuminator 63 can realize by selectively activating/deactivating the illumination blocks the oblique illuminating function in which illumination directions can be changed.

Consequently, the illuminator 60 can change between different illumination directions of light incident on the observation object so that the observation object can be irradiated with illumination light from different oblique angles. In addition, the illuminator 60 can irradiate the observation object with one of first and second lighting patterns. In the first lighting pattern, the observation object is irradiated with the different illumination directions of light one after another. In the second lighting pattern, the observation object is irradiated with at least one of the different illumination directions, which are included in the first lighting pattern. The illumination controller 66 controls the change between different illumination directions.

In the embodiment show in in FIG. 4, the ring-shaped illuminator 63 includes four illumination blocks 63a, 63b, 63c and 63d. The illumination blocks 63a to 63d can be independently lighted ON. For example, an illumination direction of light incident on the observation object can be selected by activating one of the illumination blocks 63a to 63d and deactivating the other (by lighting one of the illumination blocks 63a to 63d ON and the others OFF). It is noted that the number of blocks that ate included in the ring-shaped illuminator is not limited to four, but can be less or greater than four. The ring-shaped illuminator can be designed to have a suitable number of blocks depending on its observation use and the like. The illumination blocks 63a to 63d in the first lighting pattern can be lighted ON/OFF one after another in a predetermined light ON order (e.g., a clockwise order or a zigzag order). The light ON order of the illumination blocks 63a to 63d in the first lighting pattern can be stored as light ON order information in the memory 56. The first lighting pattern can be selectively applied only to the coaxial epi-illuminator 62, only to the ring-shaped illuminator 63, or to both the coaxial epi-illuminator 62 and the ring-shaped illuminator 63 depending on arrangements of the microscope lens 20 and the objective lens 25. In other words, if the first lighting pattern is applied only to the coaxial epi-illuminator 62, the illumination blocks of the coaxial epi-illuminator 62 are lighted ON/OFF one after another. If the first lighting pattern is applied only to the ring-shaped illuminator 63, the illumination blocks of the ring-shaped illuminator 63 are lighted ON/OFF one after another. If the first lighting pattern is applied to both the coaxial epi-illuminator 62 and the ring-shaped illuminator 63, the illumination blocks of the coaxial epi-illuminator 62 are lighted ON/OFF one after another, and the illumination blocks of the ring-shaped illuminator 63 are lighted ON/OFF one after another. For example, the ring-shaped light can be selected first in the first lighting pattern so that if an objective lens corresponding to both the coaxial light and the ring-shaped light is used as the objective lens 25 the ring-shaped illuminator 63 will be selected as a light for the first lighting pattern, and if an objective lens corresponding only to the coaxial light is used as the objective lens 25 the coaxial epi-illuminator 62 will be selected as a light for the first lighting pattern.

(Illumination Controller 66)

The illumination controller 66 selectively performs a first sequence and a second sequence to control illumination light. In the first sequence, the illuminator 60 is operated in the first lighting pattern. In addition, the display 70 will display a live image of the observation object that is irradiated with the first lighting pattern of light. The first sequence is also referred to as search lighting (discussed later). On the other hand, in the second sequence, the Illuminator 60 is operated in the second lighting pattern as at least one of the different illumination directions that is selected based on feature quantities of image data that are calculated correspondingly to the different illumination directions by a feature quantity calculator 88 as discussed later. In addition, the display 70 will display an image of the observation object that is irradiated with the second lighting pattern of light. As a result, a suitable illumination direction can be automatically selected, and an image captured in the suitable illumination direction will be displayed to allow users to easily recognize surface conditions of the observation object. For example, an image of the observation object is displayed in real time while the illuminator changes an illumination direction incident on the observation object whereby providing suitable observation environments for easy recognition of irregularities, a flaw, a dent or the like on a surface of the observation object. Therefore, users can avoid overlooking such irregularities, a flaw, a dent or the like.

In the case in which an observation FOV is moved along a field-of-view moving path (discussed later), the illumination controller 66 instructs the illuminator 60 to emit the first lighting pattern of light. In this case, because illumination directions can be automatically changed one after another during the movement of an observation FOV, users can observe surface conditions of the observation object under different illumination conditions. As a result, users can easily find a flaw, a chip, or the like. The illumination controller 66 can analyze image data including a plurality of images that are captured in their corresponding illumination directions and stored in a buffer memory 57, and will select at least one of the different illumination directions that most clearly shows such a flaw in its corresponding one of the images when the movement of an observation FOV is stopped by a field-of-view changer 5. The illuminator 60 then irradiates the observation object with the second lighting pattern of light in which the selected at least one of the different illumination directions is fixed. Consequently, a suitable image that allows users to most easily recognize such a flaw can be displayed when an observation FOV stops moving. Such a suitable image can provide a good observation for a flaw search.

The illuminator 60 shown in FIG. 1 includes the coaxial epi-illuminator 62 (see FIG. 3), which can irradiate the observation object WK with coaxial epi-illumination light, and the ring-shaped illuminator 63, which can irradiate the observation object WK with ring-shaped illumination light from its ring-shaped light source. The illuminators are connected to the control main unit 50 through a cable. The control main unit 50 includes a connector that connects the cable. The ring-shaped illuminator 63 can change between an entire ring-shaped illuminating function and an oblique illuminating function. To realize this change, a plurality of LEDs can be arranged in a ring shape as the ring-shaped illuminator 63. In this arrangement, the LEDs can be selectively lighted ON/OFF. Alternatively, a turret type mask that can partially cut off illumination light can be provided. It is noted that other suitable arrangement that can realize the change can be used. The illumination controller 66 controls illumination light and the change.

(Field-of-View Changer 5)

The magnified observation apparatus 100 includes the field-of-view changer (FOV changer) 5 that can move an observation FOV to be displayed on the display 70. The FOV changer 5 changes a relative position between the objective lens 25 and the stage 30 whereby moving a position of the optical axis AX of the objective lens 25 with respect to a mount surface of the stage 30. When a relative position between the objective lens 25 and the stage 30 is moved by the FOV changer 5, the display 70 will display an image that is captured in an updated observation FOV following the movement. In the embodiment shown in FIG. 1, an XY stage that can move the stage 30 in an XY plane is used for the FOV changer 5. It is noted that another FOV changer that can move the objective lens can be used instead of or in addition to the XY stage as the FOV changer in the disclosure. The FOV changer is only required to change a relative position between the objective lens and the stage as seen along the optical-axis side, in other words, to move an observation FOV in the XY plane.

The XY stage includes an electric stage-moving mechanism that can move the mount surface of the stage 30 in X and Y directions. The FOV changer 5 can further include a θ stage that can rotate the stage 30.

The stage 30 can be moved in a height direction (i.e., Z direction) by a lower stage lifter 35 in addition to the XY plane by the FOV changer 5.

Operations of the lower stage lifter 35 are now described. The control main unit 50 can provide a motor control circuit 36 with control data relating to control of a stepping motor 37 to change a relative distance between the stage 30 and the head 4, which includes the imaging optical unit 11 and the imaging device 12, in a direction of the optical axis (height in the direction of z in this embodiment). More specifically, the control main unit 50 can provide the motor control circuit 36 with control data that is required for control of the lower stage lifter 35 to control rotation of the stepping motor 37 whereby raising/lowering a height z (a position in the Z direction) of the stage 30. The stepping motor 37 generates a rotation signal in accordance with its rotation. The control main unit 50 can store a height z of the stage 30 as information about a relative distance between the stage 30 and the imaging optical unit 11 in the optical axis direction based on the rotation signal, which is provided through the motor control circuit 36. The stage 30 serves as an observation positioner that positions the observation object WK to provide a proper observation position.

In this embodiment, a relative distance between the stage 30 and the imaging optical unit 11 in the optical axis direction can be changed by changing not only a height of the stage 30 but also a height of the imaging optical unit, i.e., a height of the head 4. The head 4 is connected to the control main unit 50 through the cable 3. According to this connection, data that is acquired by the head 4 is transmitted to the control main unit 50 through the cable 3 so that the control main unit 50 can perform required processing. The stage can be arranged in a microscope main body. Alternatively, the stage can be arranged in a head that is separately formed from the microscope main body. An imaging unit that does not include the stage can be attached to the head. Such an imaging unit that does not include the stage can be attachable to an attachment stand and portable for users.

The imaging device 12 can electrically measure amounts of light that are received by pixels, which are arranged in two dimensions (x and y directions). An image of the observation object WK formed on the imaging device 12 is converted into electrical signals in accordance with amounts of light received by the pixels of the imaging device 12. The electrical signals are converted into digital data by an imaging-device control circuit 13. The control main unit 50 stores in the storage device 53 the digital data, which is converted by the imaging-device control circuit 13, as received light amount data D in combination with arrangement information (x, y) about the pixels as two-dimensional positional information on the observation object WK in a plane (x-y plane in FIG. 2) substantially perpendicular to the optical axis direction (z direction of in FIG. 2). In this specification, the plane substantially perpendicular to the optical axis direction is required not to strictly form an angle of 90 degrees with respect to the optical axis direction, but it refers to an observation plane that can be inclined from a plane strictly perpendicular to the optical axis direction within a certain range of angle that allows users to recognize an appearance of the observation object WK from the viewpoint of resolutions of the imaging optical unit and the imaging device 12.

Although the observation object WK has been illustratively described to be held on the stage 30 in the aforementioned embodiment, an arm that can hold an observation object WK on its end can be provided instead of the stage. Also, although the head 4 has been illustratively described to be attached to a camera attachment 43, it can be detachable to allow users to hold it in their hands at a desired position and a desired angle.

(Moving-Direction Input Device 55*a*)

The control group part 2 includes the operator device 55. The operator device 55 is an input device that is connected to the control main unit 50. The operator device 55 serves as a moving-direction input device 55*a* that receives user input indicating a moving direction of an observation FOV in the display 70. A moving direction of the FOV changer 5 is directed in accordance with the direction indicated by the input from the operator device 55. The operator device 55 can include a joy stick, a touchpad, a mouse, a keyboard (arrow keys or particular keys), or the like. In the case in which the joy stick 55*b* is used as the operator device 55, users can intuitively grasp a moving direction of an observation FOV when tilting the joy stick 55*b*. In addition, a movement speed can be specified in accordance with a tilt angle of the joy stick 55*b* with respect to an original, upright orientation.

The stage 30 can be moved in the XY plane in addition to in the height direction (i.e., Z direction), which corresponds to the lower stage lifter 35. More specifically, the movable XY stage, which is movable in the X and Y axial directions, is provided. In addition, the rotatable stage (θ stage), which can rotate the stage 30, can be provided.

Both the upper and lower Z lifters 16 and 35 have been illustratively described to be electrically driven in this embodiment. However, the upper and lower Z lifters are only required to acquire height information about both the objective lens 25 and the stage 30, and are not necessarily electrically driven. For example, one of the upper and lower Z lifters can be manually driven.

The control main unit 50 includes the processor 80, the display controller 52, a storage device 53, the interface 54, an operator device 55, and the memory 56 as shown in the block diagram of FIG. 2. This magnified observation apparatus 100 can display on the display 70 an observation image that is captured by the imaging device 12, which electrically measure light that is guided through the imaging optical unit 11 and is reflected or passes through the observation object WK, which is held on the stage 30.

The storage device 53 serves as storage that stores image data to be displayed on the display 70 by the display controller 52 as video. In addition, the storage device 53 can store image data and condition data associated with each other correspondingly to different observation objects. The image data is image data of a composite image that is generated by an image-processing part 84. The condition data includes information about one or more conditions when the composite image is generated.

The interface 54 is a connection part through which the control main unit 50 transmits/receives data to/from the head 4, lower stage lifter 35, and the like. The memory 56 is constructed of a RAM, ROM, or the like. The memory 56 includes the buffer memory 57, which can temporarily store image data that is acquired correspondingly to images that are captured in different illumination directions one after another by the camera 10 during movement by the FOV changer 5. The operator device 55 also serves to specify image-capture conditions for capturing an image by using the camera 10, and other required settings and operations.

The buffer memory 57 temporarily stores image data correspondingly to a plurality of images that are captured in the different illumination directions to be displayed on the display 70 in the first sequence. Because image data that is temporarily stored in the buffer memory 57 will be used to determine a suitable illumination direction, the image data is assigned to or associated with its corresponding illumination directions. The buffer memory 57 is required to have only a capacity corresponding to one cycle. Image data corresponding to one cycle can be overwritten with image data corresponding to the following cycle. In this specification, one cycle refers to a cycle period in which different illumination operations that are included in the first lighting pattern are executed one after another. The different illumination operations, which are included in the first lighting pattern, are executed at least one time in one cycle. That is, image data that is temporarily stored in the buffer memory 57 during one or more cycles is sufficient to select from the different illumination directions.

The feature quantity calculator 88 is configured to calculate, if the buffer memory 57 stores image data of images to be displayed correspondingly to the different illumination directions, feature quantities of the image data stored in the area, which is specified through an area specifier, correspondingly to the different illumination directions in the first lighting pattern, in response to the area specification through the area specifier. The illumination controller then selects at least one illumination direction from the different illumination directions and switches from the first sequence to the second sequence. The feature quantities can include variances of subject brightness values of image data, contrast values, and the like. Because image data of images is stored in the buffer memory 57 while the illuminator changes between the illumination directions one after another, a suitable illumination direction can be selected based on the image data, which has been stored, when a user specifies a desired area. As a result, such a suitable illumination direction can be quickly selected without causing the user to wait for a new image capture. When a desired area is specified through the area specifier, if image data of images that has been stored in the buffer memory 57 includes less than one cycle amount of data or no data, the first sequence will be kept until the buffer memory 57 stores image data corresponding to one cycle. After the buffer memory 57 stores image data corresponding to one cycle, the feature quantity calculator 88 will calculate feature quantities of the image data that has been stored in the buffer memory 57 of images in the area specified. At least one of the illumination directions will be then selected, and the sequence will go from the first sequence to the second sequence.

(Display Controller 52)

The display controller 52 provides image data that is generated by the camera 10 to the display 70. The display 70 can display an image resented by image data corresponding to an observation FOV that is provided by the display controller 52. This display controller 52 can be constructed of a GPU, and the like. In the embodiment shown FIG. 2, the display controller 52 is constructed separately from the processor. This exemplary display controller 52 is constructed of a GPU. It is noted that the display controller 52 in the present disclosure is not limited to such a GPU but can be incorporated into the processor. For example, a CPU or MPU that forms the processor can include the display controller 52.

(Processor 80)

The processor 80 realizes functions of a movement controller 83, the image-processing part 84, a focusing controller 90, a height information acquirer 89, the feature quantity calculator 88, and the like. The movement controller 83 controls movement of the FOV changer 5 in accordance with the direction of movement provided by the moving direction input device 55a. The focusing controller 90 controls the focusing device and adjusts image focus. For example, the focusing controller 90 can control auto-focusing of the focusing device in which the focusing device automatically focuses. The focusing controller 90 realizes functions of an in-focus degree evaluator, a frame skipper 92, a movement/rest detector 94, a focus sequence executor 93, and the like. The in-focus degree evaluator 91 calculates in-focus degree feature quantities, which represent in-focus degrees of image data corresponding to images to be displayed by the display controller 52 on the display 70.

In the case in which the focusing device moves at least one of the objective lens and the observation object toward or away from each other in the optical axis direction to automatically focus, the in-focus degree evaluator 91 successively calculates in-focus degree feature quantities. If an in-focus degree feature quantity of image data corresponding to an image after the movement by the focusing device is improved relative to an in-focus degree feature quantity of image data corresponding to an image that is displayed on the display 70 before the movement, the frame skipper 92 will direct the display controller 52 to change the image that is displayed on the display 70 to the new image after the movement, that is, to update an image on the display 70. As a result, in the case in which the focusing device achieves focus, only if the image after the movement has an improved in-focus degree feature quantity, an image on the display 70 will be updated.

In the case in which the focusing device focuses an image, if one of in-focus degree feature quantities, which are successively calculated by the in-focus degree evaluator 91, of image data corresponding to an image after the movement by the focusing device becomes worse than an in-focus degree feature quantity of image data corresponding to an image that is displayed on the display 70 before the movement, the frame skipper 92 will not update an image on the display 70. As a result, users can be free from stress that is caused by temporarily misfocused images, which are displayed in conventional magnified observation apparatuses, in auto-focusing. Consequently, stress-free focus adjustment can be achieved.

In this specification, the in-focus degree feature quantities are indices representing in-focus degrees of images, and can include known parameter such as a focus value or a phase difference. For example, a focus value such as a contrast calculated based on an image data can be used. In this case, during image focusing of the focusing device, if one of focus values, which are successively calculated by the in-focus degree evaluator 91, of image data corresponding to an image after the movement by the focusing device (e.g., a lifter mechanism) is improved relative to one of the focus values of image data corresponding to an image that is displayed on the display 70 before the movement, the frame skipper 92 will update an image on the display 70. As a result, the focusing device can automatically focus (perform auto-focusing) based on focus values such as contrasts that are acquired from image data without a dedicated sensor.

To use a phase difference as the in-focus degree feature quantity, an auto-focusing sensor that can detect a difference between an in-focus position and the current position is arranged. In this case, during image focusing of the focusing device, if one of measurement values, which are successively measured by the auto-focusing sensor, of image data corresponding to an image after the movement by the focusing device is improved relative to one of the measurement values of image data corresponding to an image that is displayed on the display 70 before the movement, the frame skipper 92 will update an image on the display 70. Because the auto-focusing sensor will not require movement in the Z direction, high-speed auto-focusing can be achieved.

During movement of an observation FOV by the FOV changer 5, the focus sequence executor 93 can execute an FOV-moving focus sequence in which the focusing device adjusts a relative distance between a focus position of the optical imaging group part (e.g., objective lens 25) and the observation object WK in accordance with information about an XY position of the observation FOV. A live image of the observation object will be displayed on the display 70 based on image data obtained in the FOV-moving focus sequence by the display controller 52.

The movement/rest detector 94 can detect a start and stop of movement of an observation FOV. When the movement/rest detector 94 detects movement of an observation FOV, the FOV-moving focus sequence can be performed to adjust by using the focusing device a relative distance between a focus position of the optical imaging group part (e.g., objective lens 25) and the observation object WK in accordance with information about an XY position of an observation FOV. A live image of the observation object can be displayed on the display 70 by the display controller 52 based on the image data of an image that is captured by the camera 10 during the movement of an observation FOV. When the movement/rest detector 94 detects a stop of movement of an observation FOV (detects that an observation FOV to brought to rest), the FOV-moving focus sequence will be ended, and an FOV-resting sequence is performed to cause the focusing device to stop adjustment of a relative distance between a focus position of the optical imaging group part (e.g., objective lens 25) and the observation object WK. Consequently, image focus adjustment can be performed even during movement of an observation FOV. Such an FOV-moving focus sequence cannot be performed by conventional magnified observation apparatuses. The movement/rest detector 94 can be constructed of one detector that can detect a start and a stop of movement of an observation FOV, in other words, can detect moving and resting of an observation FOV. Alternatively, the movement/rest detector can include detectors that can separately detect a start and stop of movement of an observation FOV.

In the case in which the illumination controller 66 performs the first sequence, the illumination controller 66 will direct the illuminator 60 to operate in the first lighting pattern when the FOV-moving focus sequence is performed, and the FOV-moving focus sequence will be ended, and the FOV-resting sequence will be performed when the movement/rest detector 94 detects a stop of movement of an observation FOV. In the FOV-resting sequence, for example, if the focusing device performs auto-focusing, the illumination controller will temporarily switch the illuminator 60 into an entire illumination pattern in which all of the illumination blocks of the coaxial epi-illuminator 62, the ring-shaped-illuminator 63, or the like are lighted ON. After the focusing device completes the automatic focusing, the illumination controller will direct the illuminator 60 to operate in the first lighting pattern again. If the movement/rest detector 94 then detects a start of movement of an observation FOV, the focus sequence executor 93 performs the FOV-moving focus sequence while the illumination controller 66 instructs the illuminator 60 to keep operating in the first lighting pattern.

The image-processing part 84 realizes a function that composes an image from a plurality of images (composite image mode). For example, in the case in which an image of an observation object is captured with a low depth of field, images of the observation object are captured with different focus positions so that in-focus parts of the images are selected in accordance with focus information and composed to generate a composite image that is captured as if with a high depth of field (DOF composite image). Also, improved high resolution images, which are captured by using a so-called super-resolution technology, or high dynamic range images can be obtained. Composite images that can be generated by the image-processing part 84 can include a DOF composite image, a 3D composite image, a pixel shift multi shot image, a super-resolution image, an HDR image, and the like. The image-processing part 84 can further have a function that measures an observation object. For example, a measurement tool that includes buttons for their corresponding measurement operations can be displayed on an image. A desired measurement operation can be performed by operating its corresponding button to measure an observation object in the image displayed.

In the first sequence performed by the illumination controller 66, the illuminator 60 operates in the first lighting pattern, and a live image that is irradiated with the first lighting pattern of light is displayed. In the second sequence, the Illuminator 60 operates in the second lighting pattern in which at least one of the illumination directions is selected based on feature quantities of image data, which are calculated by the feature quantity calculator 88, corresponding to images that are captured when an observation object is irradiated with their corresponding illumination directions so that the image-processing part 84 realizes a function that composes an image from a plurality of images (composite image mode). In addition, the display 70 will display such a composite image (e.g., a DOF composite image, a 3D composite image, a pixel shift multi shot image, a super-resolution image, and an HDR image) of the observation object that is irradiated with the second lighting pattern of light.

A switch from the first sequence to the second sequence can be triggered by an execution instruction of the composite image mode or specification of an ROI through the area specifier.

The height information acquirer 89 acquires height information of the observation object WK at different XY positions as three-dimensional reference information, more specifically, height image data of the observation object WK, for example. In the case in which the FOV changer 5 moves an observation FOV to be displayed on the display 70 by the display controller 52, focus positions are adjusted by adjustment of the focusing device in accordance with height information of an XY position to be moved corresponding to an observation position in a next FOV moving step (a next observation position) in the three-dimensional reference information, which is acquired by the height information acquirer 89. In this specification, height information represents positions of an observation object in the Z direction with respect to the mount surface of the stage 30. Because height image data that is three dimensional information of the observation object WK has been previously acquired, image focus adjustment can be performed in accordance with the height information of the height image data so that focused image can be displayed on the display 70 even during movement of an observation FOV. For example, the height information acquirer 89 acquires height information corresponding to XY positions of the observation object WK as three-dimensional reference information relating to image data of a wide area image that is captured together with its three dimensional information through a low power objective lens section of the objective lens 25. For example, the height information acquirer 89 can acquire height information corresponding to XY positions of the observation object WK as three-dimensional reference information relating to wide area image data of an image that has been previously captured as a navigation image (discussed later) together with its three dimensional information. If a part of the observation object WK that is not associated with its height information, which is acquired by the height information acquirer 89, (height-information absent part) is displayed, the focusing device will perform image focus adjustment in accordance with height information that is estimated based on height information of a peripheral part in proximity to the height-information absent part, which is not associated with its height information. In the case in which movement of the mounting surface of the stage 30 is not necessarily taken into consideration, for example, in the case in which the mount surface of the stage 30 is fixed, height information does not necessarily represent a position in the z direction with respect to the mount surface of the stage 30 but can represent a position in a z direction in an apparatus-based coordinate system with reference to the magnified observation apparatus.

Also, a geometric shape of an observation object can be selectively estimated as three-dimensional reference information from predetermined geometric shapes based on measurements in height information of the observation object so that target height values can be determined based on an XY position of the observation object corresponding to a next observation position and the information as the geometric shape selectively estimated so that the focusing device moves at least one of the objective lens and the observation object in accordance with the target height values. The predetermined geometric shapes can include a flat surface, a spherical surface, a cylindrical shape, a conical shape, a parabolic shape, and the like.

In the case in which the first sequence is performed by the illumination controller 66, if the focusing device focuses based on a geometric shape selectively estimated from the predetermined geometric shapes in the FOV-moving focus sequence, the illuminator 60 will be operated in the first lighting pattern, and focus positions are adjusted based on height information of the observation object WK at XY positions, which has been previously measured and the geometric shape selectively estimated (e.g., plane shape). When the movement/rest detector 94 detects a stop of movement of an observation FOV, the FOV-moving focus sequence is ended, and the FOV-resting sequence is performed. In the FOV-resting sequence, measurement of height information of the observation object WK and auto-focusing are performed, the illumination controller will temporarily switch the illuminator 60 into an entire illumination pattern in which all of the illumination blocks of the coaxial epi-illuminator 62, the ring-shaped illuminator 63, or the like are lighted ON. After the measurement of height information and the auto-focusing are completed, the illumination controller will direct the illuminator 60 to operate in the first lighting pattern again. Three-dimensional reference information will be updated based on height information that is newly measured and acquired by the height information acquirer 89. If the movement/rest detector 94 then detects a start of movement of an observation FOV, the focus sequence executor 93 performs the FOV-moving focus sequence while the illumination controller 66 instructs the illuminator 60 to keep operating in the first lighting pattern.

The focusing device can be configured to autonomously start auto-focusing when the FOV changer 5 stops movement of an observation FOV. Also, the focusing device can be configured to immediately stop auto-focusing when receiving an auto-focusing stop instruction.

(Feature Quantity Calculator 88)

The feature quantity calculator 88 calculates feature quantities of image data of an observation object. The feature quantities correspond to their illumination directions in the first lighting pattern. The feature quantities can include variances of image data, for example. This calculation can facilitate selection of at least one of the different illumination directions that provides the most perceptible image as an illumination direction in the second sequence. In the most perceptible image, features corresponding a flaw or defect will be most clearly recognized by users.

The processor 80 can be constructed of a general-purpose CPU or MPU, an SoC, an ASIC (application specific integrated circuit), or a gate array such as an FPGA. Although the processor has been illustratively described to be constructed of a single CPU that realizes a plurality of functions described later in this embodiment, the processor in the present disclosure is not limited to such a single CPU but can be constructed of two or more CPUs. Such two or more CPUs include not only two or more physically separated CPUs but also a so-called MPU, which includes two or more CPU cores in a single package. In the case of such two or more CPUs, two or more physically separated CPUs or CPU cores can realize the plurality of functions. Alternatively, the plurality of functions can be assigned to two or more physically separated CPUs or CPU cores one by one. Also, the processor can be constructed of a CPU and a GPU. In this case, the GPU can realize functions of the aforementioned display controller 52, and some or all of functions that are assigned to the processor.

(Area Specifier)

The area specifier can receive a desired area that is specified by a user on an image that is displayed on the display 70. The aforementioned operator devices 55 such as a mouse can be used as the area specifier. In the first sequence in which the illumination directions of the illuminator 60 are changed in the first sequence, if a user specifies an ROI, which is a desired area (region of interest) on an image by using the area specifier, the feature quantity calculator 88 will calculate feature quantities of image data corresponding to a plurality of images in an area that is specified by the area specifier. The plurality of images are captured in the different illumination directions. Each of feature quantities corresponds to one of the different illumination directions in the first lighting pattern. When the area is specified through the area specifier, the illumination controller 66 selects at least one of the illumination directions based on the feature quantities of images, which have been calculated by the feature quantity calculator 88, and the second sequence is them performed. As a result, if a user specifies a desired area in a live image of an observation object that is captured in the first lighting pattern in which the illumination directions are changed one after another, at least one of the illumination directions that is suitable for the area specified will be automatically selected. Consequently, the user can easily recognize a flaw or the like in an image of the observation object that is irradiated with illumination light in the at least suitable one of the illumination directions.

In addition, the specification of an ROI through the area specifier serves as a trigger that starts a switch of the illuminator 60 from the first lighting pattern to the second lighting pattern. When the ROI is changed by specifying another desired area as a new ROI, at least suitable one of the illumination directions will be newly selected based on feature quantities calculated of image data corresponding to a plurality of images in the area as the new ROI specified. If image data of images that has been stored in the buffer memory 57 includes one or more cycle amount of data, at least suitable one of the illumination directions will be newly selected again based on feature quantities of image data, which has been stored in the buffer memory 57, corresponding to a plurality of images in the area as the new ROI specified. In this case, if image data of images that has been stored in the buffer memory 57 includes less than one cycle amount of data or no data, the sequence temporarily goes from the first sequence to the second sequence until the buffer memory 57 stores image data corresponding to one cycle. After the buffer memory 57 stores image data corresponding to one cycle, the feature quantity calculator 88 will calculate feature quantities of the image data that has been stored in the buffer memory 57 of images in the area as the new ROI specified. At least new one of the illumination directions will be then selected, and the sequence will go from the first sequence to the second sequence.

In specification of an ROI, the area specifier can receive a desired area by specifying a boundary (e.g., by drawing a rectangular shape by clicking two points with a mouse) surrounding the area on an image represented by image data that is displayed on the display 70. In addition to such an operation of drawing a rectangular shape by clicking two points with a mouse, users can specify points to define vertices of a polygonal shape or specify a geometric shape such as a circle or ellipse to specify a boundary surrounding a desired area. Also, users can freely draw a line on an image on the display 70 to specify a boundary surrounding a desired area. In specification of an ROI, the area specifier can receive a desired area by specifying a free line as a segment of a previously defined thickness (e.g., by drawing a line while keeping a mouse click) corresponding to the area on an image on the display 70. In specification of ROI, the area specifier can receive a desired area by selectively specifying a boundary surrounding the area or a line segment corresponding to the area.

(Navigation Image Reading Function)

The magnified observation apparatus according to this embodiment has a navigation image reading function to read a wide area image to help users to find a target part to be observed of an observation object. The navigation image reading function previously captures a wide area image of an observation object through the low power objective lens section of the objective lens 25 to show the wide area image separately from the current observation FOV, for example, in a navigation window. If a user clicks a desired position on the navigation window, the XY stage will be moved to the position. The navigation image reading function is now described with reference to a user interface screen of the magnified observation program shown in FIG. 5. The illustrated navigation image reading screen 230 includes an image display area 231, an operator area 232, and a navigation area 233. The image display area 231 displays the image. The operator area 232 displays operator buttons, text information, and the like. The navigation area 233 displays a navigation image NI, which is a wide area image.

Figure 5:
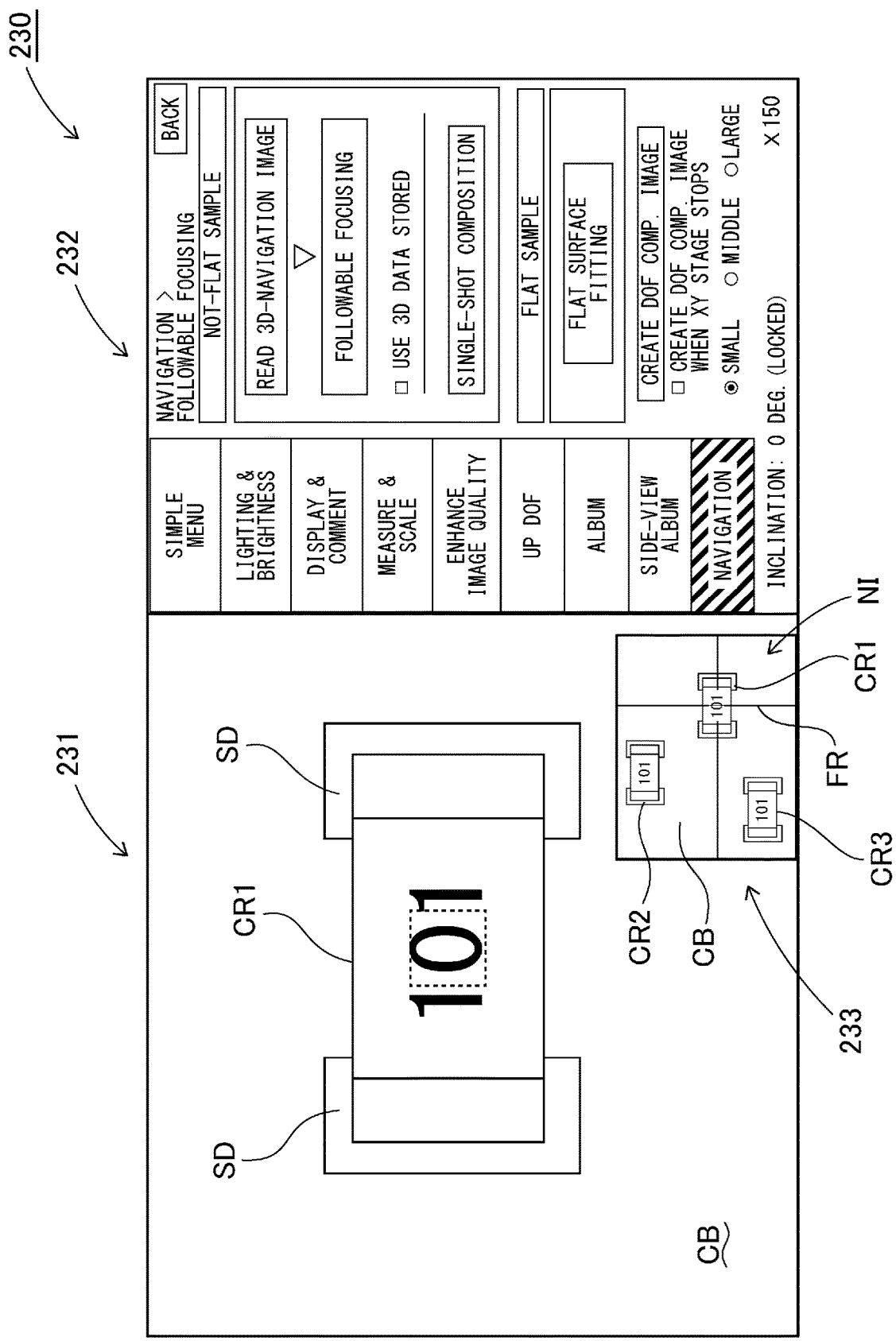
FIG. 5 is a schematic diagram showing a user interface screen of a magnified observation program including a navigation area.
Figure 6:
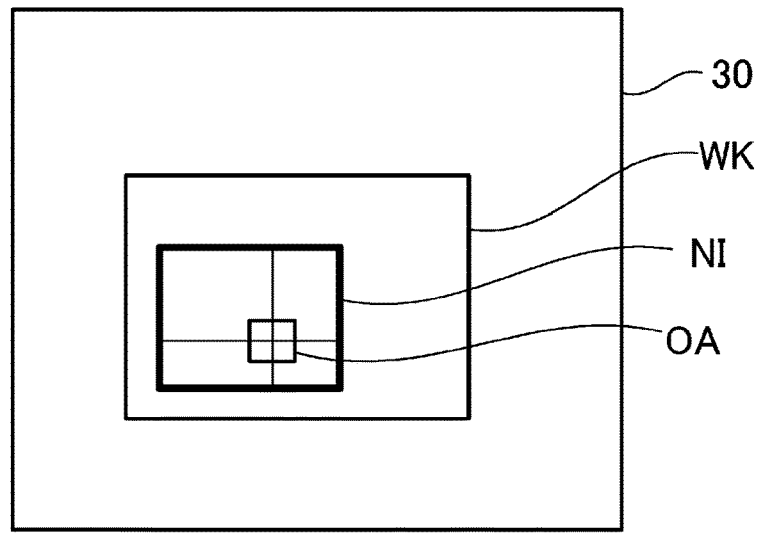
FIG. 6 is a schematic diagram showing a relation of a stage, an object to be object, a navigation image, and an observation field of view.

A positional part of the current observation FOV that is displayed in the image display area 231 is shown by a box FR in the navigation image NI, which is displayed in the navigation area 233. Such a positional part of the current observation FOV that is displayed in the image display area 231 is not limited to be shown by the box FR but can be shown by a cross point in the navigation image NI in the navigation area 233 at which two lines intersect each other. In this case, the cross point in the navigation image NI represented by the two line, which intersects each other, indicates a center of the current observation FOV in the image display area 231. The box FR or cross point lets users to know where the current observation FOV is located relative to an observation object. In FIG. 5, chip resistors CR1 to CR3, which are soldered on a board, are displayed in the navigation image NI, and a center of the chip resistor CR1, which is mounted on the board by solder SD, is positioned at the center of the observation FOV. If the XY stage is moved to move an observation FOV to be displayed in the image display area 231, the box FR will correspondingly move to a new positional part in the navigation area 233. If a user specifies a desired position through a mouse cursor or the like in the navigation area 233, the XY stage will be correspondingly moved to the position. The navigation image NI preferably displays a wide area of an observation object but does not necessarily display the entire of the observation object. A relation of the stage 30, the object to be object WK, a navigation image, and an observation FOV is shown in FIG. 6.

(3D-Navigation Image Reading Function)

The magnified observation apparatus according to this embodiment has a 3D-navigation image reading function that reads a wide area image in combination with height information. The 3D-navigation image reading function can be included in the navigation image reading function. That is, when a wide area image is read as a navigation image, height information can be associated to the navigation image to obtain such a 3D-navigation image.

(Auto-Focusing Device)

The magnified observation apparatus 100 has an auto-focusing function. More specifically, auto-focusing can be performed by the focusing device, which can change a relative distance between the camera 10 and the objective lens 25 along the optical axis of the objective lens 25. Known techniques such as contrast detection and phase detection can be used for auto-focusing. The magnified observation apparatus according to the first embodiment uses contrast detection in which correct image focus is determined based on subject brightness values of pixels that represent image data.

Auto-focusing is classified into normal auto-focusing and short range auto-focusing. In the normal auto-focusing, an in-focus position will be found within a normal height range. In the short range auto-focusing, an in-focus position will be found within a narrower range than the height range of the normal auto-focusing.

Generally, auto-focusing is performed in a rest state of the XY stage. That is, auto-focusing is not performed when the head 4 or the objective lens 25 is moved, and auto-focusing is performed after the XY stage is stopped. In other words, auto-focusing is not performed during moving sequences of an observation FOV but is performed during resting sequences. The auto-focusing can automatically start in response to an explicit instruction that is instructed by users to perform auto-focusing (e.g., in response to a press on an autofocus button) as well as in response to detection of a stop of movement of the XY stage or an observation FOV by the magnified observation apparatus. As a result, to display a focused image on the display 70, users do not have to instruct the magnified observation apparatus to start auto-focusing but such a focused image can be automatically displayed on the display 70 when an observation FOV moving is stopped. Consequently, users can observe an observation object without feeling stress. The movement/rest detector 94 detects a start and stop of movement of an observation FOV.

(Followable Focusing)

On the other hand, in the magnified observation apparatus according to this embodiment can automatically focus not only in a rest state of the XY stage but also during movement of the XY stage (i.e., an FOV moving state). In this specification, such a function that performs image focus adjustment during movement of an observation FOV in the XY plane refers to followable focusing. In the followable focusing, the head 4 can be moved toward an in-focus position as if to follow a surface of an observation object.

Figure 7A:
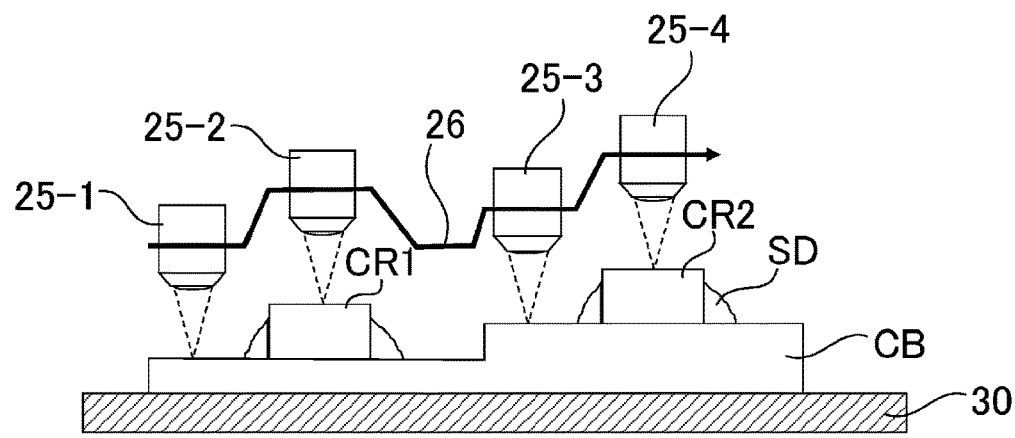
FIG. 7A is a schematic side view showing an FOV-moving sequence in which a head is moved.
Figure 7B:
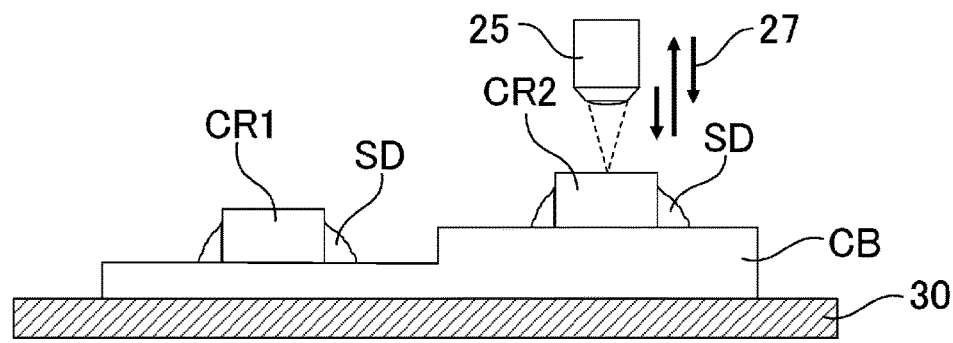
FIG. 7B is a schematic side view showing an FOV-resting sequence.

Such focusing control is now described with reference to FIGS. 7A and 7B. The followable focusing includes an FOV-moving sequence and an FOV-resting sequence. In the FOV-moving sequence, one type of focusing control is performed during movement of an observation FOV. In the FOV-resting sequence, another type of focusing control is performed while an observation FOV is at rest. FIG. 7A is a schematic side view showing the FOV-moving sequence. FIG. 7B is a schematic side view showing the FOV-resting sequence. For ease of explanation, an observation FOV is moved by illustratively moving the objective lens 25 in FIGS. 7A and 7B. Needless to say, movement of an observation FOV is not limited to movement of the objective lens, but an observation FOV is moved by illustratively moving the XY stage. The objective lens 25 can be moved in a vertical direction to roughly follow an external shape of an observation object during movement of an observation FOV and to change a relative distance between a focus position of the objective lens 25 and the stage is changed so that focus positions are adjusted as shown in FIG. 7A. An arrowed segmented line 26 shows control directions of the objective lens 25 in the FOV-moving sequence. That is, the arrowed segmented line 26 is drawn as a control direction of the FOV changer and a control direction of a relative distance between a focus position of the objective lens 25 and the stage. When movement of an observation FOV is stopped, the sequence will go to the FOV-resting sequence in which auto-focusing is performed to precisely adjust a focus position as shown in FIG. 7B. Auto-focusing precision in the FOV-resting sequence will be higher than in the FOV-moving sequence. Arrows 27 show control directions of a relative distance between a focus position of the objective lens and the stage in the FOV-resting sequence. Users can select a setting in which auto-focusing in the FOV-resting sequence is not automatically performed when movement of an observation FOV is stopped.

(3D Shape Following Mode)

In a 3D shape following mode, height information of the observation object is previously obtained as three-dimensional reference information so that the focusing controller 90 uses the height information to achieve focus. The height information can be obtained by obtaining height image data when a 3D-navigation image is captured as a wide area image, which is captured at a low power. As a result, such a 3D-navigation image that has been previously captured and includes height information is used for auto-focusing in the 3D shape following mode.

Figure 8:
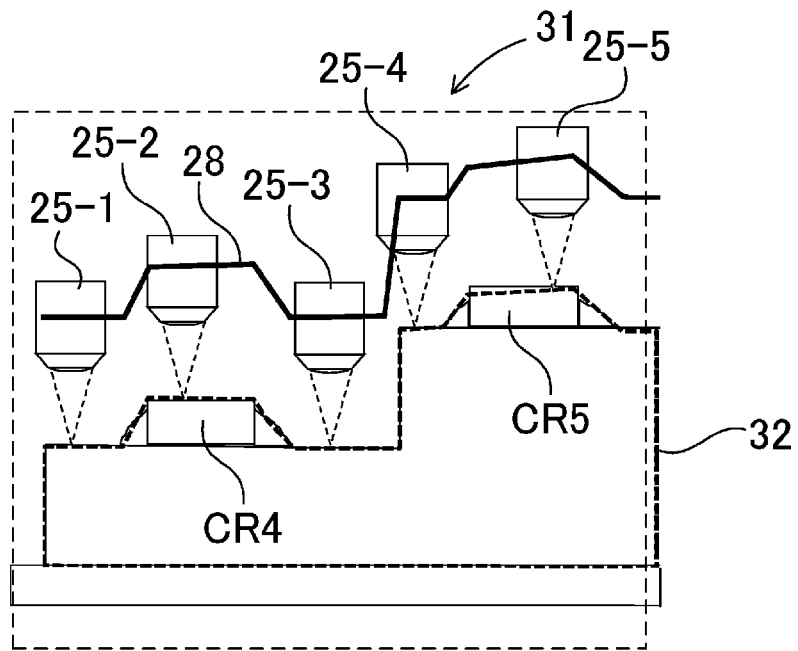
FIG. 8 is a schematic side view showing an FOV-moving sequence in which a 3D-navigation image is stored.

FIG. 8 is a schematic side view showing the 3D shape following mode. In FIG. 8, an observation object, which includes mounted chip resistors CR4 and CR5, is shown with a dashed line box showing an area 31 in which 3D data 32 represented by a thicker dashed line enclosure has been obtained. In the area 31, which includes height information (i.e., the 3D data), the height information is used so that focus positions are adjusted. An arrowed segmented line 28 shows control directions of the objective lens in the area in which the 3D data has been obtained in FIG. 8. If an observation FOV is moved to an area in which 3D data has not been obtained, control of a moving direction of the objective lens will be changed from a basis of the height information to a basis of a focus value. In this area, a moving direction of the objective lens can be performed similar to a normal mode in which normal auto-focusing is performed. Also in the 3D shape following mode, when movement of an observation FOV is stopped, the sequence will go to the FOV-resting sequence. A color of an ROI can be changed depending on whether 3D data has been obtained.

The processor 80 controls focusing of the focusing device based on three-dimensional reference information by adjusting a relative distance between a focus position of the objective lens and an observation object in movement of an observation FOV of the camera. More specifically, in movement of an observation FOV of the camera by the FOV changer, the focusing controller 90 can adjust a relative distance between a focus position of the objective lens and an observation object based on three-dimensional reference information that has been acquired by the height information acquirer 89. In addition, the height information acquirer 89 updates three-dimensional reference information based on height information of an object to be measured that is measured when auto-focusing is performed.

(Offset Function)

Figure 9:
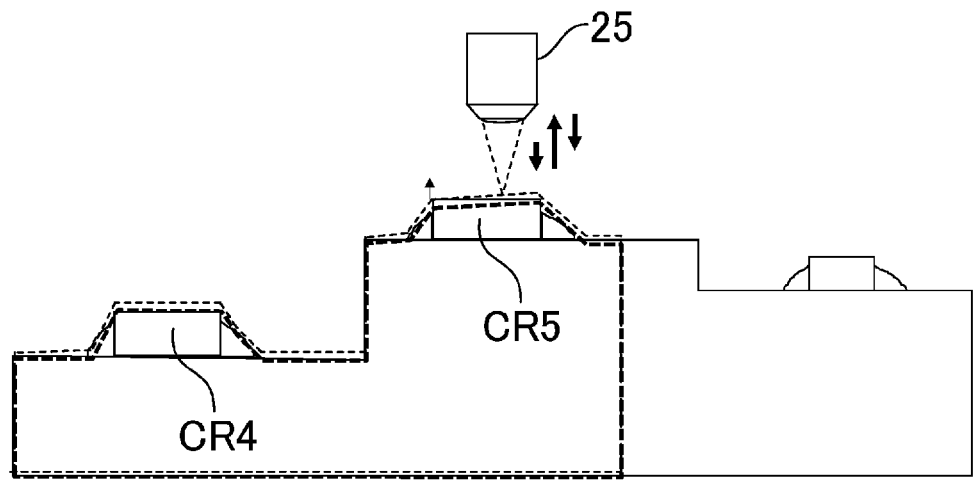
FIG. 9 is a schematic side view showing followable focusing with an offset function.

The 3D shape following mode can further have a function that offsets height of 3D data. The offset function is now described with reference to FIG. 9. In this case, 3D data has been obtained shown by a thick dashed line box similar to FIG. 8. If movement of an observation FOV is stopped at a position where its 3D data has been obtained, the movement/rest detector 94 detects the stop of the observation FOV, and an automatic focusing operation in the FOV-resting sequence will start at this position so that the height information acquirer 89 acquires height information. The height information acquirer 89 calculates an offset amount of 3D data that gives agreement between a height of this position in the 3D data and the height information acquired. As a result, the height information acquirer 89 can offset the 3D data in accordance with the offset amount.

Height information of 3D data that is obtained as discussed above can be used as three-dimensional reference information that includes more accurate surface heights updated of an observation object. Consequently, focusing control can be accurately performed.

In the case in which the illumination controller 66 performs the first sequence, if the offset function is executed, the illumination controller can temporarily switch the illuminator 60 in the FOV-resting sequence into the entire illumination pattern in which all of the illumination blocks of the illuminator 60 are lighted ON, and an auto-focusing operation can be used to acquire height information of the measurement object WK. After the auto-focusing operation is ended, the illuminator 60 can be operated in the first lighting pattern again.

(Flat-Surface Following Mode)

Figure 10A:
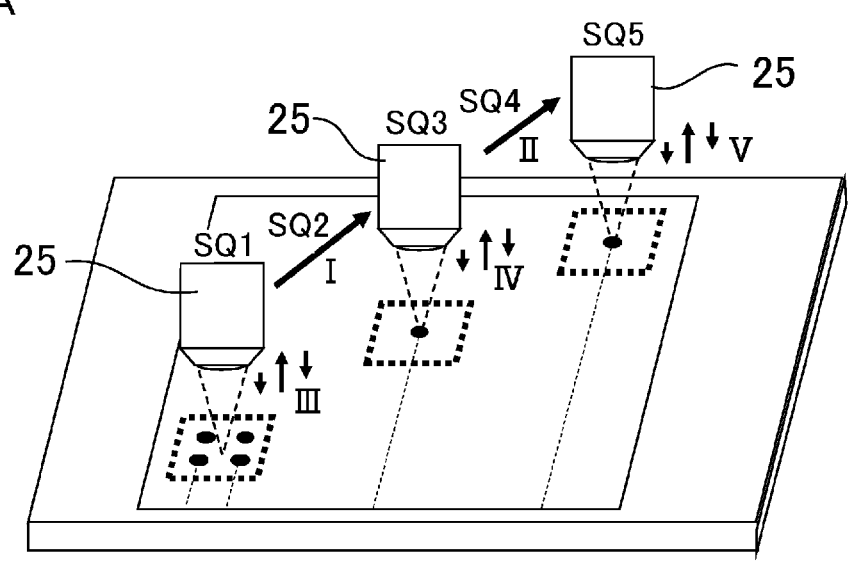
FIG. 10A is a schematic perspective view showing movement of the head in a flat-surface following mode.
Figure 10B:
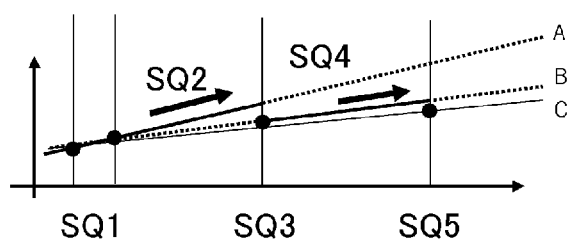
FIG. 10B is a graph showing estimated inclination of a flat surface.
Figure 11:
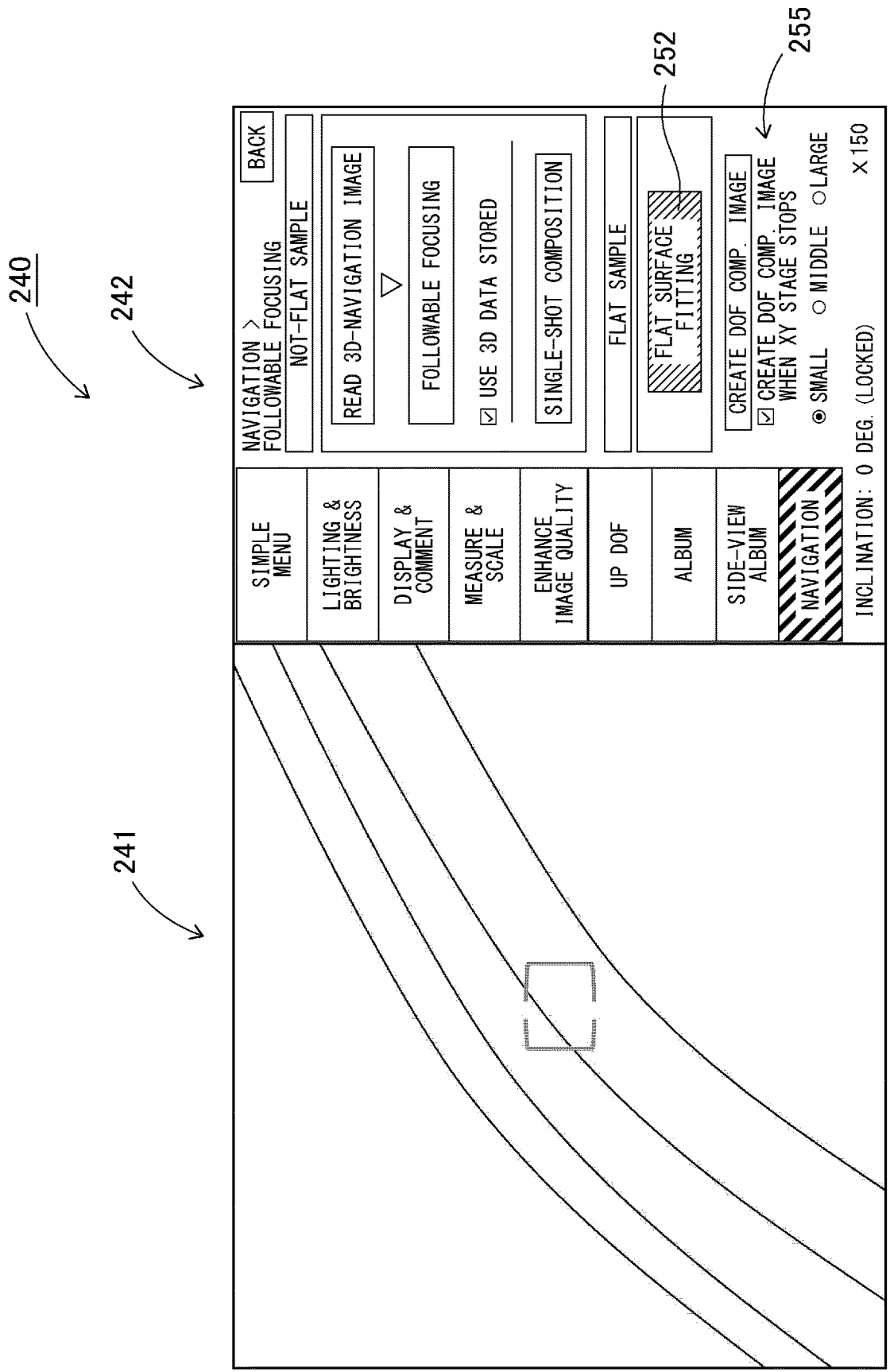
FIG. 11 is a diagram showing a user interface screen displaying a fat-fitting function.
Figure 12A:
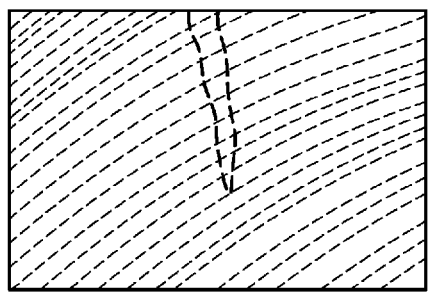
FIGS. 12A to 12D are schematic views showing images of an observation object, which is irradiated with different illumination directions of light, in a search lighting function.
Figure 12B:
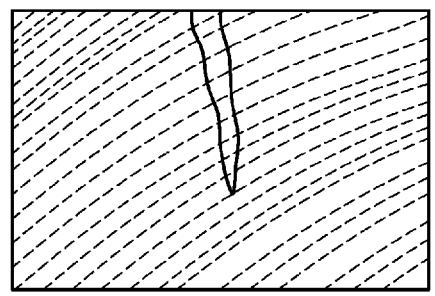
Figure 12C:
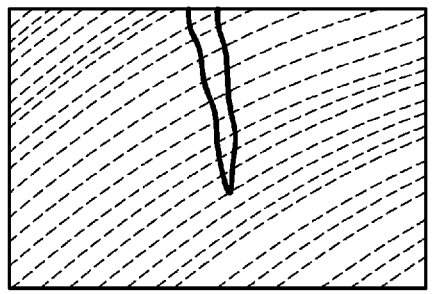
Figure 12D:
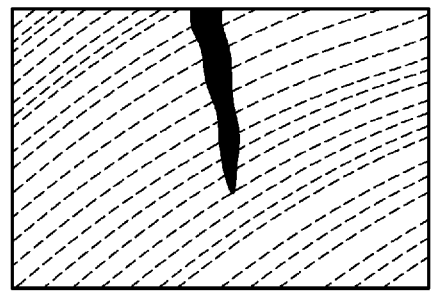

The magnified observation apparatus according to the embodiment has a flat-surface following mode as focusing control. After a plurality of positions are focused on an observation object, if a shape of the observation object in a part focused is identified as a flat surface based on the positions focused, the flat surface is used as three-dimensional reference information so that the objective lens can be moved in the Z direction in accordance with an inclination of the flat surface identified in movement of the XY stage in the flat-surface following mode as shown in FIG. 10A. When the movement of the XY stage is stopped, normal auto-focusing can be performed. In the embodiment shown in FIG. 10A, SQ1 shows multipoint height acquisition (auto-focusing operation) in which heights are acquired at a plurality of points, and SQ3 and SQ5 show height acquisition (auto-focusing operation). SQ2 and SQ4 show FOV-moving sequences. SQ3 and SQ5 further show FOV-resting sequences. For example, users can execute the flat-surface following mode by pressing a "Flat Fitting" button 252, which is arranged in an operator area 242 in a user interface screen shown in FIG. 11. In this case, the flat-surface following mode will start in response to the press on the button. More specifically, heights are acquired at the plurality of point in SQ1, which is shown by a dotted line box, in an observation FOV in FIG. 10A, and the observation object can be identified as a flat surface A as shown in FIG. 10B. Subsequently, the objective lens can be moved to follow the flat surface A, which has been identified in SQ1, in a path of SQ2. An arrow I shows a control direction of the objective lens 25 on the path of SQ2 in FIG. 10A. That is, the arrow I shows a control direction of the FOV changer and a control direction of a relative distance between a focus position of the objective lens 25 and the stage on the path of SQ2. After moved along the path of SQ2, the objective lens 25 is stopped in SQ3. Auto-focusing is additionally performed at a position where the objective lens is stopped so that height information is acquired. Arrows IV show control directions of a relative distance between a focus position of the objective lens 25 and the stage in FIG. 10A. As shown in FIG. 10B, a flat surface B is estimated as updated three-dimensional reference information in accordance with the height information that is acquired in SQ3 in addition to the heights that have been acquired at the plurality of point in SQ1. Subsequently, the objective lens can be moved to follow the flat surface B, which has been identified in SQ3, in a path of SQ4. After moved along the path of SQ4, the objective lens 25 is stopped in SQ5. Auto-focusing is additionally performed at a position where the objective lens is stopped so that height information is acquired. As shown in FIG. 10B, a flat surface C is estimated as updated three-dimensional reference information in accordance with the height information that is acquired in SQ5 in addition to the heights that have been acquired at the points in SQ1 and SQ3. In the flat-surface following mode, when movement of an observation FOV is stopped, auto-focusing is performed so that height is acquired. Accordingly, a flat surface can be newly estimated every when movement of an observation FOV is stopped. The objective lens can be moved in a vertical direction to follow a flat surface that is newly estimated during movement of an observation FOV. Consequently, image focus adjustment, which cannot be performed by conventional magnified observation apparatuses, can be performed even during movement of an observation FOV. It is noted that heights can be acquired at a plurality of points in SQ3 and SQ5 similar to SQ1.

In the case in which the illumination controller 66 performs the first sequence, if the flat-surface following mode is executed, the illumination controller can temporarily switch the illuminator 60 in the FOV-resting sequence into the entire illumination pattern in which all of the illumination blocks of the illuminator 60 are lighted ON, and an auto-focusing operation can be used to acquire height information of the measurement object WK. After the auto-focusing operation is ended, the illuminator 60 can be operated in the first lighting pattern again. In the case in which a check box 255 "Generate Depth Composite Image in Stop of XY Stage" shown in FIG. 11. is checked, the illuminator 60 is operated in the first lighting pattern during movement of an observation FOV, and if a stop of the movement of an observation FOV is detected, the illuminator 60 will be operated in the second lighting pattern in which at least one of illumination directions that are included in the first lighting pattern is selected. A DOF composite image can be generated after the illuminator 60 is operated in the second lighting pattern.

(Frame Skip Function)

The magnified observation apparatus according to this embodiment further has a frame skip function that updates an image on the display only if a newly captured image is more correctly focused than an image that is currently displayed, and does not update the image displayed if not. The Consequently, users can be free from stress that is caused by temporarily misfocused images, which are displayed in conventional magnified observation apparatuses, in an auto-focusing operation that is performed to display a correctly focused image on the display 70. Such temporarily misfocused images can be replaced with an image that has been captured in the auto-focusing operation and is relatively correctly focused.

(Search Lighting)

The magnified observation apparatus according to this embodiment has a search lighting function that automatically changes between different illumination directions. In search lighting, an observation FOV can be moved while illumination light changes between the different illumination directions. The search lighting function can reduce the possibility of overlooking a small flaw or defect in an observation object. The search lighting includes the first sequence in which a part to be displayed of an observation object is moved in the observation FOV while illumination light changes between the different illumination directions, and the second sequence in which a flaw or defect can be easily found or recognized. In the first sequence, a live image of an observation object is displayed on the display 70 while illumination light constantly changes between the different illumination directions. User can see live images to search for a target position on an observation object in an observation FOV. This searching, which changes both the illumination direction and the part to be displayed of the observation object in an observation FOV, allows users to search for a small flaw or defect in the observation object without overlooking. In the second sequence, one of the illuminations direction that is suitable for observation of a flaw or defect, which is found by a user, is selected. After the suitable illumination direction is selected, the change between the different illumination directions is stopped so that a live image is continuously displayed while the observation object is irradiated with illumination light in the suitable illumination direction selected.

For example, the illumination blocks of the illuminator 60 shown in FIG. 4 can be lighted ON/OFF one after another in a zigzag order or a counterclockwise order. FIGS. 12A to 12D are schematic views showing images of an observation object, which is irradiated with different illumination directions of light, in an observation FOV in a search lighting function. Because illumination light changes between the different illumination directions, surface conditions or a flaw in this example can be easily recognized. Shadows of an appearance of such a flaw or irregularities will be changed depending on illumination directions. A suitable illumination direction that allows users to easily recognize such a flaw or irregularities will change depending on surface conditions of an observation object. In the examples shown in FIGS. 12A to 12D, a flaw is unclearly recognized in FIG. 12A but can be clearly recognized in FIG. 12D. For this reason, in the case in which illumination light cyclically changes between the different illumination directions, surface conditions such as a flaw or irregularities can be easily recognized.

It is noted that in the first lighting pattern in which an observation object is irradiated with the different illumination directions of light one after another the observation object is not necessarily irradiated with one of the different illumination directions of light at one time. For example, the observation object can be irradiated with two or more of the different illumination directions of light at one time in the first lighting pattern. As an example, different sets of selected two illumination blocks can be lighted ON one after another. In this case, each set of selected two illumination blocks can be lighted ON at one time. In one specific example, in the embodiment shown in FIG. 4, illumination blocks 63a and 63b can be lighted ON at one time, and the illumination blocks 63c and 63d can be then lighted ON at one time in one cycle. This cycle can be repeated in the first lighting pattern. Also, the first lighting pattern can include the entire illumination pattern in which all of the illumination blocks of the illuminator 60 are lighted ON. The entire illumination pattern can be executed after all of the illumination blocks or all of the sets of selected illumination blocks are lighted ON one after another.

In the case of the ring-shaped illuminator, the illumination blocks are preferably lighted ON/OFF one after another in one direction along its circumferential direction, for example, counterclockwise or clockwise. In this case, an appearance of an observation object will be sequentially changed. As a result, a flaw or the like will be likely to clearly appear.

When one of the different illumination directions is changed to another, the illumination blocks are not instantaneously turned from full power to full shutoff, in other words, illumination intensity change of each illumination block does not show a rectangular wave, but illumination intensity preferably gradually changes. This light control is referred to as diminishing control in this specification. For example, when the illumination block is lighted OFF, its illumination intensity gradually decreases, and when lighted ON, its illumination intensity gradually increases.

In this control, in the case in which not a global shutter CMOS image sensor but a rolling shutter CMOS image sensor is used for the camera 10 to capture an image, moire or so-called flash bands can be avoided in an image. In particular, in the case in which high-power LEDs are used as a light source of the illuminator 60, flash bands will often affect an image. For this reason, the gradual illumination intensity change is effective at avoiding flash bands. Alternatively, an image that is captured not during illumination ON/OFF transition but during a period in which illumination intensity is stable can be displayed.

Figure 13A:
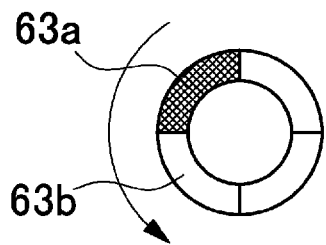
FIGS. 13A to 13D are schematic diagrams showing scenes when one illumination block is changed from ON to OFF while another illumination block is changed from OFF to ON so that a light-ON part moves.
Figure 13B:
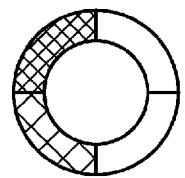
Figure 13C:
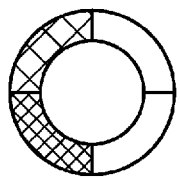
Figure 13D:
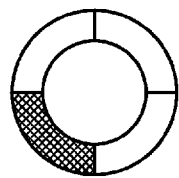

When illumination blocks adjacent to each other are lighted ON/OFF one after another, a light ON period of one illumination block does not exclude a light ON period of another illumination block but the light ON periods next to each other of the illumination blocks preferably partially overlap each other so that overlap periods are provided. This temporal overlap can reduce discomfort to users caused by illumination flicker in ON/OFF change of illumination blocks can be reduced. In addition, in the temporal overlap, illumination intensity change of each illumination block does not show a rectangular wave, but illumination intensity preferably gradually changes as discussed above. For example, when a light-ON part in the illumination blocks moves counterclockwise as shown in FIG. 13A to FIG. 13D, illumination is not directly changed from a scene in which only the illumination block 63a is lighted ON as shown in FIG. 13A to a scene in which only the illumination block 63b is lighted ON as shown in FIG. 13D, but is first changed from the scene shown in FIG. 13A to a scene in which illumination intensity of the illumination block 63a gradually decreases and illumination intensity of the illumination block 63b gradually increases as shown in FIG. 13B. Subsequently, illumination intensity of the illumination block 63b keeps gradually increasing, and illumination intensity of the illumination block 63a keeps gradually decreasing as shown in FIG. 13C so that the light-ON part completely moves as shown in FIG. 13D. As a result, the illuminator can smoothly change between different illumination directions. Consequently, users' visual fatigue can be reduced. In addition, flash bands can be avoided in images even in the case in which a rolling shutter CMOS image sensor is used for the camera 10.

(FOV-Moving Search Lighting)

The search lighting can be performed not only in an observation FOV rest state but also in an observation FOV moving state. In the case in which the search lighting is performed in the observation FOV moving state, a part to be observed such as a flaw and irregularities can be easily recognized.

(Search Lighting Screen 260)

Figure 14:
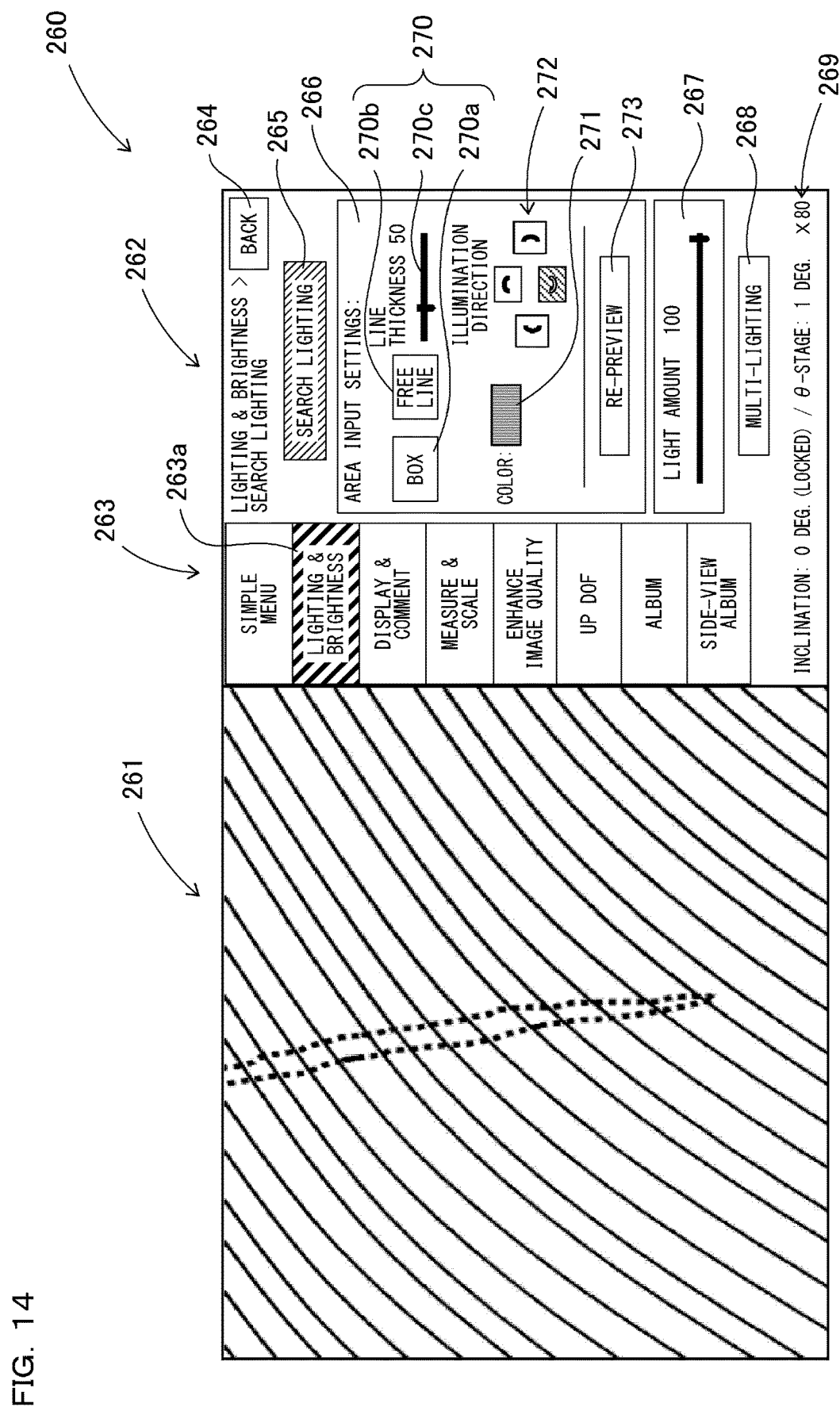
FIG. 14 is a schematic diagram showing a search lighting screen.
Figure 15:
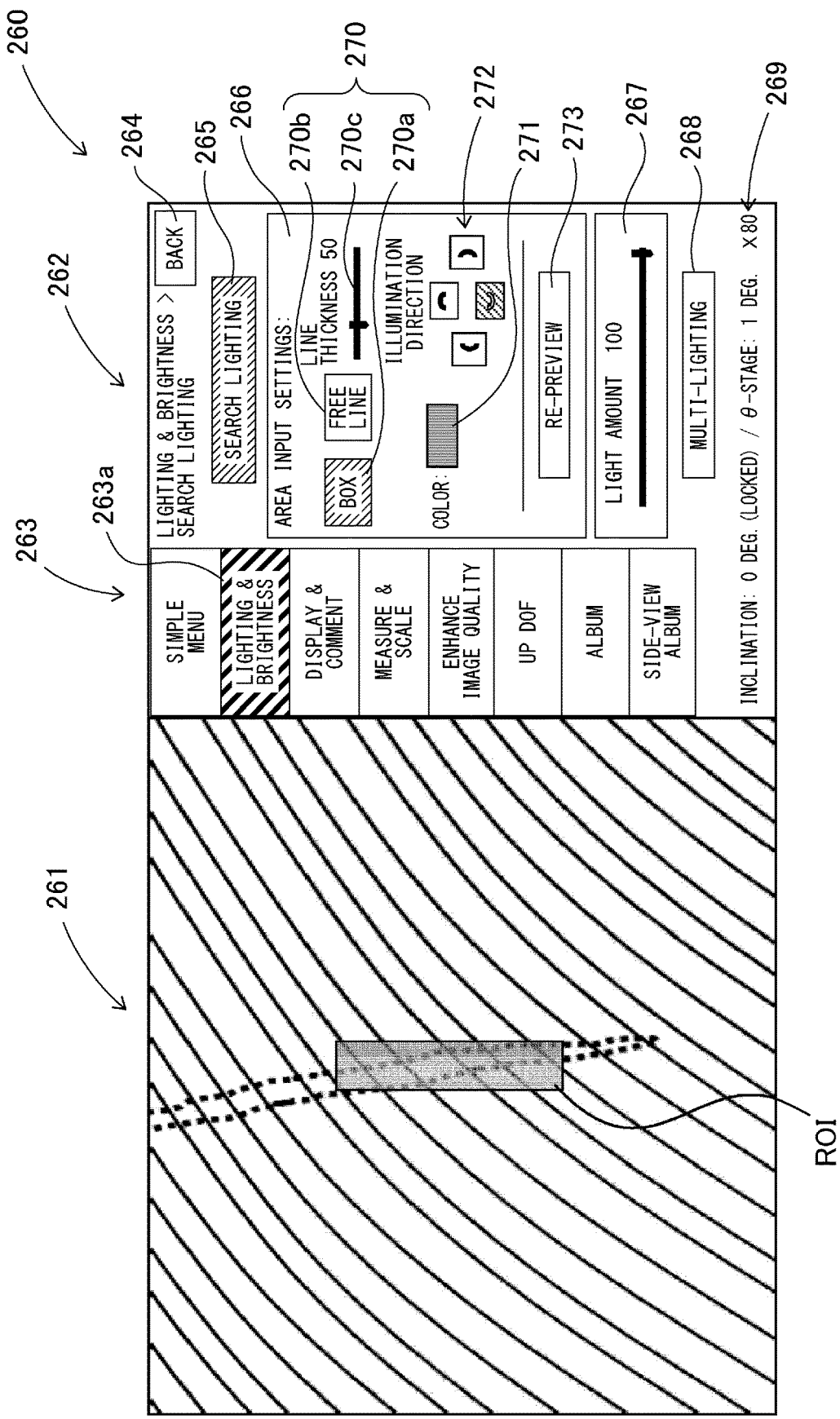
FIG. 15 is a schematic diagram showing another search lighting screen.
Figure 16:
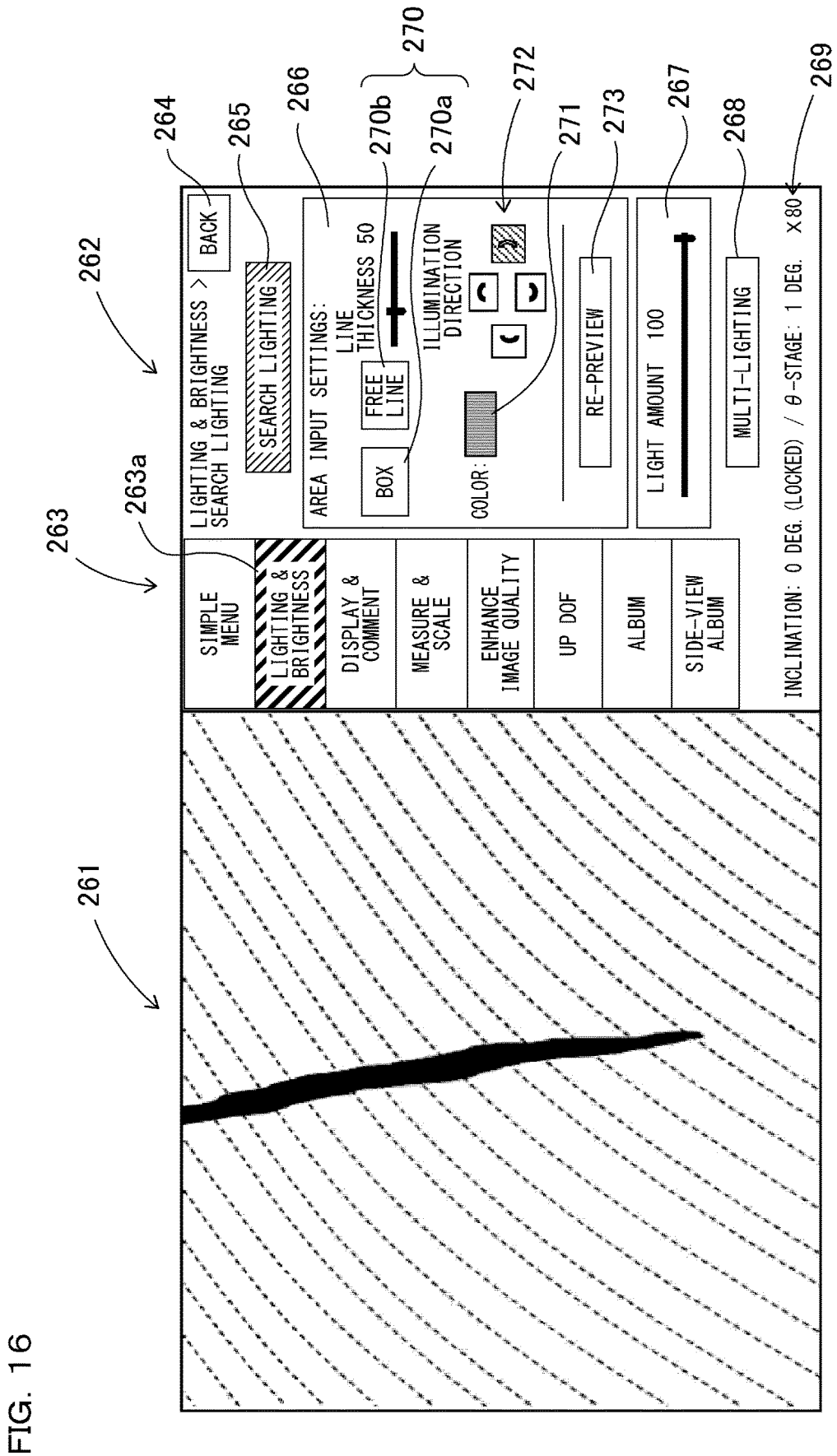
FIG. 16 is a schematic diagram showing still another search lighting screen.

FIGS. 14 to 16 are a schematic diagram showing exemplary search lighting screens 260 as user interface screens in which search lighting settings can be specified. Each search lighting screen 260 includes an image display area 261 in a left aide and an operator area 262 in a right side. An item tab 263 is arranged in a left part of the operator area 262. The item tab 263 includes a plurality of tabs that can change display information of the operator area 262. In the exemplary search lighting screens 260 shown FIGS. 14 to 16, a "Lighting/Brightness" tab 263*a* has been selected.

The operator area 262 includes a "Return" button 264, a "Search Lighting" button 265, a user-specifying box 266, a light-amount adjusting slider 267, a "Multi-Lighting" button 268, a status-indicating bar 269, and the like. The "Return" button 264, which is arranged in an upper right part, allows users to return a top menu screen.

The "Search Lighting" button 265 allows users to move the magnified observation apparatus to an illumination-changing mode in which the illuminator is operated in the first lighting pattern. If a user presses the "Search Lighting" button 265, illumination light cyclically changes between the illumination directions so that an observation object will be irradiated with the different illumination directions of light one after another (cyclic illumination change). If the user presses the "Search Lighting" button 265 again, the magnified observation apparatus will return to a normal illumination mode. If the search lighting function is activated (ON), the "Search Lighting" button 265" is displayed in an active status indication as shown in FIG. 14, etc.

The user-specifying box 266 includes an ROI specifier part 270, a color selector button 271, illumination status indicator buttons 272, a "Re-Preview" button 273, and the like.

The ROI specifier part 270 is an exemplary area specifier, and serves to select how to specify an ROI. In this embodiment, one of "Box" and "Free Line" buttons 270*a* and 270*b* can be selected. If "Box" button 270*a* is selected, the "Box" button 270*a* will be displayed in an active status indication. In this case, if two points are pointed on the image display area 261, the two points define a diagonal line that define a rectangular box boundary so that an ROI can be specified by an area that is surrounded by the rectangular box boundary. If the "Free Line" button 270*b* is selected, the "Free Line" button 270*b* will be displayed in an active status indication. In this case, if a free line segment having a previously determined thickness is drawn along a desired area on the image display area 261, an ROI can be specified by the free line. Also, in this case, the thickness of the free line can be determined by operating a slider 270*c* that is arranged next to the "Free Line" button 270*b*.

The color selector button 271 allows users to select a color of an ROI to be specified. In addition, the illumination status indicator buttons 272 indicate an illumination status. In this embodiment, the illumination status indicator buttons indicate an active illumination direction that is selected from four illumination directions. In the exemplary search lighting screen shown in FIG. 14, a lower illumination status indicator buttons 272 indicates an active status, and means that an image is captured in an illumination pattern in which a lower illumination block is lighted ON and is displayed in the image display area 261. In particular, when the magnified observation apparatus goes to an illuminating mode in which the illuminator is operated in the second lighting pattern, users can visually know which illumination direction is selected.

Furthermore, the "Re-Preview" button 273 allows users to execute cyclic illumination change again after an ROI is specified and an illumination status is determined. The light-amount adjusting slider 267 allows users to adjust an amount of light of illumination light of the illuminator 60. The "Multi-Lighting" button 268 allows users to execute multi-lighting photography. In the multi-lighting photography, images are captured in different illumination statuses so that a composite image is generated. Also, a regenerated composite image can be generated by capturing images in illumination directions that are specified by a user, and be displayed. In the status-indicating bar 269, which is arranged in a lower part of the operator area 262, an inclination angle of a stand, a rotation angle of the θ stage, a scaling factor of the objective lens 25, and the like can be displayed.

(Search Lighting Procedure)

Figure 17:
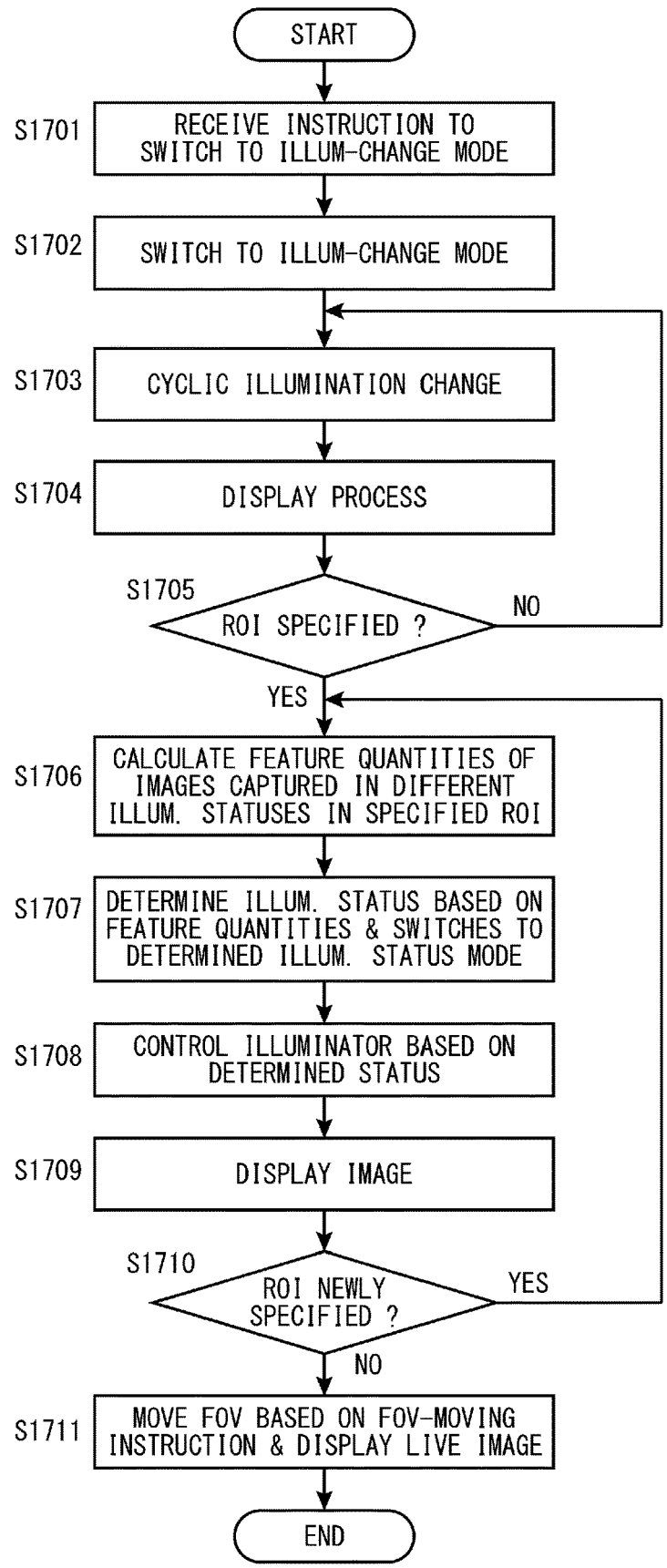
FIG. 17 is a flowchart showing a procedure of the search lighting function.

A procedure of search lighting is now described with reference to a flowchart shown in FIG. 17 and the search lighting screens 260 shown in FIGS. 14 to 16. In Step S1701, an instruction to switch to the illumination-changing mode is received. For example, the instruction can be provided when the "Search Lighting" button 265 is pressed in the search lighting screen 260 shown in FIG. 14. The magnified observation apparatus correspondingly goes to the illumination-changing mode corresponding to the first lighting pattern in Step S1702. Subsequently, the cyclic illumination change is executed in Step S1703. More specifically, a light-ON part moves from one of the illumination block to another so that an observation object is irradiated with the different illumination directions of light one after another. Subsequently, a display process (discussed later with reference to FIG. 18) that displays a live image is executed in Step S1704.

Subsequently, it is determined whether an ROI is specified in Step S1705. The ROI is specified through the ROI specifier part on the search lighting screen 260 shown in FIG. 14, etc. The procedure returns to Step S1703 so that the aforementioned steps are repeatedly if an ROI is not specified. If an ROI is specified, procedure goes to Step S1706 in which feature quantities of image data are calculated correspondingly to a plurality of images that are captured in different illumination statuses in the ROI specified. In this step, the feature quantity calculator 88 calculates the feature quantities of image data corresponding to a plurality of images in the ROI specified. The plurality of images are captured in the different illumination directions, which are changed by the illumination blocks. For example, in the case in which the "Box" button 270*a* is selected in the search lighting screen 260 shown in FIG. 14, when an ROI is specified, the ROI, which is defined by a rectangular box, will be highlighted in a color that is selected through the color selector button 271 in the image display area 261 as shown in FIG. 15. Variances in the area corresponding to the ROI are calculated correspondingly to the plurality of images, which are captured in different illumination directions so that one of the different illumination directions can be selected in accordance with the variances.

An illumination status is determined in accordance with the feature quantities of the images, and the magnified observation apparatus goes to the illuminating mode in which the illuminator is operated to provide the illumination status determined, that is, in the second lighting pattern in Step S1707. In other words, one of the different illumination directions that corresponds to an image having the highest feature quantity is selected, and the sequence goes from the first sequence to the second sequence. Subsequently, the illuminator is operated to provide the illumination status determined in Step S1708. In other words, the second sequence starts so that an observation object is irradiated with the illumination direction selected. Subsequently, an image is displayed in Step S1709. In the exemplary search lighting screen 260 shown in FIG. 16, a right illumination status indicator buttons 272 indicates an active status correspondingly to the illumination direction that is selected in accordance with the feature quantities of the images. The right illumination status indicator buttons 272 in the active status means that an image is captured in an illumination pattern in which a right illumination block is lighted ON and is displayed in the image display area 261. Consequently, an image that is captured in the selected right-side illumination direction is displayed in the image display area 261 shown in FIG. 16, and allows a user to more easily recognize a flaw relative to images shown in FIGS. 14 and 15.

Subsequently, it is determined whether an ROI is newly specified in Step S1710. If an ROI is newly specified (ROI respecification), the procedure returns to Step S1706 in which feature quantities of image data are calculated correspondingly to a plurality of images that are captured in different illumination directions in the ROI newly specified, and the aforementioned steps following the calculation are executed again. ROI respecification can be made by specifying a new ROI in image display area 261 on the search lighting screen 260 shown in FIG. 16, for example. If an ROI respecification is not instructed, the procedure goes to Step S1711 in which an observation FOV is moved in accordance with an observation-FOV-moving instruction and a live image in the observation FOV is displayed. As discussed above, during search lighting in which illumination light changes between the different illumination directions, if an ROI is specified, one of the illumination directions is automatically selected so that a suitable image can be displayed.

(Display Process)

Figure 18:
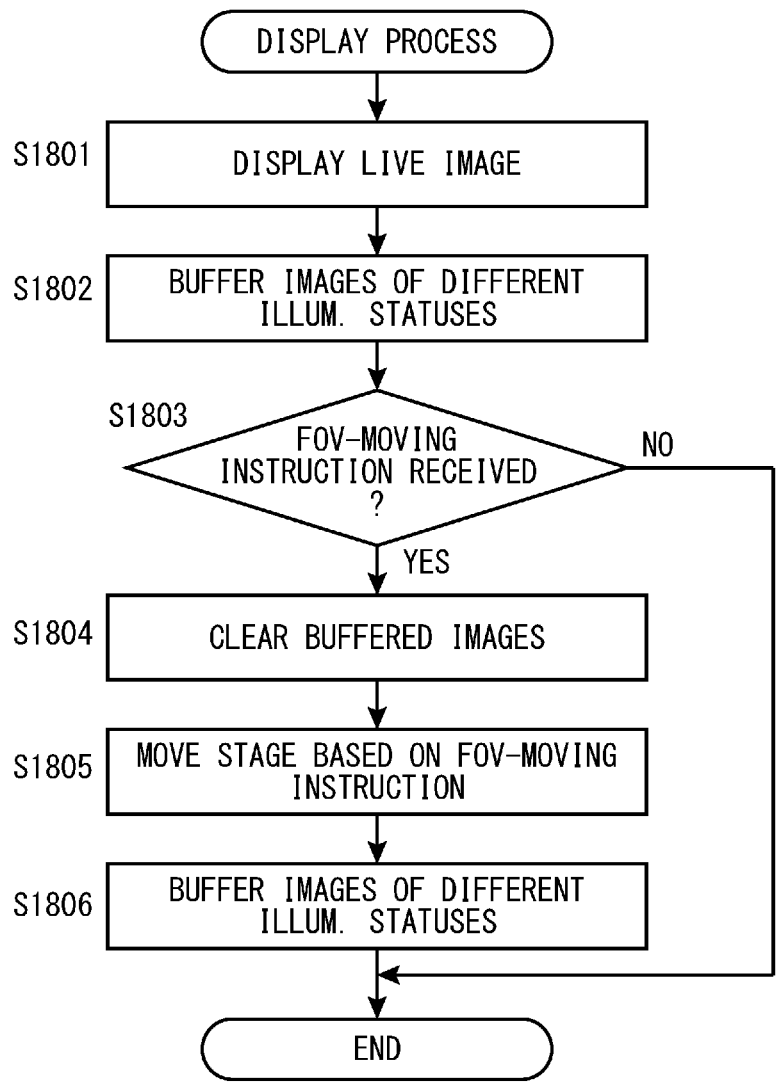
FIG. 18 is a flowchart showing a displaying process of a step S1740 in FIG. 17.

An exemplary live-image display process (Step S1704 in FIG. 17) in the search lighting is now described with reference to a flowchart shown in FIG. 18. In Step S1801, a live image first is displayed. Subsequently, images that are captured correspondingly to different illumination statuses are buffered in Step S1802. In this embodiment, image data corresponding to the images is temporarily stored in the buffer memory 57. Subsequently, it is determined whether an observation-FOV-moving instruction of the field of view is received in Step S1803. If an observation-FOV-moving instruction of the field of view is not received, the display process ends. If an observation-FOV-moving instruction of the field of view is received, for example, if a start of movement of the stage is detected, the process goes to Step S1804 in which the images buffered are cleared. Finally, an observation FOV is moved in accordance with the observation-FOV-moving instruction in Step S1805, and images that are captured correspondingly to different illumination statuses are buffered in Step S1806. The live-image display process is completed as discussed above.

(Followable Focusing Mode Display Process)

Figure 19:
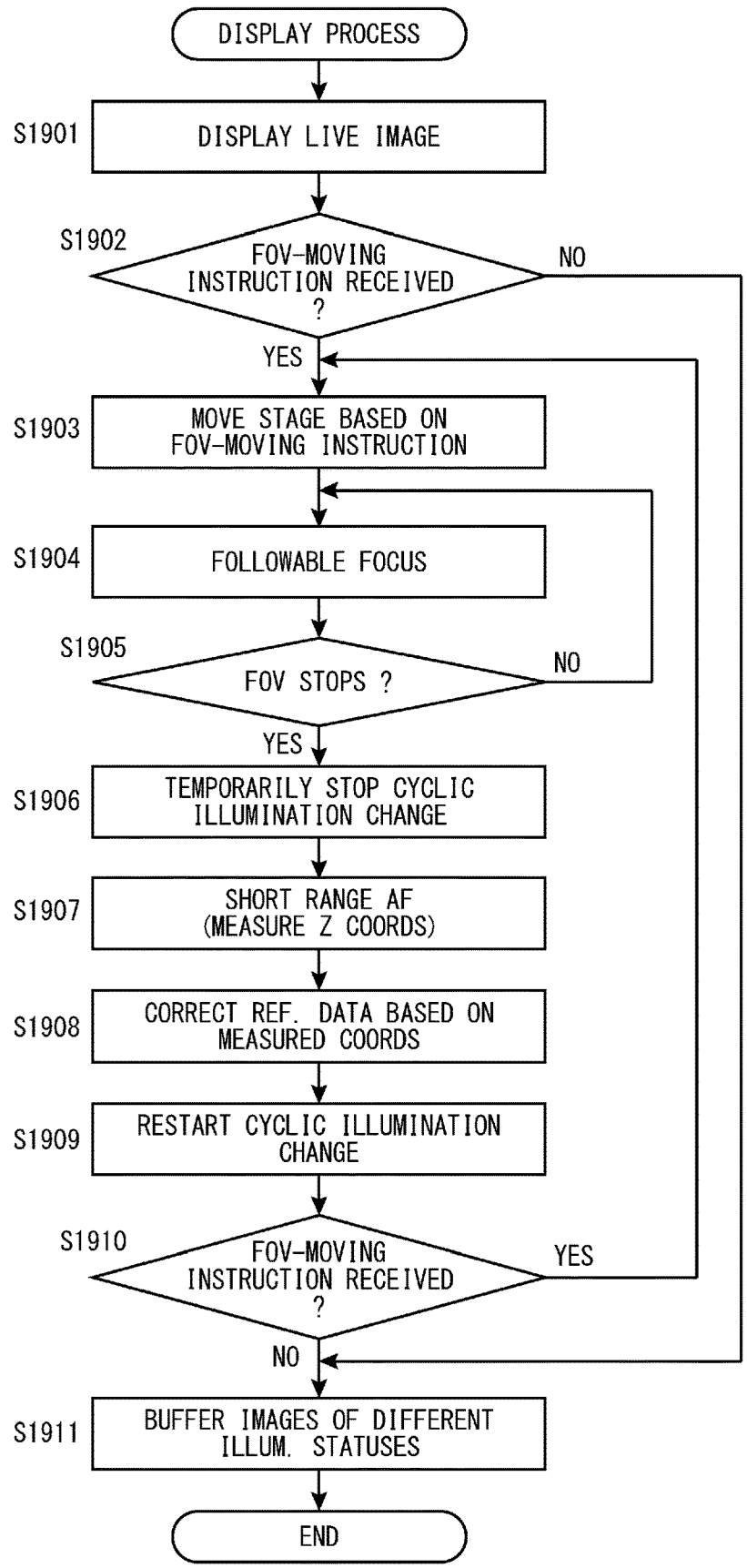
FIG. 19 is a flowchart showing a displaying process of a followable focusing mode.

In addition, image focus can be automatically adjusted in the display process in which a live image is displayed. In the case in which the aforementioned followable focusing mode is activated (ON), an exemplary procedure of displaying a live image is described with reference to a flowchart shown in FIG. 19. In Step S1901, a live image first is displayed. Subsequently, it is determined whether an observation-FOV-moving instruction of the field of view is received in Step S1902. If an observation-FOV-moving instruction of the field of view is not received, the procedure jumps to Step S1911. If an observation-FOV-moving instruction of the field of view is received, the procedure goes to Step S1903 in which an observation FOV is moved in accordance with the observation-FOV-moving instruction. Subsequently, followable focusing is performed in Step S1904. In this embodiment, focusing control is performed based on types of followable-focusing modes (normal mode, 3D shape following mode, flat-surface following mode, etc.). Subsequently, it is determined whether the movement of an observation FOV is stopped in Step S1905. If the movement of an observation FOV is not stopped, the procedure returns to Step S1911 in which followable focusing is continued. If the movement of an observation FOV is stopped, the procedure goes to Step S1906 in which cyclic illumination change temporarily stops. Subsequently, the short range auto-focusing is performed in Step S1907. In this embodiment, heights (Z coordinates) on a measurement object are measured. Subsequently, 3D data is corrected based on the coordinates measured in Step S1908. Subsequently, the cyclic illumination change restarts in Step S1909. Subsequently, it is determined whether an observation-FOV-moving instruction of the field of view is received in Step S1910. If an observation-FOV-moving instruction of the field of view is received, the procedure returns to Step S1903, and the aforementioned steps following Step S1903 are repeatedly executed. If an observation-FOV-moving instruction of the field of view is not received, the procedure goes to Step S1911 in which images that are captured correspondingly to different illumination statuses are buffered. Consequently, the followable-focusing mode display process is performed.

(Gradual Illumination Pattern Change)

A procedure of gradual illumination pattern change, which overlaps light ON periods next to each other of the illumination blocks (overlap control) and gradually changes light amounts of the illumination blocks (diminishing control), is now described with reference to a timing chart shown in FIG. 20. This timing chart illustratively shows a change from coaxial lighting to gradual illumination pattern change search lighting. In the coaxial lighting, all of the illumination blocks of the coaxial light are activated together. As shown in this timing chart, cyclic illumination change, live-image display, and image data buffering are performed in the first sequence. One of the illumination directions is selected to provide suitable observation based on images buffered in the second sequence. During the second sequence, if an ROI respecification is instructed, one of the illumination directions is newly selected based on the images buffered. Also, if cyclic illumination change is instructed, the sequence returns to the first sequence.

In this illustrative timing chart, in order to reduce users' visual fatigue, an illumination pattern of the illumination blocks is gradually changed by the diminishing control, which gradually changes light intensities of the illumination blocks, and the overlap control, which overlaps light ON periods next to each other of two of the illumination directions (temporally overlaps two of the illumination directions).

More specifically, in this exemplary illumination pattern change, the illumination blocks of the ring-shaped illuminator are lighted ON/OFF one after another clockwise, and all of the illumination blocks of the coaxial illuminator are then simultaneously lighted ON. In other words, one cycle of the cyclic illumination change has a light-ON order from the illumination block 63*d* to the illumination block 63*c*, to the illumination block 63*b*, to the illumination block 63*a*, and finally to all of the illumination blocks of the coaxial illuminator. In this case, one cycle can refer to a cycle in which all of the illumination patterns flash on. It is noted that the entire illumination pattern is not necessary included in cyclic illumination change. In addition, an entire light-OFF pattern can be included in cyclic illumination change.

For example, if the "Search Lighting" button 265 is pressed in the user interface shown in FIG. 14, search lighting starts so that the illuminator changes from coaxial lighting to cyclic illumination change in which illumination light cyclically changes between the illumination directions. The cycle of cyclic illumination change is repeated until a stop instruction is provided.

In the diminishing control, illumination intensity gradually changes in activation and deactivation of each illumination block. In addition, a transition period of illumination light of one illumination block partially overlaps a transition period of illumination light of another illumination block. In this embodiment, a decreasing light amount rate of one illumination block that is deactivated corresponds to an increasing light amount rate of another illumination block that is activated so that a change the total light amount is reduced.

It is noted that, in the case in which diminishing control is not performed, light amount change of each illumination block can show a rectangular wave. In this case, overlap control that provides overlap periods is not always required, in other words, a light ON period of one illumination block can exclude a light ON period of another illumination block.

In order to search for a flaw, a live image is displayed during cyclic illumination change on the display 70. Image data is buffered into the buffer memory 57 in a stable-light-amount period of each illumination block in which a light intensity of the illumination block is stable. In other words, image data buffering is not performed in transition periods in which a light amount of each illumination block increases or decreases. In the transition periods, light from one of two illumination blocks overlaps light from another illumination block. For this reason, such light condition in the transition periods is not preferable to determine suitable one illumination direction. Image data that is buffered into the buffer memory 57 is used to determine a suitable illumination direction. Consequently, it is preferable to uniquely associate image data with its corresponding illumination direction.

If an ROI is specified, the sequence goes to the second sequence. In the second sequence, because suitable one of the illumination directions can be selected based on image data that has been buffered, cyclic illumination change stops. Also, image data buffering stops. After selection of suitable one illumination direction, a live image or a still image can be displayed on the display 70. In the second sequence, image data buffering is not performed.

After that, if an ROI respecification is instructed, cyclic illumination change does not start because suitable one of the illumination directions can be newly selected based on the image data buffered. If re-preview is instructed, the same sequence as the first sequence is performed. Users can instruct re-preview by pressing the "Re-Preview" button 273 on the search lighting screen 260 shown in FIG. 14, etc.

Figure 20:
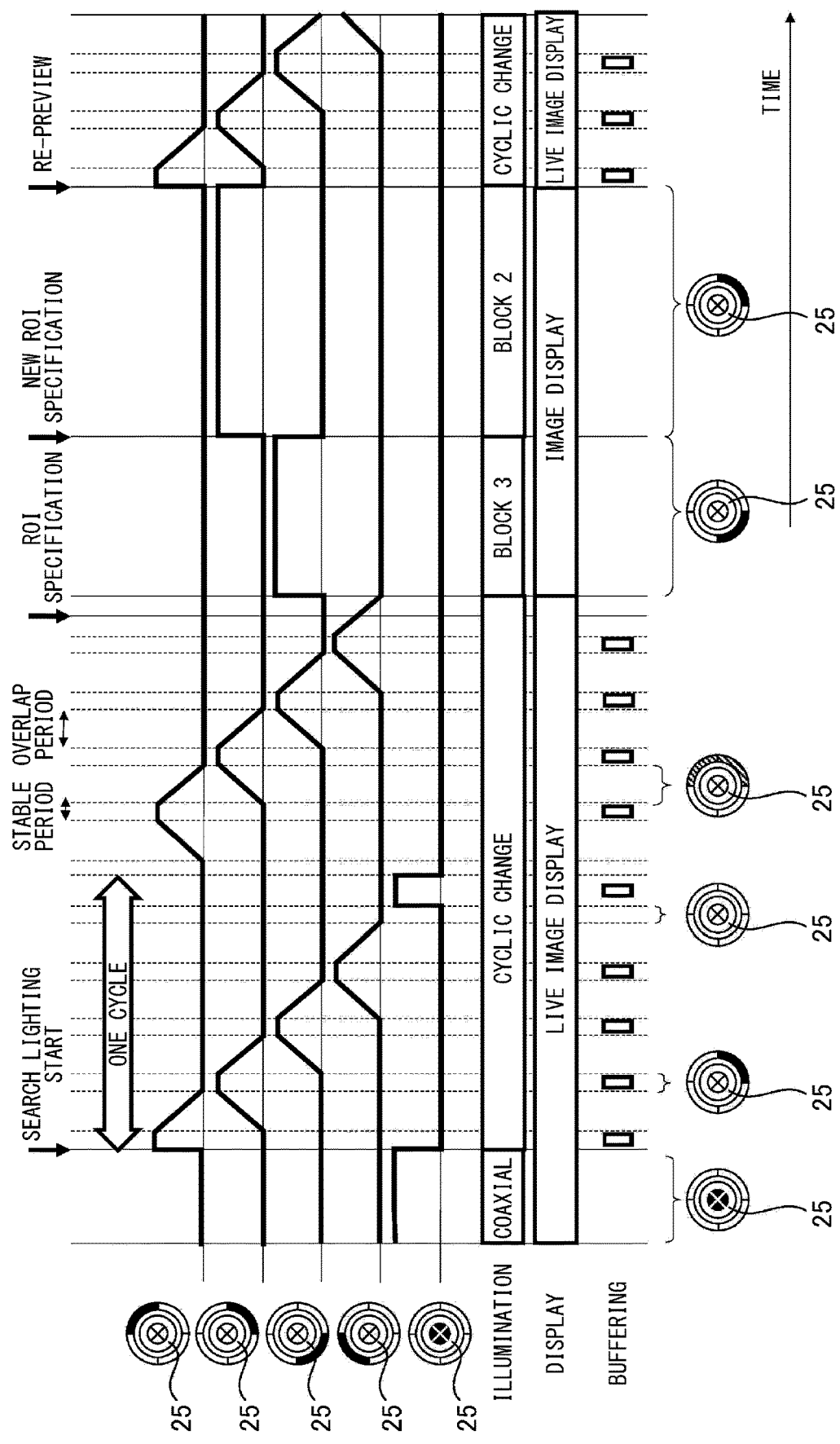
FIG. 20 is a timing chart showing gradual illumination pattern change in search lighting.

In the timing chart shown in FIG. 20, light amount change of each illumination block does not show a rectangular wave but a trapezoidal wave. In the case of a trapezoidal wave, stable-light-amount periods in which a light amount becomes stable can be provided so that image data can be suitably buffered in the stable-light-amount periods. It is noted that, in the case in which diminishing control is not required, light amount change of each illumination block can show a rectangular wave. For example, in the case in which low power light emitting diodes are used as an illumination light source of the illuminator 60, or in the case in which a global shutter CMOS image sensor is used, flash bands will not be produced even by illumination blocks of the illuminator 60 that emit light in a rectangular wave. Also, it is noted that, in the case in which a high speed shutter camera is used, light amount change of each illumination block can show a triangular wave.

In the timing chart shown in FIG. 20, an overlap period is provided when a light-ON part moves from one of the illumination blocks to another illumination blocks so that an observation object is irradiated with light in two illumination directions in the overlap period. However, such an overlap period is not necessarily provided in the present disclosure (as an alternative, no overlap period can be provided), a suitable lighting pattern that does not provide an overlap period can be used depending on an observation target, use and the like.

(FOV-Moving Search Lighting)

Figure 21:
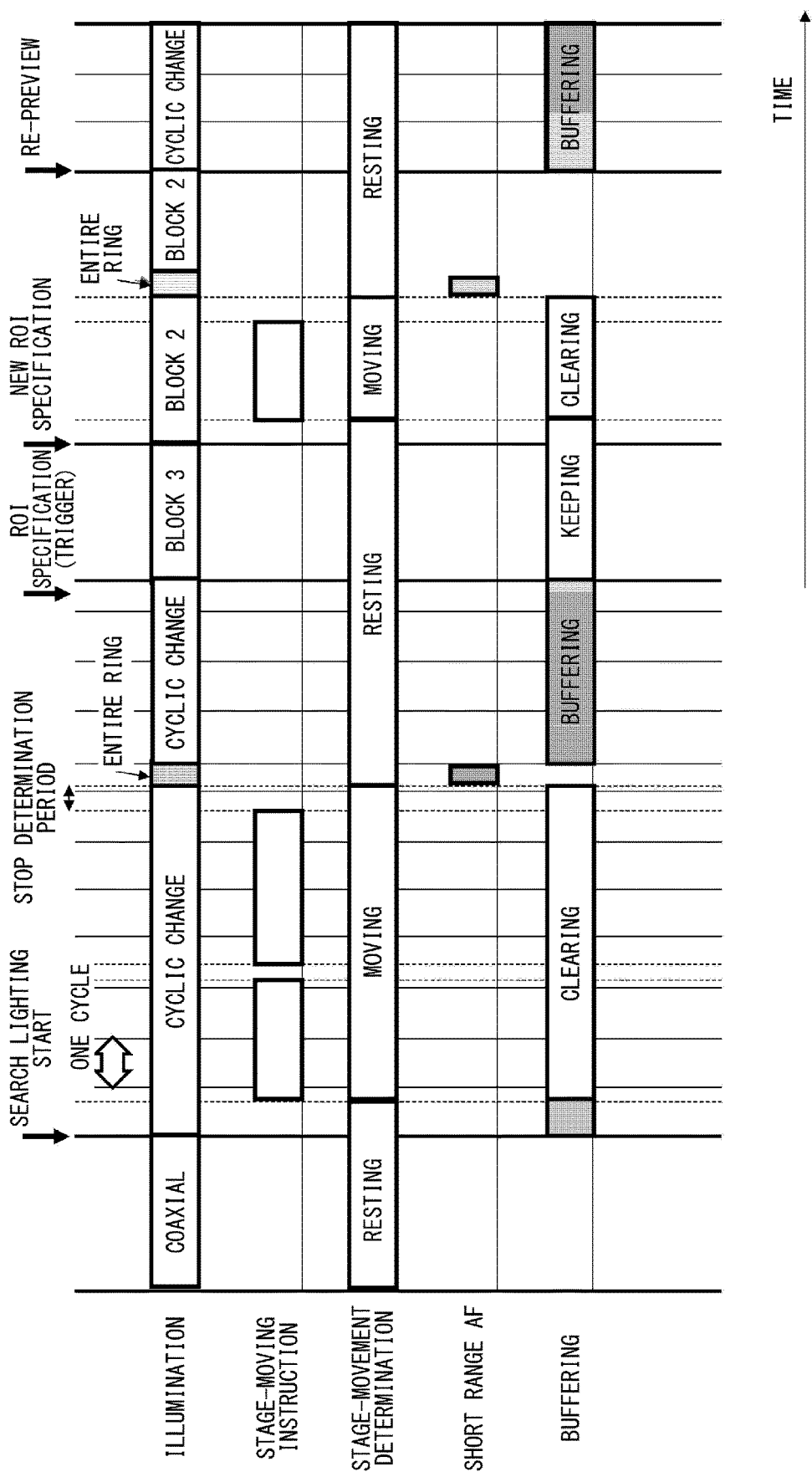
FIG. 21 is a timing chart showing FOV-moving search lighting.

Search lighting in an observation FOV rest state has been illustratively described with reference to the timing chart shown in FIG. 20. In the magnified observation apparatus according to this embodiment, search lighting can be also performed in an observation FOV moving state. The following description describes image data buffering, a relation between ROI specification and image data buffered, and the like in the observation FOV moving state with reference to a timing chart shown in FIG. 21. In the timing chart shown in FIG. 21, one cycle is the same as one cycle that is defined in FIG. 20.

If a stop of movement of an observation FOV is detected, auto-focusing is performed so that an observation object is brought in focus and is then irradiated with the different illumination directions of light one after another (subjected to cyclic illumination change). In the auto-focusing, an image of the observation object cannot be correctly focused under change between the different illumination directions. For this reason, after movement of an observation FOV is stopped, all of the illumination blocks are lighted ON and auto-focusing is then performed. As a result, image data buffering starts so that image data corresponding to images that are in focus can be buffered.

In addition, if an ROI is specified, an illumination pattern is determined based on image data that has been buffered. Even if an ROI respecification is instructed, an illumination pattern is newly determined without additional cyclic illumination change because the image data, which has been buffered, is kept stored. After the illumination pattern is determined, if an observation FOV is moved, auto-focusing is performed without cyclic illumination change in response to a stop of the movement of an observation FOV. The following description will describe an interrelation between operational parts.

The movement/rest detector 94 detects a start and stop of movement of an observation FOV. In this embodiment, an observation FOV is illustratively described to be moved by movement of the XY stage. In control shown in FIG. 21, if a period in which a stage-moving instruction is not detected is shorter a stage-stop determination period, it is determined that an observation FOV (XY stage) is moved so that auto-focusing that is performed at a stop of movement of an observation FOV.

If an observation FOV starts moving, image data that has been buffered before the movement is cleared from the buffer memory 57. Image data of image to be displayed is updated every when an observation FOV is moved. For this reason, image data of images that were captured cannot be used. In the image data clearing, all image data buffered is cleared immediately after an observation FOV starts moving, and image data will not be buffered after the observation FOV starts moving, for example. Alternatively, image data can be repeatedly buffered and cleared to abandon the image data buffered after the observation FOV starts moving.

If it is determined that movement of an observation FOV is stopped, auto-focusing is first performed so that the observation object is brought in focus. In the auto-focusing, an image of the observation object cannot be correctly focused under change between the different illumination patterns. For this reason, the change between the different illumination directions stops in auto-focusing. In this embodiment, the observation object is preferably irradiated in auto-focusing with light in the entire illumination pattern in which all of the illumination blocks are lighted ON. The entire illumination pattern brightly illuminates the observation object to increase subject brightness so that its image can be precisely focused. If an image of the observation object is correctly focused by auto-focusing, cyclic illumination change and image data buffering starts. As discussed above, image data buffering is performed in an observation FOV rest state.

If an ROI is specified, the specification of an ROI serves as a trigger that starts a switch of the sequence from the first sequence to the second sequence. That is, if an ROI is specified, one of the illumination directions is selected and fixed, and image data that has been stored in the buffer memory 57 will not be updated so that the image data, which has been stored in the buffer memory 57, is kept stored.

After that, if an ROI respecification is instructed, cyclic illumination change does not start because suitable one of the illumination patterns can be newly selected based on the image data buffered.

After that, if an observation FOV is moved in the second sequence, when the movement of an observation FOV is stopped, auto-focusing is performed after the stop but the selected illumination pattern is kept fixed. Also, image data will not be buffered. For this reason, if an observation FOV is moved in the second sequence, no image data is stored in the buffer memory, in other words, image data buffered does not exist. During absence of image data buffered, if an ROI respecification is instructed, illumination light changes between the illumination patterns so that images are captured correspondingly to the illumination patterns. Subsequently, suitable one of the illumination patterns is determined. Alternatively, an ROI respecification instruction from a user can be unacceptable, and the user can be urged to instruct re-preview.

In this specification, a stable-light-amount period refers to a period in which a light intensity of the illumination block is stable. Image data corresponding to images that are captured in a stable-light-amount period is buffered. A temporal width of a stable-light-amount period is not limited. For example, no stable-light-amount period can be provided. In the case of no stable-light-amount period, light amount change of each illumination block can show a triangular wave or a rectangular wave (no transition period is provided, in other words, no overlap period is provided). Also, an overlap period refers to a period that is provided to reduce users' visual fatigue. A temporal width of an overlap period is not limited. For example, no overlap period can be provided similar to an alternative stated in the description with reference to the timing chart of FIG. 20. A stage-stop determination period refers to a period from the time when movement of an observation FOV is stopped to the time when it is determined that movement of an observation FOV is stopped. The trigger can include specification of an ROI, movement of an observation FOV, an instruction to determine one of the illumination directions suitable for an observation object independent from other conditions, and the like. If such an independent illumination direction determining instruction is provided, feature quantities are calculated based on image data corresponding to images captured so that suitable one of the illumination directions is determined.

(First Lighting Pattern Disabling Control)

In the first sequence in which illumination light cyclically changes between the illumination directions in the first lighting pattern, correct auto-focusing is difficult. Auto-focusing is performed based on subject brightness information of pixels as discussed above. For this reason, if a light amount of illumination light changes in auto-focusing, brightness information cannot be accurately obtained. To address this, cyclic illumination change can be disabled in auto-focusing. For example, in the case in which a stop of movement of an observation FOV automatically activates auto-focusing, illumination light cyclically changes between the illumination directions in movement of an observation FOV, and when the movement of an observation FOV is stopped the cyclic illumination change is stopped so that the sequence goes from the first sequence to the second sequence and auto-focusing is performed. A start and stop of movement of an observation FOV can be detected by the movement/rest detector 94. The sequence can be changed by the illumination controller 66 from the first sequence to the second sequence.

Control that disables cyclic illumination change can be used not only for auto-focusing in a stop of movement of an observation field but also for other processes. For example, in the followable-focusing mode in which auto-focusing is performed during movement of an observation FOV, search lighting can be disabled. Also, cyclic illumination change in the first lighting pattern is stopped in image processing by the image-processing part 84 such as in image coupling that couples images of different observation FOVs, in DOF composite image processing that composes in-focus parts of images captured with different focus heights, and HDR image processing. The reason is that a fixed light amount of illumination light is desired in these types of image processing.

(Flaw Detection Algorithm)

It has been illustratively described that suitable one of the illumination directions is automatically determined based on an ROI when a user specifies the ROI including a flaw or the like. However, the magnified observation apparatus according to the present disclosure is not limited to this. Suitable one of the illumination directions can be determined based on other information. For example, a spatial frequency component is specified to be calculated as a feature quantity of image data. This specification can distinguish a hairline finish surface, which shows a high spatial frequency, between a dent, which shows a low spatial frequency. If a hairline finish surface is extracted based on the spatial frequency components specified, suitable one of the illumination directions that clearly shows the hairline finish surface extracted is determined. If a dent is extracted based on the spatial frequency components specified, suitable one of the illumination directions that clearly shows the dent extracted is determined. A distinctive size, a flaw size, and the like can be specified to extract such a dent or a flaw as well as a spatial frequency component. A distinctive part can be extracted in image data based on the distinctive size or flaw size specified so that suitable one of the illumination directions that clearly shows the distinctive part extracted is determined.

In order to determine the most suitable illumination direction for observation in the different illumination directions, each of feature quantities corresponding to its illumination direction is used. In this specification, a procedure of determining suitable one of the illumination directions based on feature quantities of the image data corresponding to their illumination directions is referred to as a flaw detection algorithm. A variance of subject brightness values of image data can be used as the feature quantity. If an image shows a large variance of subject brightness, the image can be considered to most clearly show such a flaw or the like on an observation object.

Also, a sum of subject brightness difference values can be used as the feature quantity. For example, if an image shows a large sum of brightness difference values each of which is an absolute value obtained by subtracting a brightness value of one pixel from an average of brightness values of all the pixels, the image can be considered to most clearly show such a flaw or the like on an observation object.

Also, a spatial frequency component of an image can be used as the feature quantity. For example, if small and large flaws are included in an ROI that is specified by the area specifier, effects of small and large flaws will cancel out each other. The following detection process can be conceived to avoid this. An ROI is first specified in an original image, and a sum of subject brightness difference values is calculated in this area. This calculation can facilitate detection of a small flaw (corresponding to high frequency component detection). In another calculation, the original image is reduced by one level, and a sum of subject brightness difference values is similarly calculated. This calculation can facilitate detection of an intermediate size flaw. In still another calculation, the original image is reduced by two levels, and a sum of subject brightness difference values is similarly calculated. This calculation can facilitate detection of a large flaw (corresponding to low frequency component detection). This process works similar to process of detecting a flaw while changing an intensity of a smoothing filter. As a result, an image that includes a flaw can be determined.

Also, an object to be detected in an observation object can be specified to determine suitable one of the illumination directions for detection the object to be detected (detection object). A flaw and irregularities such as dust can be included as the detection object. Users can specify one of these detection objects. For example, unevenness information can be obtained based on image data corresponding to images of the observation object WK that is irradiated with illumination light in the illumination directions in the first sequence by calculating data difference between the images to automatically detect such a flaw and irregularities such as dust based on the image data.

If an area such as an ROI is specified, a flaw and irregularities such as dust can be automatically detected based on such image data in the area specified. In the case in which an area such as an ROI is not specified, suitable one of the illumination directions for detection an object to be detected can be automatically determined based on image data corresponding to entire images of the observation object WK that is irradiated with illumination light in the illumination directions in the first sequence or a predetermined area near a center of the entire images that is previously specified as an ROI.

(Multi-Lighting Function)

Figure 22:
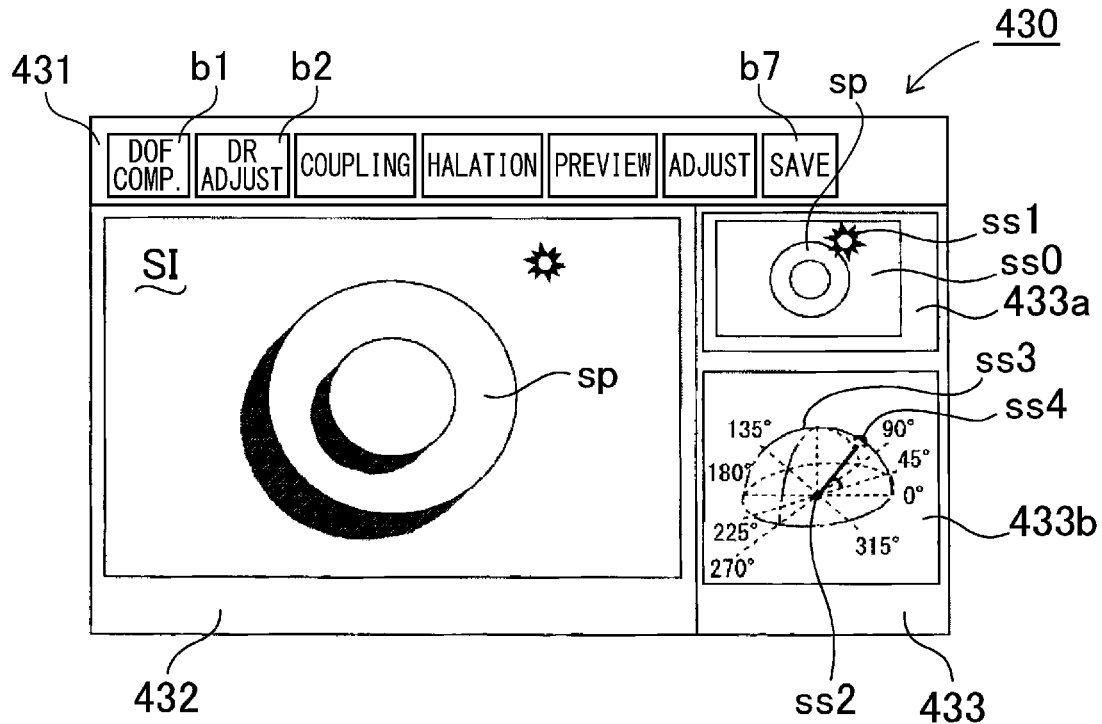
FIG. 22 is a schematic diagram showing a multi-lighting screen.

A multi-lighting function can be executed by pressing the "Multi-Lighting" button 268, which is arranged in the lower part of the operator area 262 in the search lighting screen 260 shown in FIG. 14, etc., for example. FIG. 22 is a schematic diagram showing a multi-lighting screen. This illustrated multi-lighting screen 430 includes a function display area 431, a main display area 432, and a sub-display area 433, which are arranged in upper, left, and right parts of the screen, respectively. A light direction specification box 433*a* and a light direction display box 433*b* are arranged in upper and lower parts of the sub-display area 433, respectively.

Still images of an observation object that is irradiated with illumination light in the illumination directions are captured, and users can select suitable one image that has been captured in suitable one of the illumination directions from the still images in the multi-lighting screen 430. According to the multi-lighting function, users can visually and intuitively select a desired, easily recognizable image without conscious of parameter adjustment settings including illumination direction parameter settings and the like.

The function display area 431 is arranged in the upper part of the multi-lighting screen 430. The function display area 431 includes a DOF composition button b1, a DR adjustment button b2, and a save button b7.

The main display area 432 and the sub-display area 433 are arranged on left and right sides, respectively, under the function display area 431. The main display area 432 has relatively larger area than the function display area 431 and the sub-display area 433. In an initial state, an almost entire part of the main display area 432 displays one of a plurality of images SI that are generated based on original image data corresponding to the latest images that have been captured in the illumination directions (multi-lighting image capture). In the illustrated multi-lighting screen, one image SI of an observation object that is captured in a first directional illumination is displayed in the main display area 432.

The light direction specification box 433*a* and the light direction display box 433*b* are displayed in the sub-display area 433. An object position image ss0 that shows a position of an observation object on the mount surface is displayed in the light direction specification box 433*a*. A light icon ss1 is superimposed on the object position image ss0. The light icon ss1 shows a light-coming position relative to the observation object as viewed from the top side higher than the illuminator 60. In the illustrated multi-lighting screen, a relative positional relation between a target part image sp of the observation object in the object position image ss0 and the light icon ss1 shows a direction of light that comes onto the observation object and results in the image SI displayed in the main display area 432 (hereinafter, referred to as virtual light-coming direction).

Users can move the light icon ss1 of FIG. 22 relative to the target part image sp of the observation object in the object position image ss0 by using the operator device 55 shown in FIG. 1, etc. Consequently, users can know a virtual light-coming position and easily specify a virtual light coming direction. If a user specifies a virtual light-coming direction, the image SI of the observation object that is displayed in the main display area 432 will be updated to a new image SI of the observation object that can be captured on the assumption that the observation object is irradiated with light in the specified light-coming direction.

A reference point image ss2 and a hemisphere image ss3 are displayed in the light direction display box 433*b*. The reference point image ss2 indicates a reference point on the mount surface. The hemisphere image ss3 surrounds the reference point on the stage 30 and is stereoscopically represented. A light-coming position image ss4 is shown on the hemisphere image ss3, and indicates a light coming position corresponding to the virtual light-coming direction specified through the light icon ss1. In addition, a straight line that extends between the light-coming position image ss4 on the hemisphere image ss3 and the reference point image ss2. In the illustrated multi-lighting screen, a direction from the light-coming position image ss4 to the reference point image ss2 indicates the light coming direction specified through the light icon ss1. Users can easily and correctly recognize a virtual light coming direction that is specified through the light icon ss1 by seeing the reference point image ss2, the hemisphere image ss3, and the light-coming position image ss4, which are displayed in the light direction display box 433b. A predetermined plane coordinate system relating to the object position image ss0 displayed in the sub display area 433 shown in FIG. 22 is defined in the magnified observation apparatus 100.

After multi-lighting image capture has been performed, image data of an image SI that is displayed in the main display area 432 is generated based on original image data corresponding to the latest images that have been captured in the illumination directions and a virtual light-coming direction that is specified by a user as discussed above. According to the multi-lighting function, even in the case in which a user continuously changes specification of a virtual light coming direction, image data of some of the latest images corresponding to virtual light coming directions that are specified by the continuous change of a virtual light coming direction can be substantially continuously generated at a rate depending on computing power of a processor. Correspondingly, images SI corresponding to the generated image data of some of the latest images are displayed one after another under the continuous change of a virtual light coming direction as if an image displayed in the main display area continuously changes. As a result, the main display area 432 can display pseudo moving images substantially same as video that is captured if the observation object is continuously imaged under such continuous change of a virtual light coming direction (a moving video picture). Consequently, the user will feel that the observation object is irradiated in real time with light in the light-coming directions specified when seeing the images SI on in main display area 432 while continuously changing specification of a virtual light coming direction. In the multi-lighting screen 430 shown in FIG. 22, the light icon ss1 is superimposed on the object position image ss0, which is displayed in the sub display area 433. The light icon ss1 can be superimposed on the image SI that is displayed in the main display area 432 in addition to on the object position image ss0 in this embodiment.

Figure 23:
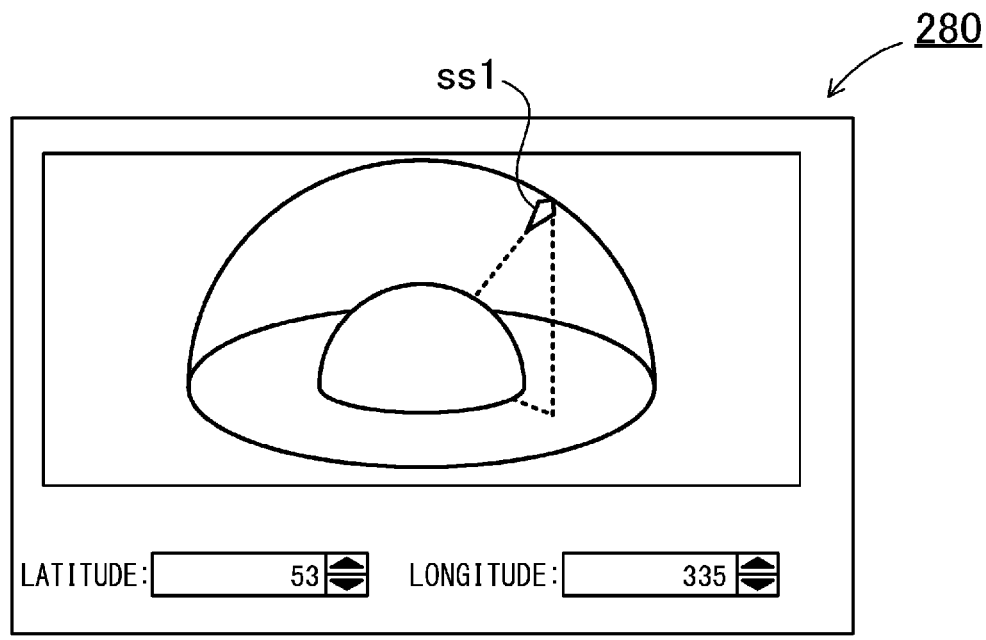
FIG. 23 is a schematic diagram showing an illumination light source indication screen.

Also, an illumination light source display screen 280 shown in FIG. 23 can be separately provided. In this exemplary screen, a position of an illumination light source, which is arranged above the observation object, is displayed as light icon ss1 in three dimensional representation. The user can move the position of the light icon ss1 to a desired position by a mouse click, dragging, or the like so that an illumination direction is actually moved in accordance with the position moved. Such an illumination direction corresponding to a position that is specified through the illumination light source display screen 280 can be realized by the illumination controller 66 by selecting at least one of the illumination blocks and adjusting its light amount. An illumination direction can be specified by the illumination status indicator buttons 272, which are arranged in the user interface screen shown in FIG. 14 to FIG. 16 in addition to as mouse dragging.

Second Embodiment

Figure 24:
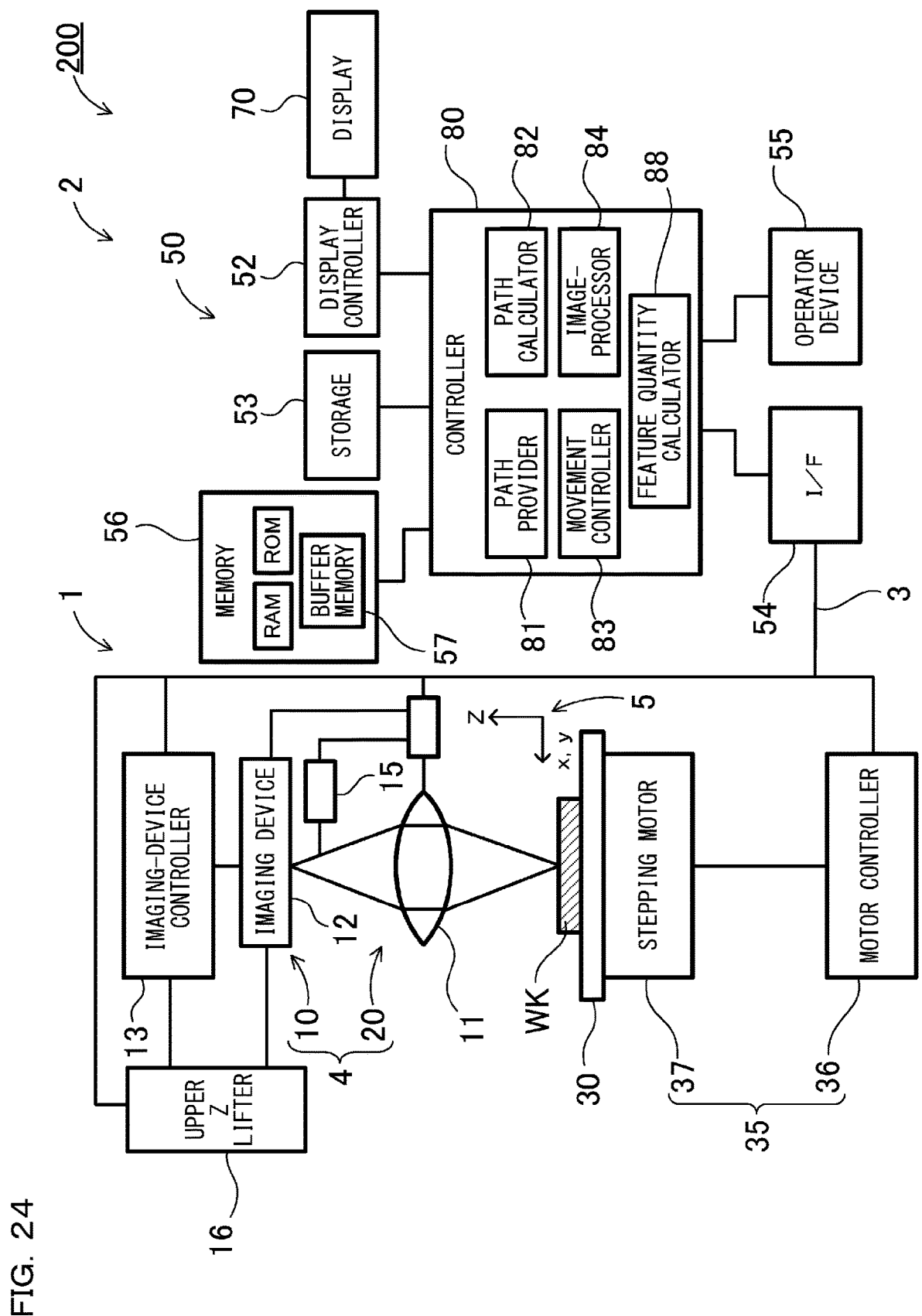
FIG. 24 is a block diagram showing a magnified observation apparatus according to a second embodiment of the present disclosure.

A magnified observation apparatus 200 according to a second embodiment has a route guide function. In particular, in the case in which the route guide function is used together with the search lighting function, FOV-moving manipulation can be simple so that user manipulation loads can be further saved. The magnified observation apparatus 200 according to the second embodiment is now described with reference to a block diagram shown in FIG. 24. The components according to the magnified observation apparatus 200 shown in FIG. 24 similar to the foregoing first embodiment are attached with the same reference signs as the first embodiment, and their description is omitted.

The processor 80 realizes functions of a path provider 81, a path calculator 82, the movement controller 83, the image-processing part 84, the feature quantity calculator 88, and the like. The path provider 81 provides path information about specification of the direction of movement of an observation FOV with respect to an image that is displayed on the display 70. The path calculator 82 calculates a path of movement of an observation FOV based on the path information, which is provided by the path provider 81. The movement controller 83 controls movement of the FOV changer 5 along a field-of-view moving path (FOV moving path) that is calculated by the path calculator 82 in accordance with the direction of movement provided by the moving direction input device 55a. The image-processing part 84 calculates heights of an observation object WK in the optical axis direction corresponding to an area of the observation object WK that is specified by a user based on focus distance information of a part of or all of the area specified that is stored in the storage device 53. The magnified observation apparatus 200 can calculate the average height (depth) in the optical axis direction of the observation object WK corresponding to the area specified by using the imaging device 12.

(Route Guide Function)

Figure 25:
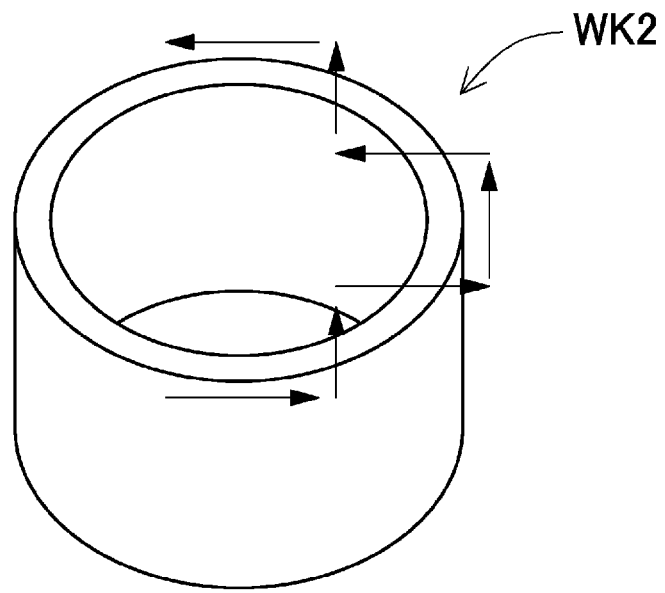
FIG. 25 is a schematic view showing moving directions of a joy stick in the case in which an observation field of view is moved along a rim of a cylindrical workpiece.

The magnified observation apparatus 100 has the route guide function, which helps users to easily move an observation FOV along a route that is previously specified. For example, in the case in which a workpiece WK2 show in FIG. 25 is observed as an observation object, the magnified observation apparatus can be used to observe a burr, flaw, or the like on a circular rim surface of the workpiece WK2. In this case, an observation FOV to be displayed on the display 70 is required to move along a circular rim of the observation object. Correspondingly, the stage 30 is required to be moved to realize such circular movement of an observation FOV.

In digital microscope observation, a high scaling factor is used. For this reason, a certain difficulty level of manipulation is required to move an observation FOV to a target position. In the case in which the stage is manually manipulated, movement in the X axis is typically independent from movement in the Y axis. For example, a typical digital microscope includes X and Y stage-moving knobs that are manipulated by users to move its stage in a desired direction. In such a typical digital microscope, users have to separately manipulate the knobs to move the stage in the X and Y directions. For this reason, large user manipulation loads are required for movement of the stage to a target position. For example, users will alternately manipulate the two knobs to move the stage alternately in the X and Y directions roughly along the circular rim of the cylindrical workpiece WK2 as shown in FIG. 25.

Figure 26:
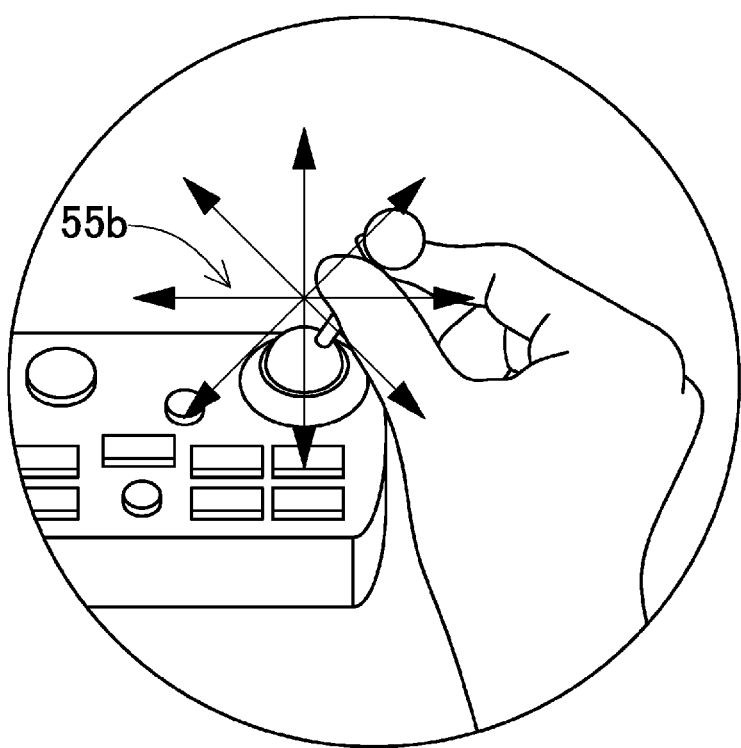
FIG. 26 is a schematic view showing manipulations of the joy stick for moving the stage.

On the other hand, recent, advanced digital microscopes often include an electric XY stage. Such an electric XY stage allows an observation field to more freely move in accordance with manipulation of a mouse or a joy stick shown in FIG. 26 to move a cursor on a screen.

However, in the case of manipulation of a mouse such as dragging and double clicking, users are required to continuously manipulate the mouse if moving an observation field for a long distance.

Also, in the case in which a joy stick or the like is used to continuously move an observation field, the observation field cannot be moved strictly along the circular rim of the observation object but can be moved in a zigzag to follow a desired route as shown in FIG. 25. Users will necessarily continuously concentrate on manipulating the joy stick to follow the desired route while an observation field is moved in a zigzag. Such concentration causes stress on users.

Also, an image-coupling function of coupling images of different observation FOVs that are previously captured can be used to observe an interest part of the observation object after the image-coupling function. However, in such an image-coupling function, it takes a long time to specify an image capture area and then to complete image capture. Even if a user needs to see whether a burr is left on the interest part, the load of specifying an image capture area, and then capturing and saving images many times will be large for the user.

Figure 27:
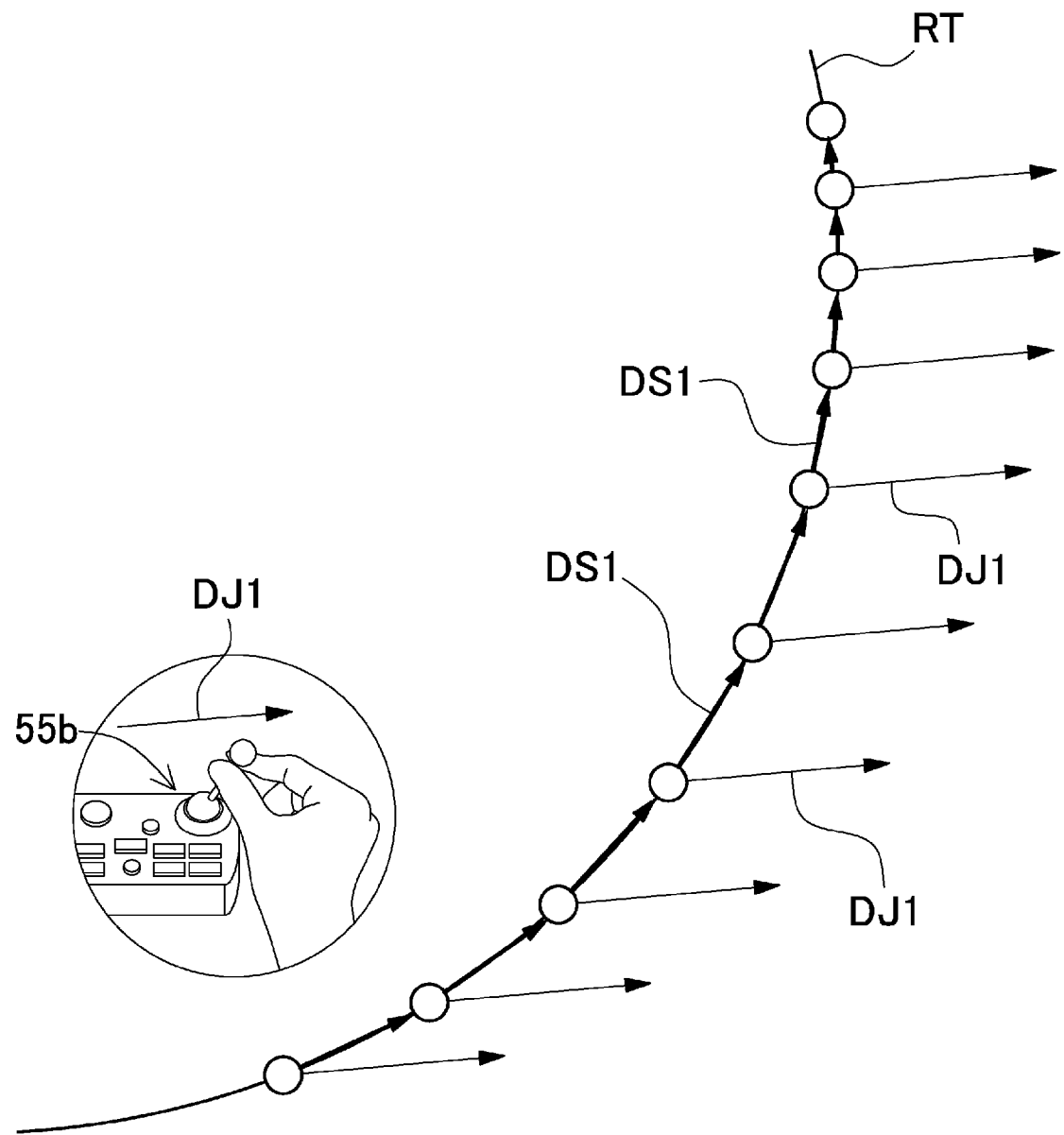
FIG. 27 is a schematic diagram showing a tilt of the joy stick and moving directions of an observation field of view in a route trace mode.

The magnified observation apparatus 100 according to this embodiment has a route trace mode. In the route trace mode, a target route for movement of an observation field is previously specified. When the movement of an observation FOV is actually directed by the moving direction input device 55a, an observation FOV can be changed to follow the route specified by controlling movement of the FOV changer 5. In the case in which the route trace mode is executed, a user can move an observation FOV along the target route only by specifying a direction of the route by manipulating the moving direction input device 55a even if the route is complicated. As a result, such manipulation of moving the stage 30 and the like will not be a burden on the user. Consequently, the user can concentrate attention on observation. In the case of the joy stick shown FIG. 26, a circular route RT is previously specified as shown in FIG. 27 to follow the circular rim of the cylindrical workpiece. After that, the user can move an observation FOV along a circle corresponding to the circular rim only by tilting the joy stick 55b as the moving direction input device 55a roughly rightward. Arrows DJ1 in FIG. 27 indicate a tilt direction of the joy stick 55b. In a conventional digital microscope, if a user does not gradually change a tilt direction of the joy stick 55b from a rightward direction to an upward direction to follow tangential directions DS1 of the circular route, an observation FOV cannot be moved along the circular route. Contrary to this, in the magnified observation apparatus 100 according to this embodiment, in the case in which the route trace mode is executed, when the user only keeps tilting the joy stick 55b in the direction DJ1 as shown in FIG. 27, the stage 30 can be moved along the circular route, in other words, in its tangential directions DS1. That is, when the optical axis AX of the objective lens 25 is moved along the circular rim as shown in FIG. 27, in other words, in tangential directions DS1 representing an arc, users are not required to gradually change a tilt direction DJ1 of the joy stick 55b in accordance with a position on the circular rim above the mount surface of the stage 30. Actual moving direction DS1 of the stage 30 is allowed disagree with a tilt direction DJ1 of the joy stick 55b under control in the route trace mode as discussed above.

Figure 28:
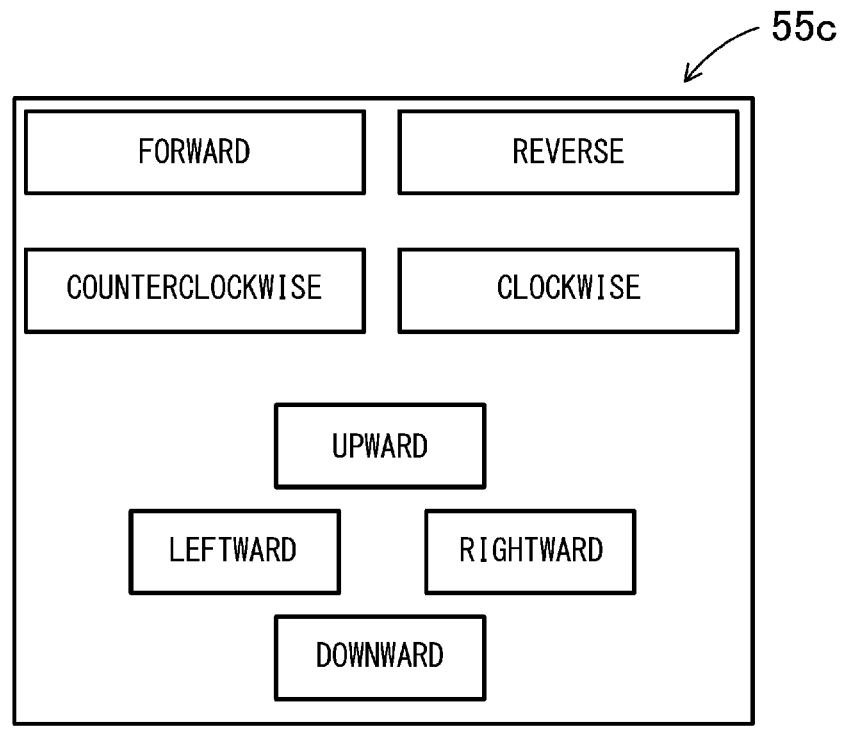
FIG. 28 is a schematic diagram showing an exemplary moving-direction input device that includes buttons to be manipulated.
Figure 29:
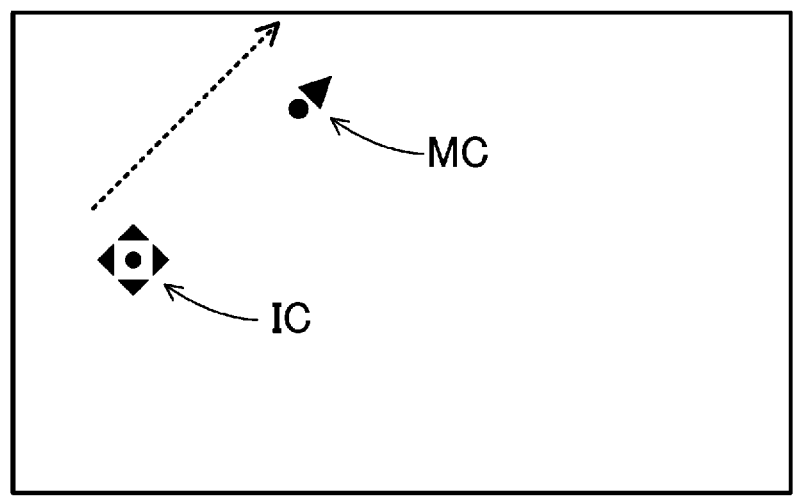
FIG. 29 is a schematic diagram showing an exemplary moving-direction input device that is realized by a mouse to be manipulated.

The manipulation of moving the stage is limited to manipulation by the joy stick 55b. For example, move buttons 55c can be virtually or physically provided as shown in FIG. 28. The move buttons 55c includes forward and the reverse buttons, clockwise and counterclockwise buttons, leftward and rightward buttons, and upward and downward buttons. Users can move the stage by manipulating these buttons. In the case in which a mouse that includes a wheel button is used as the moving direction input device 55a, when a user clicks the mouse wheel, an icon IC can be displayed as shown in FIG. 29. After that, if moving a mouse cursor MC that indicates a moving direction of a field of view, the user can specify the moving direction of an observation FOV similar to the joy stick.

An FOV moving path that is calculated by the path calculator 82 can include a curve. In this case, curved movement of an observation FOV, which is a burden in a typical digital microscope, can be easily performed. Also, an FOV moving path that is calculated by the path calculator 82 can include a polygonal chain. In this case, an observation FOV can be easily moved along a polygonal chain. Such polygonal chain movement, which is not straight movement, is a burden in a typical digital microscope.

(Movement Controller 83)

The movement controller 83 can change control of the FOV changer 5 between the route trace mode and a free mode. In the route trace mode, an observation FOV is moved along an FOV moving path that is calculated by the path calculator 82 by control of the FOV changer 5 in accordance with a direction by the moving direction input device 55a. In the free trace mode, an observation FOV is moved by control of the FOV changer 5 in a moving direction that is directed by the moving direction input device 55a irrespective of an FOV moving path. Consequently, users can easily move an observation FOV along an FOV moving path in the route trace mode, and can freely move an observation FOV in the free mode.

Figure 30A:
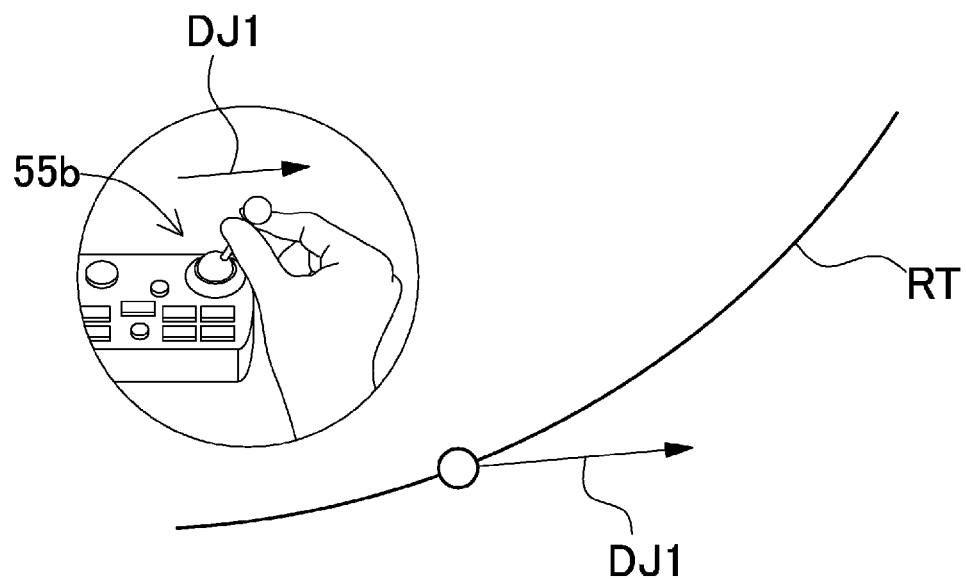
FIGS. 30A and 30B are schematic views showing a relation between a field-of-view moving path and a manipulation for controlling a moving direction.
Figure 30B:
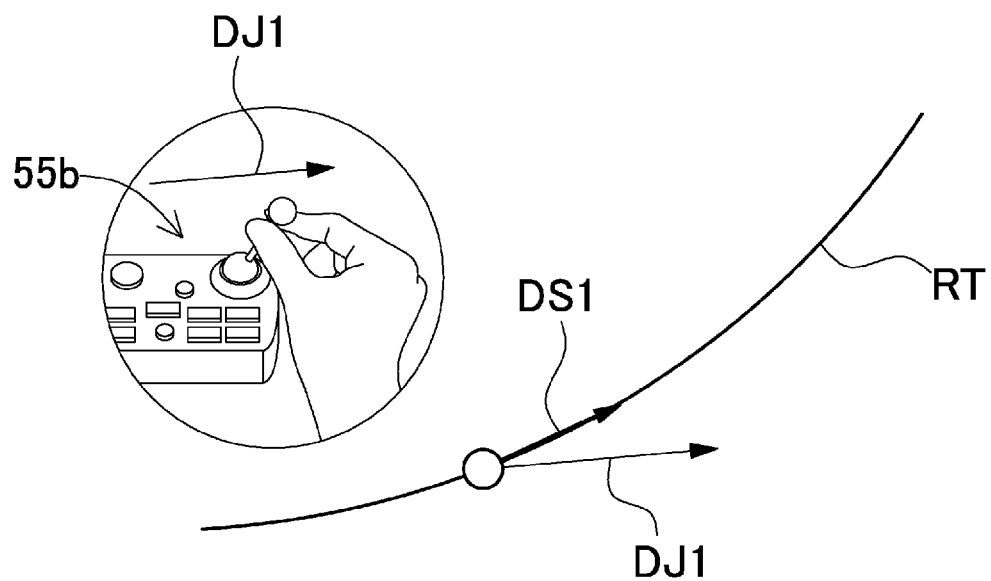

The movement controller 83 previously predicts positional change of an observation FOV on an FOV moving path to smoothly move a field-of-view moving feature such as the stage 30 along the FOV moving path in accordance with a moving direction that is directed by the moving direction input devices 55a such as the joy stick 55b whereby smoothly moving an observation FOV. More specifically, the movement controller 83 calculates a predicted reach point in accordance with a sampling period at which a moving direction DJ1 (i.e., moving command) directed by the joy stick 55b or the like is monitored in addition to a moving direction DS1 and a moving speed of the stage 30 or the like as shown in FIG. 30A. Subsequently, the movement controller 83 searches the closest point on the FOV moving path with respect to the predicted reach point calculated, and corrects the moving direction DS1 and the moving speed of the stage 30 or the like to move an observation FOV toward the closest point searched as shown in FIG. 30B. As a result, an observation FOV can be smoothly moved even along a curved FOV moving path.

Figure 31:
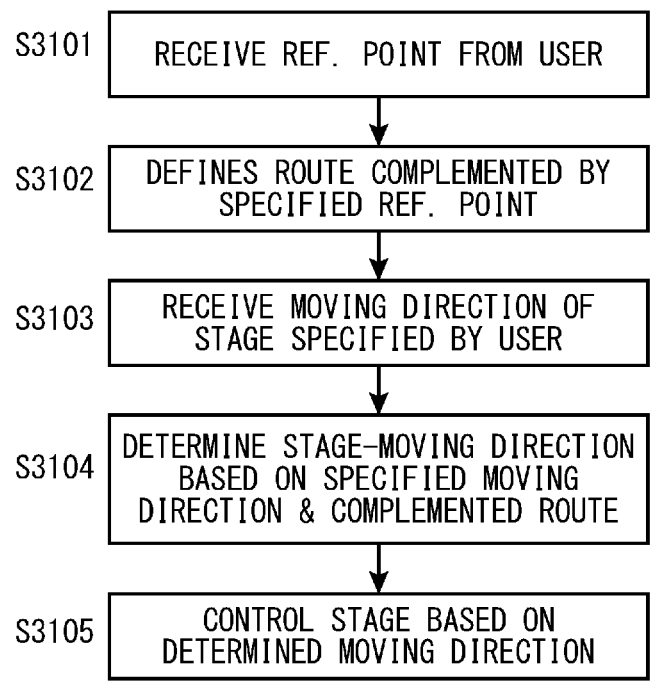
FIG. 31 is a flowchart showing a magnified observation method that realizes a route guide function.

A magnified observation method that realizes the route guide function is now described with reference to a flowchart shown in FIG. 31. A user first specifies path information about moving directions of an observation FOV in Step S3101. For example, the path provider 81 receives reference point specification as the path information from the user.

Subsequently, in Step S3102, the path calculator 82 calculates an FOV moving path based on the path information. For example, the path provider 81 defines a route that is complemented by the reference point, which is specified by the user. A direction of movement of the stage 30 specified by a user is received in Step S3103. Subsequently, a moving direction of the stage 30 is determined based on the direction of movement specified and the route complemented in Step S3104. Finally, in Step S3105, the stage 30 is controlled based on the moving direction determined.

(Path Provider 81 and Path Calculator 82)

The path provider 81 provides path information about specification of moving directions of an observation FOV. The path calculator 82 calculates a path of movement of an observation FOV (i.e., route) based on the path information, which is provided by the path provider 81. An example of the path information can be provided by a plurality of reference points. The path calculator 82 calculates a route that passes through a plurality of reference points that are provided by the path provider 81. For example, in the case in which the route is a circle, three points are specified as reference points on the circle. Also, in the case in which a route is defined by straight line segments, start and end points of the line segments, or a start point, vertices and an end point of a line as the reference points. The path provider 81 and the path calculator 82 can be separately or integrally provided.

The path provider 81 and the path calculator 82 can prepare predetermined geometric shapes to which a route is approximated. That is, a user previously selects one of the predetermined geometric shapes and specifies points that pass on the geometric shape selected through the path provider 81 so that the path calculator 82 will calculated a route. Examples of the geometrical shapes can be provided by a circle, an ellipse, a rectangle, a polygon, a star, a straight line, a line segment, a curve such as an arc, and the like. The geometric shapes are not limited as long as can be represented in a two-dimensional flat plane. A circle, an ellipse, and a Bezier curve can be specified by three or more points. A polygon such as a rectangle can be specified by vertices.

Figure 32C:
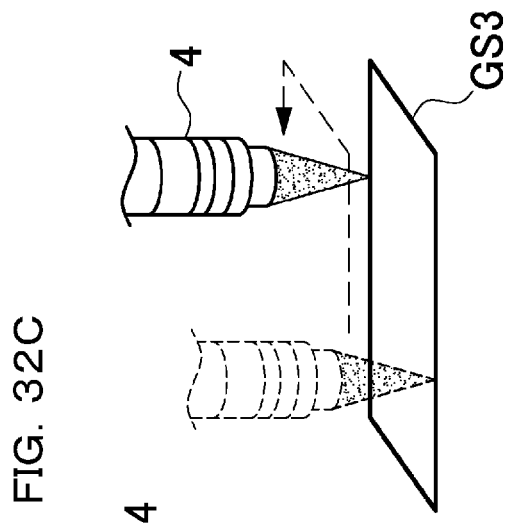
FIGS. 32A to 32F are perspective views showing exemplary geometric shapes, which specify routes.

Users can select from among the geometric shapes through a geometric shape selector, and specify reference points through a reference point specifier. For example, in the case in which a user selects a straight line or line segment as a geometric shape GS1, the user can specify two points as the reference points on the display 70 as shown in FIG. 32A. As a result, a straight line or line segment that passes the two points can be calculated as a route. Here, the head 4 is illustratively shown to move with respect to the stage 30 for ease of explanation.

Figure 32B:
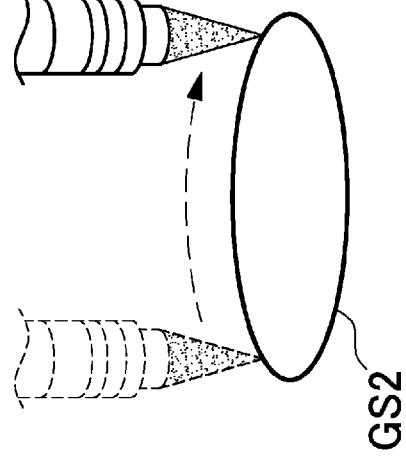
Figure 32A:
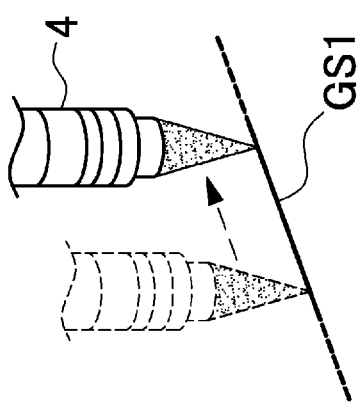
Figure 32F:
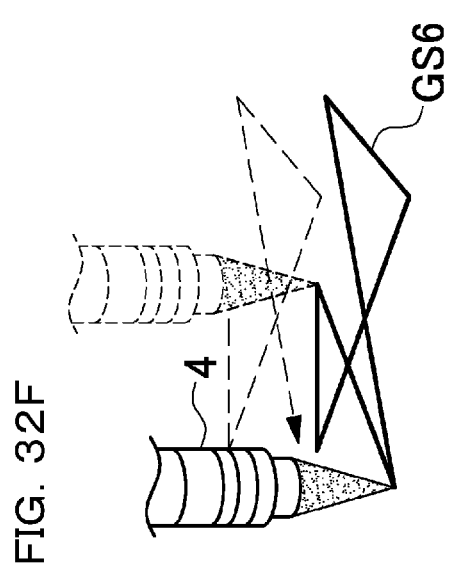
Figure 32E:
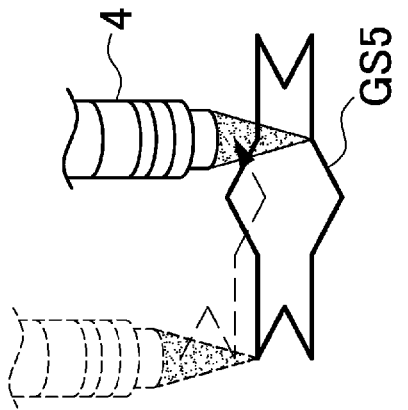
Figure 32D:
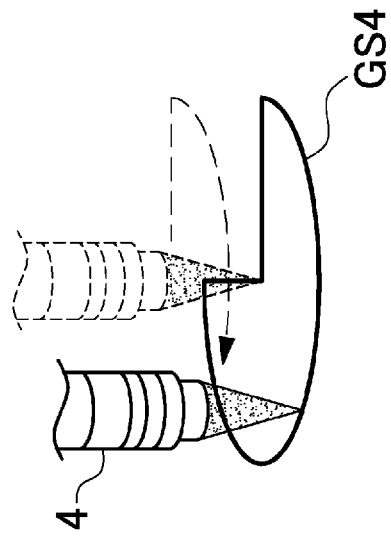

In the case in which a user selects a circle as a geometric shape GS2, the user can specify three points as the reference points as shown in FIG. 32B. As a result, a circle that passes the three points can be calculated as a route. In the case in which a user selects a rectangle as a geometric shape GS3, the user can specify four vertices as the reference points as shown in FIG. 32C. As a result, a rectangle that passes the three points can be calculated as a route. Specification of a geometric shape to be specified by users is not limited to simple geometric shapes such as a circle and a rectangle but can be complicated shapes. For example, users can specify the union or intersection of a plurality of geometric shapes, a line segment that has a vertex, a shape that is defined by a pointing-device-tracing path, or any other shape. For example, FIG. 32D is a view showing a pie shape, which is represented by a circle by removing a sector, as a geometric shape GS4. FIG. 32E is a view showing a star as a geometric shape GS5. FIG. 32F is a view showing a shape that is specified by a plurality of line segments drawn by one stroke as a geometric shape GS6.

Figure 33:
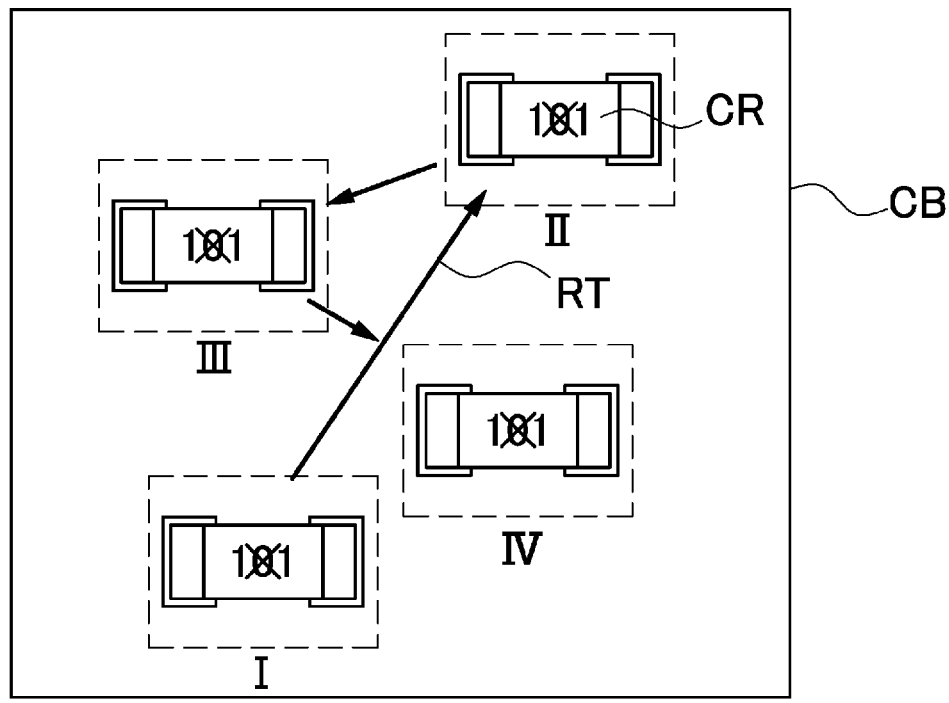
FIG. 33 is a schematic view showing a field-of-view moving path with respect to chips, which are spaced away from each other and mounted on a board.

Specification of a geometric shape to be specified by users is not limited to a closed line but can be a straight line, an open curve, or the like. For example, observation of a plurality of chip resistors CR, which are separately arranged on a board CB as shown in FIG. 33, is considered. In this case, a user can specify positions of the chips CP as the reference points. As a result, a polygonal chain route RT shown in FIG. 34 can be specified as an FOV moving path. The reference points are shown by Xs, and observation fields of view at the reference points are shown by dashed boxes in FIG. 33.

(Route Complement)

The path calculator 82 calculates an FOV moving path based on path information, which is provided by the path provider 81. The path calculator 82 complements coordinates of the FOV moving path in accordance with reference points to form the entire total FOV moving path as a complemented route. The path calculator 82 changes between complement algorithms depending on a geometric shape that is selected by a user. The path information is not limited to reference points but can be other information that can specify an FOV moving path. For example, in the case in which a circular path is specified, the circular path can be specified by its center coordinates and radius. In the case in which the polygonal chain route RT is specified, if a user specifies reference points I to IV shown in FIG. 33 in this order, coordinates between the reference points are complemented to connect the reference points one after another in the same order with line segments. As a result, the route RT shown in FIG. 34 can be complemented. In the case of the route RT shown in FIG. 34, for example, to select whether an observation FOV moves from the position II toward the position III or from the position III toward the position II, if a user specifies a point (as a direction of movement specified by the user) on the upper side of a boundary line at the position II shown by a dashed line, an observation FOV will move from the position II toward the position III. If a user specifies a point on the left side of a boundary line at a midpoint between the positions II and III shown by a circle, an observation FOV will move from the position II toward the position III.

Path information about observation FOV moving direction specification is not limited to a reference point that is specified on a screen of the display 70 as discussed above but can be a coordinate position that is defined by directly inputting numeric values as coordinates, or by specifying an FOV moving path by using a mathematical expression, for example.

In the case in which an observation object is arranged in a predetermined position on the stage 30, for example, in the case in which the same observation object is constantly arranged at the same position on the stage 30 by using a positioning jig or the like, once an FOV moving path is specified in accordance with design values of the jig, the same FOV moving path can be used in route guide as long as conditions are same. In other words, users do not necessarily move the stage 30 to a certain position and specify reference positions to specify an FOV moving path in each observation every when observing the same observation object.

Figure 35A:
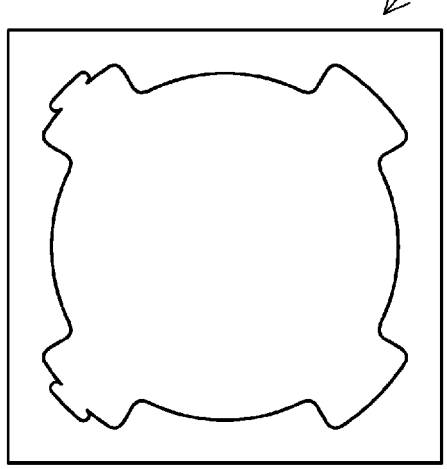
FIG. 35A is a schematic view showing a wide area image of an observation object.
Figure 35B:
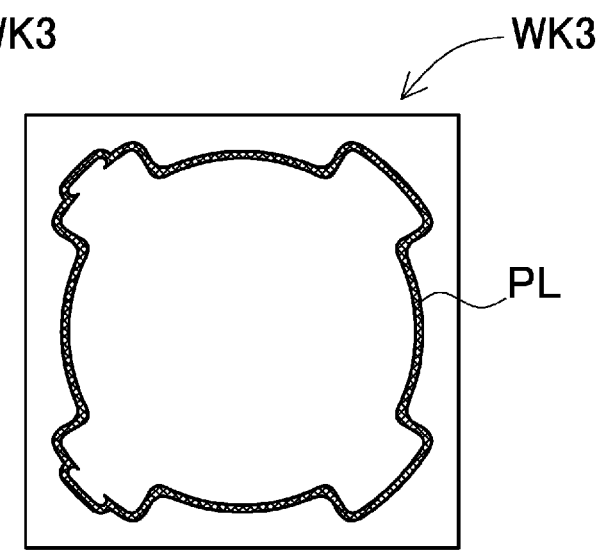
FIG. 35B is a schematic view showing another image of the observation object shown in FIG. 35A with its outline being extracted.

In addition to specification of an FOV moving path in accordance with a geometric shape, an FOV moving path can be automatically extracted from an image. For example, a wide area image of an observation object WK3 shown in FIG. 35A is captured so that an outline PL of the observation object WK3 is extracted by edge extraction as shown in FIG. 35B. In the case in which the edge extraction is activated so that a field of view is moved along the entire of or a part of the outline PL, the path provider 81 or the path calculator 82 automatically obtains its path information to calculate an FOV moving path. In this case, users do not necessarily manually specify path information depending on observation objects. That is, manual specification of path information can be omitted. In the edge extraction, extracted points can be connected to each other to form an outline. Alternatively, lines that connect extracted points can be estimated by a straight or curved to form an outline.

Figure 36A:
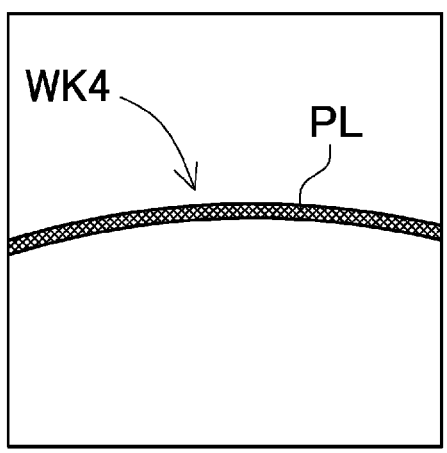
FIG. 36A is a schematic view showing an observation object in an observation field of view on an XY stage moving.
Figure 36B:
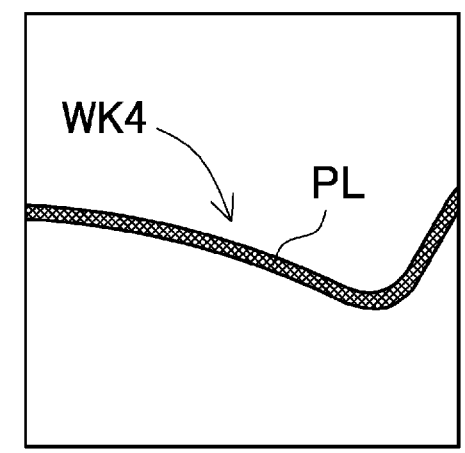
FIG. 36B is a schematic view showing the observation object in an observation field of view on the XY stage further moving.

An entire image of an observation object can be displayed on one screen as shown FIG. 35A, and an outline shape of the observation object can be extracted to specify an FOV moving path. Also, an image of a part an observation object can be displayed on one screen as shown FIG. 35A, and an outline shape of the observation object can be extracted while an observation FOV is moved to specify an FOV moving path. For example, as shown in FIGS. 36A and 36B, an observation FOV is updated while the XY stage is moved, and an outline is extracted from an image of observation object WK4 in real time to automatically specify an FOV moving path. The path provider 81 or the path calculator 82 can automatically specify an FOV moving path.

After the reference points are specified as discussed above, when the route trace mode is executed, an observation FOV is moved along an FOV moving path even by a rough instruction that does not require users to carefully specify a moving direction of the FOV changer 5 by manipulating the moving direction input devices 55a such as the joy stick 55b. In other words, in the route trace mode, a moving direction that is specified by the moving direction input device 55a is compared with a direction of the FOV moving path, and the FOV changer 5 is correspondingly moved if it is determined that the moving direction specified by the moving direction input device 55a falls within a predetermined range with respect to the direction of the FOV moving path. In this case, a predetermined range of moving direction with respect to the direction of the FOV moving path is determined as the same direction along the field-of-view moving direction. As a result, while an observation FOV is moved, a center of the observation FOV is constantly positioned on an FOV moving path. Consequently, users can constantly observe an interest part of an observation object at a suitably recognizable position while moving an observation FOV.

An observation FOV can be moved along a recognizable route specified by users only by tilting the joy stick 55b in a roughly suitable direction. A tilt direction of the joy stick 55b is specified in the range 0 degree to 360 degrees. In the case in which a user moves an observation FOV by using the joy stick 55b along a straight line segment between the positions I to IV of the route RT as an FOV moving path as discussed above with reference to FIG. 34, an observation FOV keeps moving if the joy stick 55b is tilted in a range of +/−90 degrees with respect to a field-of-view moving direction (FOV moving direction) on the FOV moving path, in other words, as long as if the user tilts the joy stick 55b toward a forward side with respect to a line perpendicular to the FOV moving direction. If a tilt angle of the joy stick 55b does not fall within the range, in other words, if the user tilts the joy stick 55b roughly toward a reverse side with respect to the FOV moving direction or the user stops tilting the joy stick 55b, the movement of an observation FOV stops. In the case in which an FOV moving path is a curve such as a circle, a tilt angle of the joy stick 55b is compared with a tangent of the FOV moving path at the current position. If the tilt angle of the joy stick 55b falls within a predetermined range of angle, the route guide is continued.

Figure 34:
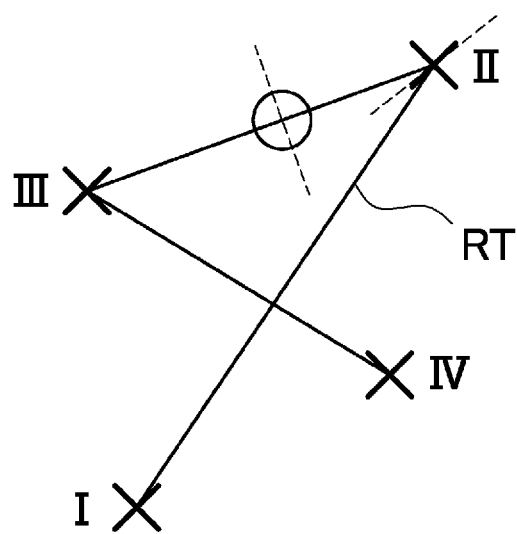
FIG. 34 is a schematic diagram showing movement defined in accordance with the field-of-view moving path to observe observation objects shown in FIG. 33.

A direction of movement provided by the moving direction input device 55a at a vertex of a polygonal chain such as the position II shown in FIG. 34 is determined with respect to a bisector that divides into equal angles an angle formed by two line segments of an FOV moving path to determine whether an observation FOV keeps moving. More specifically, in the FOV moving path shown in FIG. 34, if a direction of movement falls within an angle range of the upper side with respect to a bisector shown by the dashed line, an observation FOV is moved from the position II toward the position III. If a direction of movement falls within an angle range of the lower side with respect to the bisector, the movement of an observation FOV is stopped.

Also, a moving speed of an observation FOV can be changed in accordance with a tilt direction of the joy stick 55b. For example, a moving speed of an observation FOV (e.g., moving speed of the stage 30) increases as a tilt angle of the joy stick 55b becomes closer to an FOV moving path, in other words, as an angle difference between a tilt angle of the joy stick 55b and an FOV moving path becomes smaller. A moving speed of an observation FOV decreases as the angle difference becomes larger. In the case in which a moving speed of an observation FOV is changed in accordance with a tilt angle of the joy stick 55b with respect to a vertical direction, a movement speed of an observation FOV can be changed in accordance with combination of a tilt direction of the joy stick 55b in a plan view and a tilt angle of the joy stick 55b with respect to the vertical direction.

(FOV Deviation Correctional Offset Function)

A display scaling factor in the image display area can be changed during observation. The magnified observation apparatus 100 has a field-of-view deviation correctional offset function that, even if a user changes a display scaling factor, automatically corrects a field-of-view deviation when the display scaling factor is changed to move an observation FOV along a route specified. The following description will describe the field-of-view deviation correctional offset function in more detail.

Figure 37A:
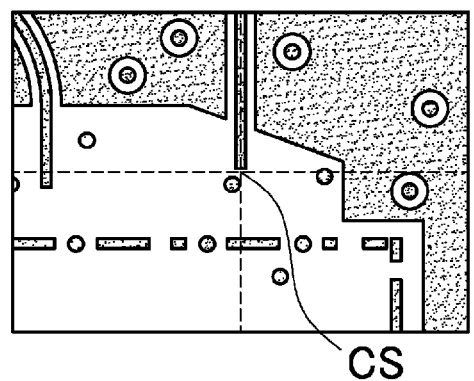
FIG. 37A is a first image showing an object in an observation field of view.
Figure 37B:
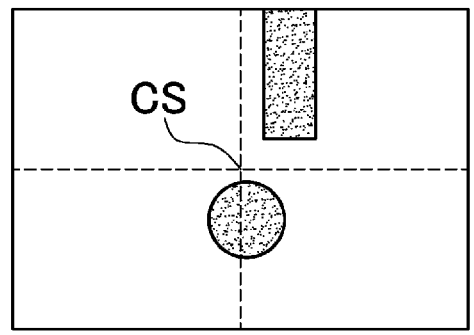
FIG. 37B is an image showing the object in an observation field of view after an objective lens change.
Figure 37C:
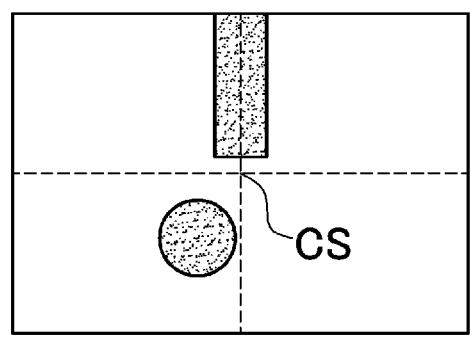
FIG. 37C is another image showing the object in an observation field of view after a deviation of a center of the observation field of view shown in FIG. 37B is corrected.

If the objective lens 25 is changed between its different objective lens sections when a scaling factor is changed, a center of an observation FOV after the change often deviates from a center of an observation FOV before the change. For example, in the case in which the objective lens 25 includes the different objective lens sections on a revolver, when one of objective lens sections corresponding to an observation FOV shown in FIG. 37A is mechanically changed to another objective lens section by revolving the revolver to increase a scaling factor, an FOV center CS after the change that is shown by an intersection of grid lines of a cross will deviate from an FOV center CS before the change as shown in FIG. 37B. A magnified observation apparatus that corrects such a field-of-view deviation is known. The known magnified observation apparatus previously calculates and stores a deviation amount between FOV centers CS of different objective lens sections, and corrects a field-of-view deviation by moving its XYZ stage by the deviation amount when a scaling factor is changed. The known magnified observation apparatus can automatically move the FOV changer 5 from a position shown in FIG. 37B to a position shown FIG. 37C so that an FOV center CS of an observation FOV of FIG. 37C agrees with a position corresponding to the FOV center CS of the observation FOV of FIG. 37A.

Figure 38:
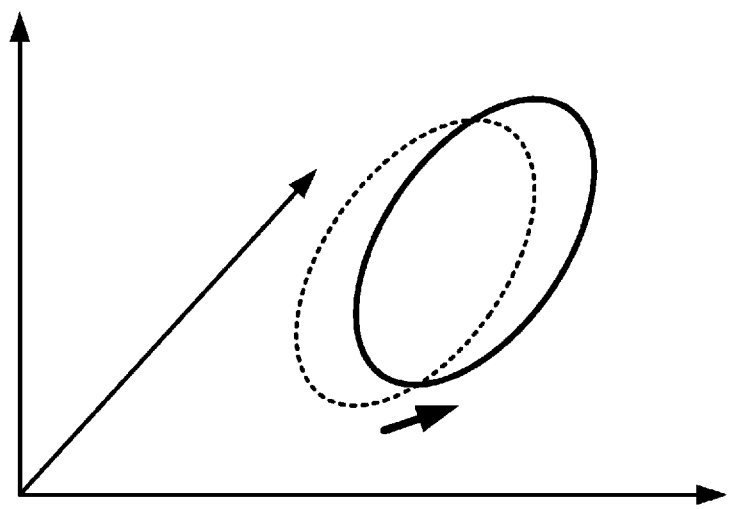
FIG. 38 is a schematic diagram showing an operation of offsetting a field-of-view moving path by using a field-of-view deviation correctional offset function.

However, in the case in which a route is specified in the route trace mode and is defined by coordinates of the stage, if the XY stage is moved by the correction, a field of view after the change stays on the route but the stage coordinates corresponding to the field of view after the change will deviate from the route. To address this, the magnified observation apparatus 100 according to this embodiment offsets a route by a deviation correction amount as shown in FIG. 38 when a field-of-view deviation is corrected so that a route after the deviation correction agrees with the route before the deviation correction. This field-of-view deviation correction offset function can be performed not only in the XY plane but also in the Z direction, which is a height direction. The path calculator 82 can realize the field-of-view deviation correction offset function.

FOV center deviation in scaling factor change will occur not only when the objective lens 25 is changed between its different objective lens sections by using its revolver, etc. or when the objective lens 25 is physically changed but also when a zoom optical unit is used and changes its scaling factor. The magnified observation apparatus 100 according to this embodiment can perform the field-of-view deviation correction offset function not only when the objective lens 25 is changed between its different objective lens sections but also in any event in which a field-of-view deviation occurs.

Figure 39:
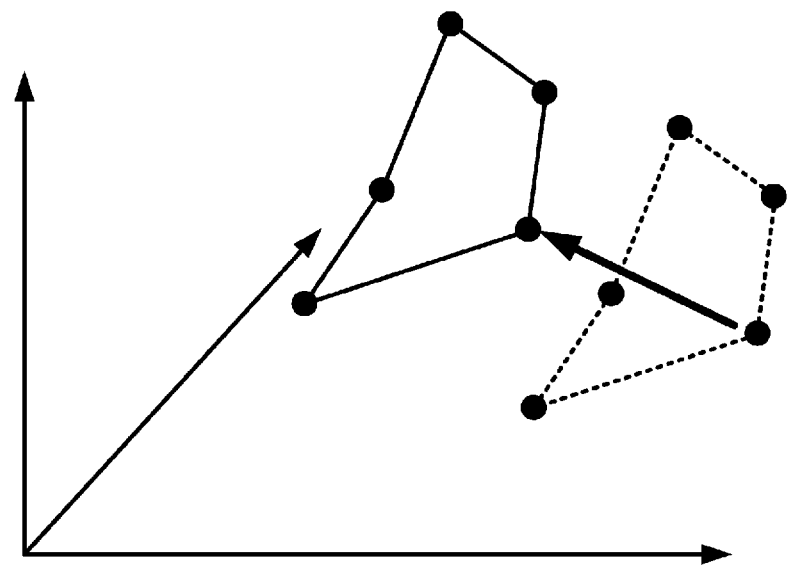
FIG. 39 is a schematic diagram showing an operation of offsetting a field-of-view moving path in accordance with a point of an observation field of view that is specified.

Such a route offset function can be used in other cases. For example, in the case in which an observation object can be hardly positioned at the same position with respect to a route that was specified before, users can specify a certain point on the route that is assigned to a point in the current field of view so that the route can be entirely shifted in accordance with the point specification. For example, if a user specifies one point on an FOV moving path shown by a dashed pentagon in FIG. 39 corresponding to a point in the current field of view, the FOV moving path is entirely shifted in accordance with the point specification.

The aforementioned magnified observation apparatus 100 has the route trace mode, which performs the route guide function, and the free mode, which deactivates the route trace mode. In the route trace mode, an observation FOV is moved along an FOV moving path that is calculated by the path calculator 82 by the movement controller 83 by controlling the FOV changer 5 in accordance with a direction by the moving direction input device 55a, as discussed above. In the free trace mode, an observation FOV is moved by the movement controller 83 by controlling of the FOV changer 5 in a moving direction that is directed by the moving direction input device 55a irrespective of an FOV moving path. Consequently, users can easily move an observation FOV along an FOV moving path in the route trace mode, and can freely move an observation FOV in the free mode.

In the case in which a route is specified, not only XY coordinates but also a Z coordinate, i.e., a height can be specified. In this case, an observation FOV can be moved along a path corresponding to positions of an observation object to be observed even if the observation object has an inclined surface. For example, in the aforementioned case in which a circular FOV moving path is specified, when three points are specified as reference points, the three points include height information, an inclination of a flat surface can be calculated in accordance with the height information of the three points. As a result, the FOV moving path can be correspondingly specified in the flat surface calculated. Consequently, the route guide function can be realized to provide focused images along the inclined flat surface.

Figure 40A:
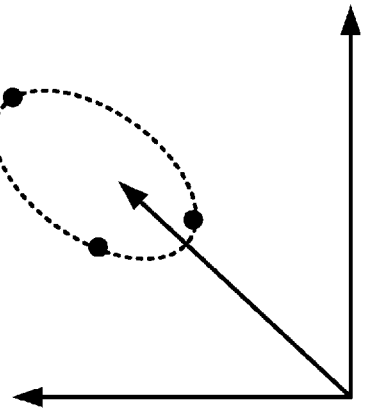
FIG. 40A is a schematic diagram showing a field-of-view moving path and reference points that are specified in a three dimensional space.
Figure 40B:
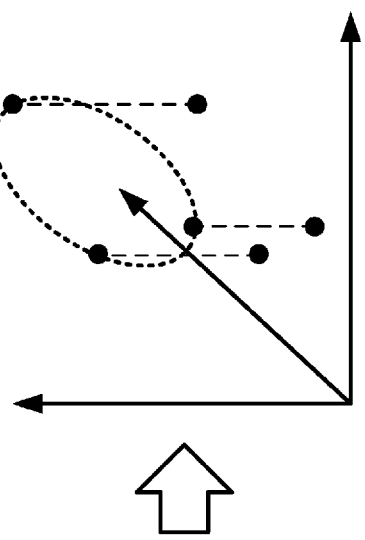
FIG. 40B is a schematic diagram showing points that are projected on an XY plane from the reference points.
Figure 40C:
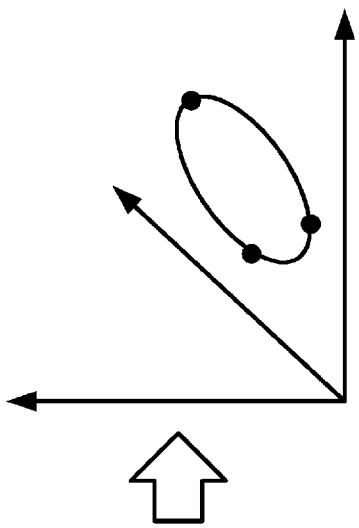
FIG. 40C is a schematic diagram showing a field-of-view moving path that is defined by the reference points projected.

Also, a route in a three dimensional space can be represented by a point cloud. Alternatively, a route in a three dimensional space can be represented as a geometric shape that is obtained by projecting the three-dimensional route onto the XY plane. For example, in the case in which a circular FOV moving path that is viewed in a plan view, three points that are specified in the three dimensional space as shown in FIG. 40A is projected onto the XY plane as shown in FIG. 40B so that a circle can be specified in the XY plane in accordance with three points projected as shown in FIG. 40C. In this case, because the FOV moving path can be treated as data that is mapped onto the XY plane from three dimensional data, calculation can be simple.

Figure 41A:
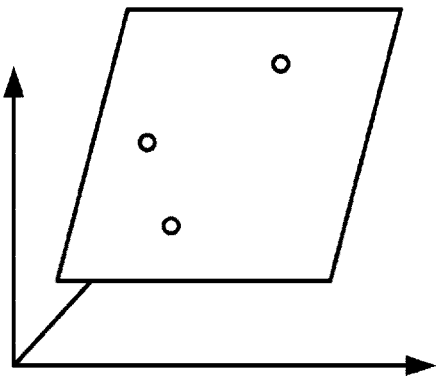
FIG. 41A is a schematic diagram showing a flat plane that is defined in the three dimensional space.
Figure 41B:
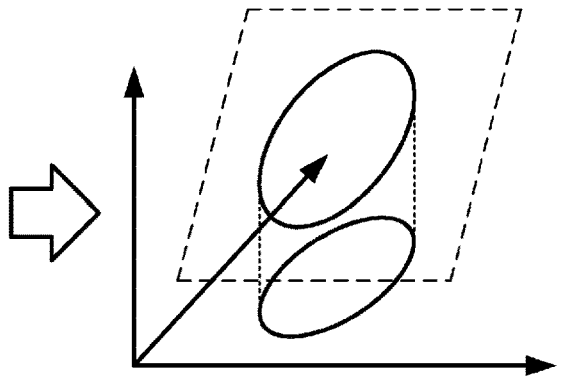
FIG. 41B is a schematic diagram showing a field-of-view moving path on the flat plane that is projected onto the XY plane from a field-of-view moving path on the flat plane shown in FIG. 41A.

The XY stage can be moved by moving the stage 30 along the circle, which is specified by the aforementioned projecting calculation, in the XY plane. A Z coordinate that corresponds to XY coordinates of the stage is calculated in real time based on the flat surface, which has been calculated in the three dimensional space as shown in FIG. 41A, so that an observation FOV can be moved in a direction of the Z stage along the route, which has been specified in the three dimensional space, as shown in FIG. 41B. A Z coordinate can be calculated in accordance with coordinates in the XY plane based on the inclined flat surface, which has been calculated in the three dimensional space as shown in FIGS. 41A and 41B, by using a mathematical expression that defines the inclined flat surface.

Figure 42A:
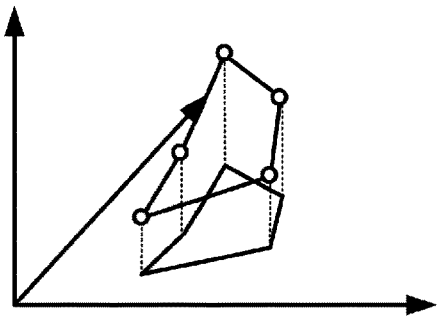
FIG. 42A is a schematic diagram showing a polygonal shape that is defined in the three dimensional space.
Figure 42B:
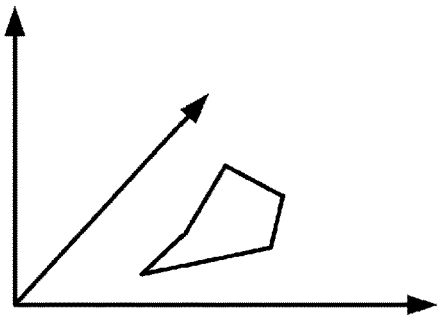
FIG. 42B is a schematic diagram showing a field-of-view moving path that is projected from the polygonal shape onto the XY plane.

In the case in which a polygonal FOV moving path is specified, a polygon of the FOV moving path in the XY plane is obtained by similarly projecting the three-dimensional path onto the XY plane, and the XY stage can be moved along the polygon projected onto the XY plane. In this case, a Z coordinate can be calculated in accordance with an inclination between points shown in FIGS. 42A and 42B so that an observation FOV can be moved along a route that is intendedly specified by a user even on the way from one of the point to another point.

Figure 43:
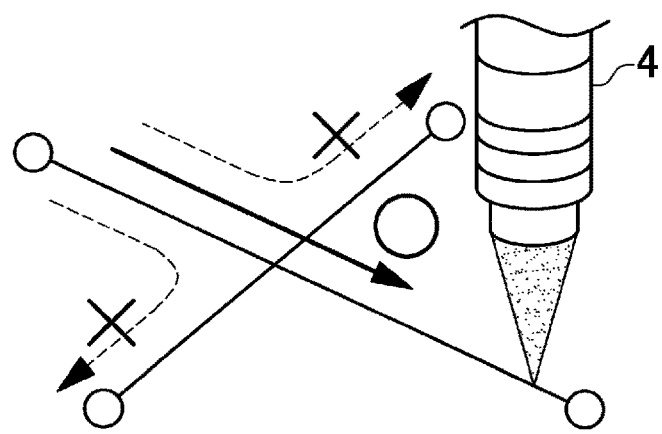
FIG. 43 is a schematic view showing determination of a field-of-view moving direction in the case in which field-of-view moving paths intersect each other.

In the case in which routes intersects each other in the XY plane, it can be determined which direction an observation FOV is moved in accordance with a direction of the joy stick 55b or the like. For example, in the case in which routes intersects each other in the XY plane as shown in FIG. 43, if a tilt angle of the joy stick 55b falls within a range of +/−90 degrees with respect to a moving direction on one of the routes an observation FOV keeps moving straight, if a tilt angle of the joy stick 55b falls within a range from +90 to +180 degrees with respect to the moving direction an observation FOV turns to the left (upward in FIG. 43), and if a tilt angle of the joy stick 55b falls within a range from −90 to −180 degrees with respect to the moving direction an observation FOV turns to the right (downward in FIG. 43).

Figure 44:
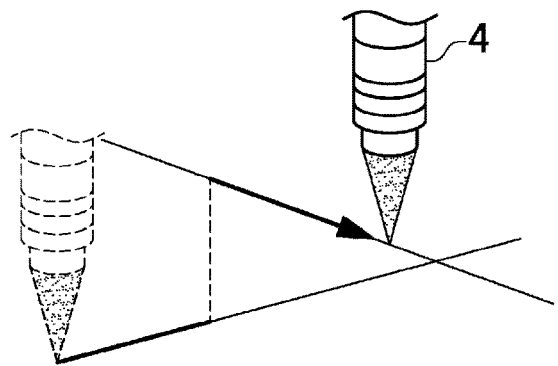
FIG. 44 is a schematic view showing a route guide function of guiding the head along field-of-view moving paths, which are skew lines, in the case in which their corresponding lines projected on the XY plane will intersect each other.
Figure 45:
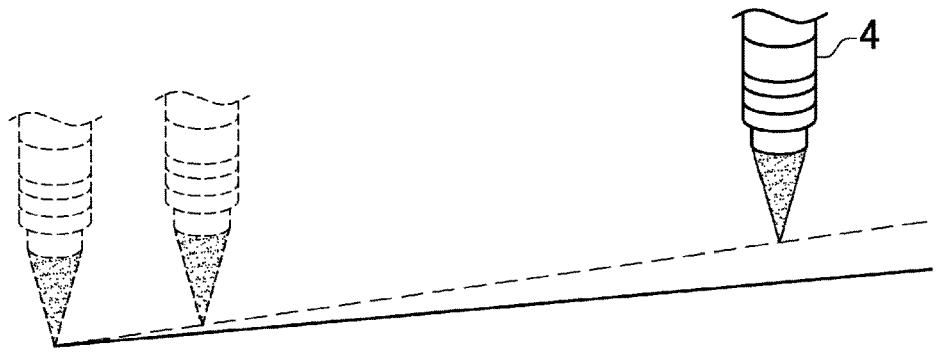
FIG. 45 is a schematic view showing a route guide function of guiding the head along a field-of-view moving path that is defined by specified points close to each other.
Figure 46:
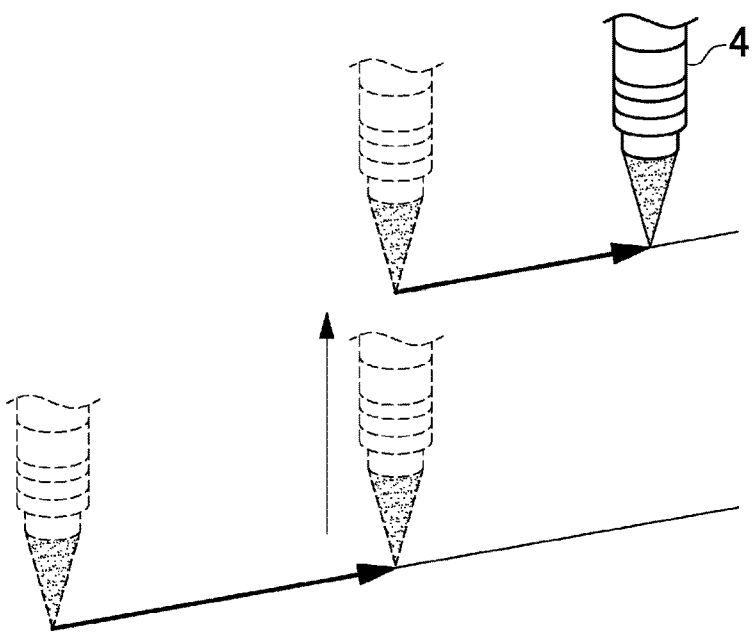
FIG. 46 is a schematic view showing an exemplary operation of moving the head along in a Z direction under a route guide function.

Also, it can be automatically determined which direction an observation FOV is moved depending on a geometric shape (e.g., line segment or circle) that has been selected. In particular, in the case in which a Z coordinate of the stage changes correspondingly to movement of an observation FOV along a route (in the case of followable Z-coordinate change), it is preferable to automatically determine which direction an observation FOV is moved depending on a geometric shape that has been selected. For example, in the case in which routes form skew lines and their corresponding lines projected on the XY plane will intersect each other as shown in FIG. 44, an unintended rise of the stage in the Z direction can cause stress on users. In the case in which a Z coordinate of the stage changes correspondingly to movement of an observation FOV along a route, if a user manipulates the Z stage, the route is shifted by a height (Z coordinate difference) that is specified by the user after the user manipulation is completed. When a user moves the stage 30, there is a high probability that an image of an observation object is incorrectly focused. For example, in the case in which an FOV moving path is defined by specified points close to each other as shown in FIG. 45, movement of an observation FOV sometimes causes incorrect image focus. A route offset function that shifts a route by a height (Z coordinate difference) that is specified by a user is also preferably performed if the user moves the Z stage in a rest state of the XY stage. For example, as shown in a lower left part of FIG. 46, in the case in which the stage is automatically moved in the XYZ directions to follow a route, if a user temporarily stops XY movement of the stage and then manually moves the stage in the Z direction, such a route offset function is executed. After that, when the user restarts XY movement of the stage, the stage is moved along a route that is obtained by the route offset function.

Figure 47:
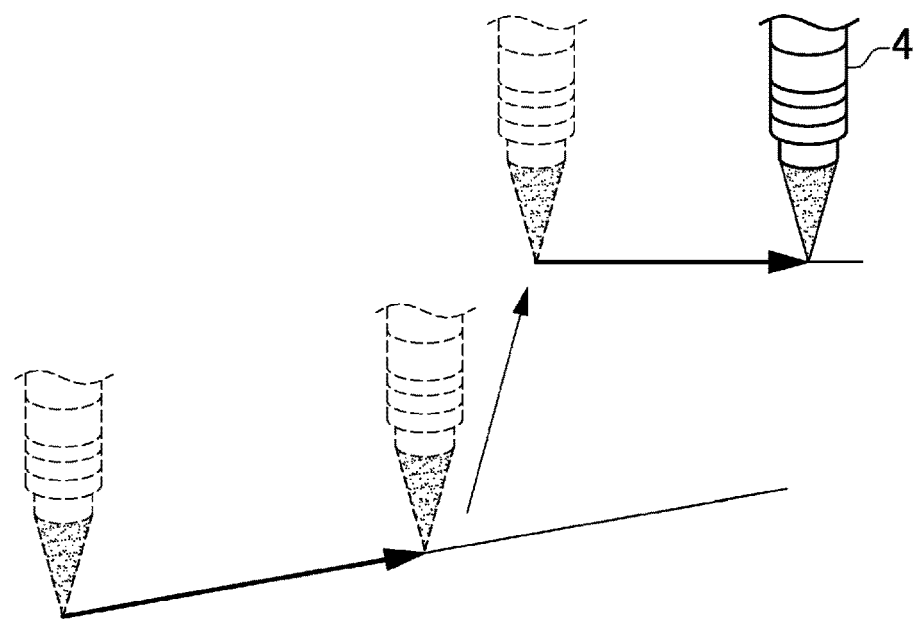
FIG. 47 is a schematic view showing another exemplary operation of moving the head along in the Z direction under a route guide function.

In the case in which Z stage manipulation in XY stage movement is a burden, Z stage manipulation can be disabled, or followable Z-coordinate change is deactivated in response to Z stage manipulation. For example, as shown in a lower left part of FIG. 47, in the case in which the stage is automatically moved in the XYZ directions to follow a route, if a user manually moves the stage in the Z direction during XY movement of the stage, followable Z-coordinate change is deactivated so that only a route guide function that helps XY movement of the stage is executed.

In this case, as an alternative, a route offset function that shifts a route by a height (Z coordinate difference) specified can be deactivated during movement of the stage in the XY direction if a user manually moves the stage in the Z direction, and the Z-direction route offset function can be activated while movement of the stage in the XY direction is stopped.

In the alternative, the route can be shifted in accordance with a Z coordinate of the stage when XY stage movement starts. If the followable Z-coordinate change deactivation causes incorrect image focus, a user will stop the XY stage and can adjust the focus of the objective lens. After that, when the user restarts XY stage movement, the route will be shifted in accordance with a Z coordinate of the stage when XY stage movement restarts.

Third Embodiment

Figure 48:
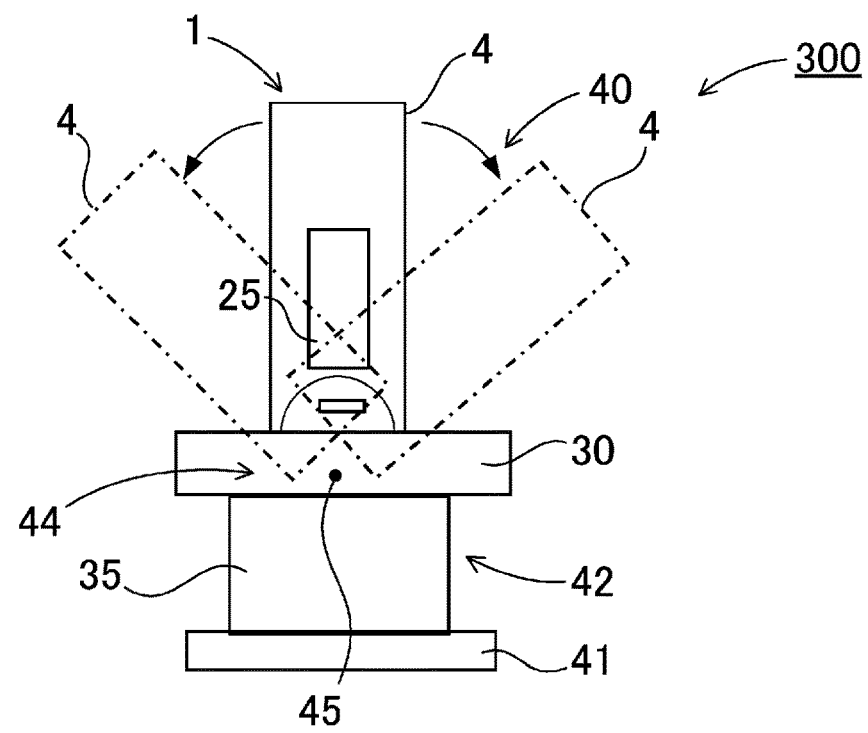
FIG. 48 is a front view showing a magnified observation apparatus according to a third embodiment of the present disclosure.

A magnified observation apparatus 300 according to a third embodiment of the present disclosure further has an oblique observation function. The magnified observation apparatus 300 according to the third embodiment of the present disclosure, which has the oblique observation function, is now described with reference to FIG. 48. FIG. 48 is a front view showing the imaging group part 1 of the magnified observation apparatus 300. The components according to the magnified observation apparatus shown in FIG. 48 similar to the foregoing first embodiment are attached with the same reference signs as the first embodiment, and their description is omitted.

The imaging group part 1 includes the stage 30, which holds the observation object, a head 4, and a support 40 that supports the head 4. The support 40 includes a stage movable holder 42 that holds the stage 30 movably in a horizontal plane and in a vertical direction, and a head incliner 44 that can incline the head 4 while the stage 30 is kept held. The stage movable holder 42 and the head incliner 44 are fixed to a base 41. The support 40 stably stands on the base 41, which has a plate shape.

An observation object can be observed in a slant direction (oblique observation) by the head incliner 44 by inclining the head 4 with respect to the stage 30. In particular, in the case in which the head 4 can swing leftward and rightward with respect to an upright orientation about a pivot shaft 45, an observation object can be observed both in left and right slant directions. Such different views can provide high flexibility in observation. In addition, in the oblique observation, an observation FOV is required to be fixed when the head 4 is inclined so that an observation object can be eucentrically observed (eucentric observation). For this reason, in the oblique observation, in order to align a surface of an observation object to be observed with an axis of the pivot shaft 45, a height of the stage 30 is preferably previously adjusted.

The magnified observation apparatus according to the third embodiment can execute the search lighting function also in oblique observation. In the case in which the search lighting function is executed at one (first) slant angle of the head, and the sequence has gone from the first sequence to the second sequence, if a user changes the head to another (second) slant angle, the sequence can return to the first sequence. In this case, images that are captured correspondingly to different illumination statuses and are buffered are cleared when the user changes the head to the second slant angle.

The auto-focusing to be used in the magnified observation apparatus according to the present disclosure is not limited to contrast detection auto-focusing but can be phase detection auto-focusing or other type of auto-focusing. For example, the magnified observation apparatus 200 according to the second embodiment shown in FIG. 24 uses phase detection for auto-focusing. The magnified observation apparatus shown in FIG. 24 includes an auto-focusing sensor 15. The auto-focusing sensor 15 is a phase-detection type auto-focusing sensor. The phase-detection type auto-focusing sensor receives light that is split after passing through the objective lens 25. A difference between two images corresponding to split light is used to determine in which direction (focus direction) and how much (focus amount) to change the current focus to achieve correct focus. The controller 80 (in-focus degree evaluator) determines correct focus based on the focus direction and the focus amount as in-focus degree feature quantities. Because the phase-detection type auto-focusing sensor does not require movement of the objective lens 25 in auto-focusing, high-speed auto-focusing can be achieved as compared with contrast detection auto-focusing. The auto-focusing sensor is not limited to such a phase-detection type auto-focusing sensor but can be a ranging sensor, which measures a distance between the objective lens and an observation object, for example. When the ranging sensor measures a distance between the objective lens and an observation object, a distance difference between the distance measured and a focus distance of the objective lens, which is previously measured, can be calculated. As a result, auto-focusing can be performed by moving the Z stage or the like by an auto-focusing device by the distance difference calculated.

A magnified observation apparatus, magnified observation method, a magnified observation program, and a non-transitory computer-readable storage medium or storage device storing the magnified observation program according to the present disclosure relates can be suitably used as a microscope, a digital microscope (e.g., reflection or transmission digital microscope), or the like.

It should be apparent to those with an ordinary skill in the art that while various preferred examples of the invention have been shown and described, it is contemplated that the invention is not limited to the particular examples disclosed. Rather, the disclosed examples are merely illustrative of the inventive concepts and should not be interpreted as limiting the scope of the invention. All suitable modifications and changes falling within the spirit of the invention are intended to be encompassed by the appended claims.

What is claimed is:
1. A magnified observation apparatus comprising:
a stage to hold an observation object thereon;
an objective lens adaptive to face the observation object;

an illuminator configured to change between different illumination directions of light incident on the observation object, the illuminator irradiating the observation object with one of
- a first lighting pattern in which the observation object is irradiated with the different illumination directions of light one after another, and
- a second lighting pattern in which the observation object is irradiated with at least one of the different illumination directions, which are included in the first lighting pattern;

a camera configured to capture an image of the observation object through the objective lens to generate image data representing the image;

a display controller configured to control a display that displays the image of the observation object based on the image data generated by the camera;

a feature quantity calculator configured to calculate feature quantities of the image data of the observation object corresponding to the different illumination directions in the first lighting pattern; and an illumination controller configured to control the illuminator to selectively perform a first sequence in which the illuminator is operated in the first lighting pattern, and the display is operated to display a live image of the observation object irradiated with the first lighting pattern, and a second sequence in which the illuminator is operated in the second lighting pattern as at least one of the different illumination directions that is selected based on the feature quantities calculated corresponding to the different illumination directions by the feature quantity calculator, and the display is operated to display an image of the observation object captured when the observation object is irradiated with the second lighting pattern as the at least one of the different illumination directions.

2. The magnified observation apparatus according to claim 1, further comprising an area specifier configured to receive a desired area specified by a user on an image displayed on the display,
wherein the feature quantity calculator calculates feature quantities of the image data in the area specified by the area specifier, corresponding to the different illumination directions in the first lighting pattern, and
wherein the illumination controller is configured to select at least one illumination direction from the different illumination directions based on the feature quantities calculated by the feature quantity calculator in response to receiving the area through the area specifier, and to switch from the first sequence to the second sequence.

3. The magnified observation apparatus according to claim 2, further comprising a buffer memory configured to temporarily store image data of images displayed corresponding to the different illumination directions in the first lighting pattern on the display in the first sequence,
wherein the feature quantity calculator is configured to calculate feature quantities of the image data in the area specified through the area specifier, corresponding to the different illumination directions in the first lighting pattern, in response to receiving the area through the area specifier, so that the illumination controller selects at least one illumination direction from the different illumination directions and switches from the first sequence to the second sequence.

4. The magnified observation apparatus according to claim 2, wherein the area specifier is configured to receive a desired area by selectively specifying a boundary surrounding the area or a line segment corresponding to the area on an image represented by image data that is displayed on the display by the display controller.

5. The magnified observation apparatus according to claim 1, wherein the illumination controller selects as an illumination direction of the second sequence at least one of the different illumination directions that corresponds to the largest feature quantity of image data of an image calculated by the feature quantity calculator.

6. The magnified observation apparatus according to claim 1, wherein the feature quantities of image data include variances of brightness values of pixels of image data.

7. The magnified observation apparatus according to claim 1,
wherein the illuminator includes a plurality of arc-shaped illumination blocks that are arranged in a ring shape,
wherein the illumination controller activates/deactivates the illumination blocks of the illuminator one after another in accordance with information about a predetermined order to change between the different illumination directions of the illuminator in the first sequence.

8. The magnified observation apparatus according to claim 7, wherein the illuminator includes a coaxial light that includes the illumination blocks.

9. The magnified observation apparatus according to claim 8, wherein the illuminator includes the coaxial light, which includes illumination blocks, and a ring-shaped light that includes a plurality of illumination blocks and is detachably attached to the magnified observation apparatus,
wherein in the case in which the ring-shaped light is attached to the magnified observation apparatus the illumination blocks that are included in the ring-shaped light are activated/deactivated one after another as the plurality of arc-shaped illumination blocks that are arranged in a ring shape by the illumination controller, and
in the case in which the ring-shaped light is detached from the magnified observation apparatus the illumination blocks that are included in the coaxial light are activated/deactivated one after another as the plurality of arc-shaped illumination blocks that are arranged in a ring shape by the illumination controller.

10. The magnified observation apparatus according to claim 1, wherein the illuminator is controlled so that an irradiation period of at least one of the different illumination directions overlaps an irradiation period of another illumination direction changed from the at least one of the different illumination directions in the first lighting pattern.

11. The magnified observation apparatus according to claim 1, wherein, in the second sequence, the illumination controller operates the illuminator in the second lighting pattern as at least one of the different illumination directions selected based on the feature quantities of the image data calculated corresponding to the different illumination directions by the feature quantity calculator, and the display controller operates the display to display a composite image of the observation object obtained by coupling images that are captured when the observation object is irradiated with the second lighting pattern as the at least one of the different illumination directions.

12. The magnified observation apparatus according to claim 1, further comprising a focusing device configured to adjust image focus by changing a relative distance between a focus position of the objective lens and the observation object by moving at least one of the objective lens and the observation object toward or away from each other in an optical axis of the objective lens to focus an image of the observation object, wherein the focusing device performs auto-focusing in accordance with one or more predetermined conditions, and
  wherein the illuminator is configured to temporarily stop the illumination direction change during the auto-focusing of the focusing device.

13. The magnified observation apparatus according to claim 1, further comprising a field-of-view (FOV) changer configured to change a position of an optical axis of the objective lens relative to the stage to move an observation field-of-view of the camera, wherein the illumination controller is configured to perform the first sequence in the movement of an observation field-of-view by the FOV changer.

14. The magnified observation apparatus according to claim 13, further comprising a focusing device configured to adjust image focus by changing a relative distance between a focus position of the objective lens and the observation object by moving at least one of the objective lens and the observation object toward or away from each other in an optical axis of the objective lens to focus an image of the observation object; and a movement/rest detector that detects moving and resting of an observation field-of-view of the camera,
  wherein the focusing device performs auto-focusing in response to the detection of resting of an observation field-of-view by the movement/rest detector, and
  wherein the illuminator is configured to temporarily stop the illumination direction change during the auto-focusing of the focusing device.

15. The magnified observation apparatus according to claim 14, further comprising:

a focusing controller that controls focusing of the focusing device based on three-dimensional reference information in the movement of an observation field-of-view of the camera by the FOV changer; and
  a height information acquirer that acquires height information of the object to be measured in the auto-focusing, and updates the three-dimensional reference information based on the height information acquired.

16. The magnified observation apparatus according to claim 15, further comprising:

a moving direction input device configured to receive user input for pointing a direction of movement of an observation field-of-view to be displayed on the display and provide the direction of movement of the FOV changer;
  a path provider that provides path information about specification of the direction of movement of an observation field-of-view with respect to an image that is displayed on the display by the display controller;
  a path calculator that calculates a path of movement of an observation FOV based on the path information, which is provided by the path provider; and
  a movement controller that controls movement of the FOV changer passing along the path of movement of an observation field-of-view, which is calculated by the path calculator, in accordance with the direction of movement provided by the moving direction input device.

17. A magnified observation method of observing an observation object that is placed on a stage and illuminated by an illuminator capable of changing between different illumination directions by capturing an image of the observation object by using a camera through an objective lens and by displaying the image on a display while moving an observation field of view of the camera, the method comprising:
    performing a first sequence in which the illuminator is operated in a first lighting pattern in which the observation object is irradiated with the different illumination directions of light one after another, and a live image of the observation object that is irradiated with the first lighting pattern is displayed on the display; and
    performing a second sequence in which feature quantities of the image data of the observation object that are calculated correspondingly to the different illumination directions in the first lighting pattern, the illuminator is operated in a second lighting pattern in which at least one illumination direction is selected from the different illumination directions based on the feature quantities of the image data, and an image of the observation object that is irradiated with the second lighting pattern is displayed on the display.

18. A non-transitory computer-readable medium or storage device including a magnified observation program which causes a computer to perform magnified observation in a magnified observation apparatus including a stage that holds an observation object on the stage, an objective lens that is arranged to face the observation object, which is held on the stage, an illuminator that irradiates the observation object with illumination light, a camera that captures an image of the observation object through the objective lens and generate image data representing the image, and a display that displays the image of the observation object based on the image data, which is generated by the camera, the program causing the computer to execute:

performing a first sequence in which the illuminator is operated in a first lighting pattern in which the observation object is irradiated with the different illumination directions of light one after another, and a live image of the observation object that is irradiated with the first lighting pattern is displayed on the display; and
  performing a second sequence in which feature quantities of the image data of the observation object that are calculated correspondingly to the different illumination directions in the first lighting pattern, the illuminator is operated in a second lighting pattern in which at least one illumination direction is selected from the different illumination directions based on the feature quantities of the image data, and an image of the observation object that is irradiated with the second lighting pattern is displayed on the display.

* * * * *